(12) United States Patent
Okuyama

(10) Patent No.: US 10,069,830 B2
(45) Date of Patent: *Sep. 4, 2018

(54) COMMUNICATION SYSTEM, COMMUNICATION METHOD, AND COMPUTER-READABLE RECORDING MEDIUM

(71) Applicant: RICOH COMPANY, LTD., Tokyo (JP)

(72) Inventor: Taro Okuyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 13/936,575

(22) Filed: Jul. 8, 2013

(65) Prior Publication Data
US 2014/0033274 A1    Jan. 30, 2014

(30) Foreign Application Priority Data
Jul. 25, 2012  (JP) ................................ 2012-165239

(51) Int. Cl.
*H04L 29/06* (2006.01)
*H04L 12/18* (2006.01)
(Continued)

(52) U.S. Cl.
CPC .......... *H04L 63/10* (2013.01); *H04L 12/1818* (2013.01); *H04L 63/104* (2013.01);
(Continued)

(58) Field of Classification Search
CPC . H04L 12/1818; H04L 63/10; H04L 65/1069; H04L 65/1093; H04L 65/403;
(Continued)

(56) References Cited

U.S. PATENT DOCUMENTS 7,818,020 B1 * 10/2010 Manroa ............... H04L 29/1216
                                                    455/3.01
8,015,305 B1 *  9/2011 Linton ................ H04L 65/1069
                                                    709/227
(Continued)

FOREIGN PATENT DOCUMENTS

GB        2460897 A     12/2009
JP       07-177482      7/1995
(Continued)

OTHER PUBLICATIONS

Extended European Search Report dated Dec. 9, 2013 in the corresponding European Patent Application No. 13177516.5.
(Continued)

*Primary Examiner* — Gary S Gracia
(74) *Attorney, Agent, or Firm* — Oblon, McClelland, Maier & Neustadt, L.L.P.

(57) ABSTRACT

A communication system comprising a plurality of terminals, comprising: a start request information obtaining unit that obtains information for requesting start of a session between a first terminal and a second terminal of the plurality of terminals; a session management unit that establishes the session in accordance with the start request information; a participation request information obtaining unit that obtains participation request information with which a third terminal of the plurality of terminals requests participating in the already established session; and a participation determination unit that allows the third terminal to participate or prohibit the third terminal from participating in the already established session, wherein when the participation determination unit allows participation in the already established session, the session management unit lets the third terminal to participate in the already established session.

17 Claims, 37 Drawing Sheets

(51) Int. Cl.
  *H04M 3/38* (2006.01)
  *H04M 3/56* (2006.01)
  *H04M 3/42* (2006.01)

(52) U.S. Cl.
  CPC ...... *H04L 65/1069* (2013.01); *H04L 65/1093* (2013.01); *H04L 65/403* (2013.01); *H04M 3/38* (2013.01); *H04M 3/42153* (2013.01); *H04M 3/56* (2013.01); *H04M 3/42365* (2013.01); *H04M 3/563* (2013.01); *H04M 3/567* (2013.01); *H04M 2201/38* (2013.01); *H04M 2203/258* (2013.01); *H04M 2203/351* (2013.01); *H04M 2203/5009* (2013.01); *H04M 2203/5018* (2013.01)

(58) Field of Classification Search
  CPC ............ H04L 63/104; H04M 2201/38; H04M 2203/258; H04M 2203/351; H04M 2203/5009; H04M 2203/5018; H04M 3/38; H04M 3/42365; H04M 3/56; H04M 3/563; H04M 3/567
  USPC .......................................................... 726/3
  See application file for complete search history.

(56) References Cited

U.S. PATENT DOCUMENTS

| | | | |
|---|---|---|---|
| 2003/0156698 A1 | 8/2003 | Creamer et al. | |
| 2004/0264410 A1* | 12/2004 | Sagi | H04W 36/0005 370/331 |
| 2005/0010638 A1* | 1/2005 | Richardson | H04L 12/185 709/204 |
| 2005/0060368 A1* | 3/2005 | Wang | H04L 12/185 709/204 |
| 2006/0031291 A1* | 2/2006 | Beckemeyer | G06Q 10/10 709/204 |
| 2006/0182084 A1* | 8/2006 | Ionescu | H04L 29/06027 370/352 |
| 2007/0173325 A1* | 7/2007 | Shaw | A63F 13/12 463/42 |
| 2007/0293220 A1* | 12/2007 | Mahler | H04W 76/002 455/435.1 |
| 2008/0133761 A1* | 6/2008 | Polk | H04L 63/0428 709/228 |
| 2008/0250149 A1* | 10/2008 | Morris | H04L 67/24 709/229 |
| 2008/0254762 A1* | 10/2008 | Igval | H04M 1/70 455/404.1 |
| 2008/0301242 A1* | 12/2008 | Akella | G06Q 10/107 709/206 |
| 2009/0316686 A1 | 12/2009 | Mandre | |
| 2010/0005402 A1* | 1/2010 | George | H04L 51/04 715/758 |
| 2010/0135190 A1 | 6/2010 | Park et al. | |
| 2010/0177880 A1* | 7/2010 | Danielsen | H04L 67/2804 379/202.01 |
| 2010/0226287 A1 | 9/2010 | Horvath et al. | |
| 2011/0033033 A1* | 2/2011 | Koul | H04M 3/565 379/202.01 |
| 2011/0119597 A1* | 5/2011 | Yellamraju | G06F 3/01 715/753 |
| 2011/0158396 A1* | 6/2011 | Eichen | H04M 3/42229 379/229 |
| 2012/0174157 A1* | 7/2012 | Stinson | H04N 5/44543 725/40 |
| 2012/0221702 A1* | 8/2012 | Umehara | H04L 12/1818 709/223 |
| 2012/0331073 A1* | 12/2012 | Williams | H04L 67/1065 709/206 |
| 2013/0108033 A1* | 5/2013 | Buzdugan | H04M 3/564 379/202.01 |
| 2013/0117373 A1 | 5/2013 | Umehara | |
| 2013/0179518 A1* | 7/2013 | Quan | H04L 67/2823 709/206 |
| 2013/0185124 A1* | 7/2013 | Aaron | G07B 13/00 705/13 |
| 2014/0049597 A1* | 2/2014 | Inoue | H04N 7/15 348/14.08 |
| 2014/0137193 A1* | 5/2014 | Inoue | H04L 63/104 726/3 |
| 2015/0047002 A1* | 2/2015 | Tamura | H04L 63/08 726/7 |
| 2015/0304361 A1* | 10/2015 | Tamura | H04M 3/56 370/262 |

FOREIGN PATENT DOCUMENTS

| | | |
|---|---|---|
| JP | 2008-124597 | 5/2008 |
| JP | 2012-050063 | 3/2012 |

OTHER PUBLICATIONS

Extended European Search Report dated Jul. 24, 2015 in Patent Application No. 15152045.9.

\* cited by examiner

CHANGE QUALITY MANAGEMENT TABLE

| IP ADDRESS OF DESTINATION TERMINAL | IMAGE QUALITY OF IMAGE DATA RELAYED (QUALITY OF IMAGE QUALITY) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

LOW RESOLUTION

MEDIUM RESOLUTION

HIGH RESOLUTION

FIG.9

CHANGE QUALITY MANAGEMENT TABLE

| RELAY DEVICE ID | OPERATION STATE | RECEPTION DATE/TIME | IP ADDRESS OF RELAY DEVICE | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.2.2.2 | 10 |
| 111e | ON LINE |  | 1.1.1.3 |  |

FIG.10

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.11

TERMINAL MANAGEMENT TABLE

| TER-MINAL ID | TERMINAL NAME | OPERATION STATE | COMMUNI-CATION STATE | RECEPTION DATE/TIME | IP ADDRESS OF TERMINAL |
|---|---|---|---|---|---|
| 01aa | AA TERMINAL, TOKYO OFFICE, JAPAN | ON LINE (COMMUNICATION IS POSSIBLE) | None | 2009.11.10.13:40 | 1.2.1.3 |
| 01ab | AB TERMINAL, TOKYO OFFICE, JAPAN | OFF LINE | | 2009.11.09.12:00 | 1.2.1.4 |
| ... | ... | ... | ... | ... | ... |
| 01ba | BA TERMINAL, OSAKA OFFICE, JAPAN | ON LINE (COMMUNICATING) | Calling | 2009.11.10.13:45 | 1.2.2.3 |
| 01bb | BB TERMINAL, OSAKA OFFICE, JAPAN | ON LINE (COMMUNICATING) | Private Busy | 2009.11.10.13:50 | 1.2.2.4 |
| ... | ... | ... | ... | ... | ... |
| 01ca | CA TERMINAL, NEW YORK OFFICE, THE UNITED STATES | OFF LINE | | 2009.11.10.12:45 | 1.3.1.3 |
| 01cb | CB TERMINAL, NEW YORK OFFICE, THE UNITED STATES | OFF LINE | | 2009.11.10.13:55 | 1.3.1.4 |
| ... | ... | ... | ... | ... | ... |
| 01da | DA TERMINAL, WASHINGTON OFFICE, THE UNITED STATES | ON LINE (COMMUNICATING) | Busy | 2009.11.08.12:45 | 1.3.2.3 |
| 01db | DB TERMINAL, WASHINGTON OFFICE, THE UNITED STATES | ON LINE (COMMUNICATION IS POSSIBLE) | None | 2009.11.10.12:45 | 1.3.2.4 |
| ... | ... | ... | ... | ... | ... |

FIG.12

DESTINATION LIST MANAGEMENT TABLE

| TERMINAL ID MAKING START REQUEST | TERMINAL ID OF DESTINATION |
|---|---|
| 01aa | 01ab, 01ba, 01db, 01dc |
| 01ab | 01aa, 01ca, 01cb |
| 01ba | 01aa, 01ab, 01ca, 01cb, 01da, 01db |
| 01cb | 01aa, 01bb, 01db |
| 01db | 01aa, 01cb, 01da |
| ... | ... |

FIG.13

SESSION MANAGEMENT TABLE

| SESSION ID | RELAY DEVICE ID | TERMINAL ID MAKING START REQUEST | TERMINAL ID OF DESTINATION | DELAY TIME (ms) | DELAY INFORMATION RECEPTION DATA/TIME |
|---|---|---|---|---|---|
| se1 | 111e | 01aa | 01db | 200 | 2009.11.10.14:00 |
| se2 | 111b | 01ba | 01be | 50 | 2009.11.10.14:10 |
| se3 | 111c | 01cd | 01cf | 400 | 2009.11.10.14:20 |
| ... | ... | ... | ... | ... | ... |

FIG.14

QUALITY MANAGEMENT TABLE

| DELAY TIME (ms) | IMAGE QUALITY OF IMAGE DATA RELAYED (QUALITY OF IMAGE QUALITY) |
|---|---|
| 0 TO 100 | HIGH IMAGE QUALITY |
| 100 TO 300 | MEDIUM IMAGE QUALITY |
| 300 TO 500 | LOW IMAGE QUALITY |
| 500 TO | (HIATUS) |

FIG.15

RELAY DEVICE SELECTION MANAGEMENT TABLE

| TERMINAL ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.16

STATE CHANGE MANAGEMENT TABLE

| CHANGE REQUEST INFORMATION | PRIOR-TO-CHANGE STATE INFORMATION | CHANGE INFORMATION |
|---|---|---|
| Call | None | Accepted |
| Join | Accepted | Busy |
| | Private Accepted | Private Busy |
| Leave | Busy | None |
| | Private Busy | None |

FIG.17

STATE CHANGE MANAGEMENT TABLE

| CHANGE REQUEST INFORMATION | TERMINAL INFORMATION | PRIOR-TO-CHANGE STATE INFORMATION | CHANGE INFORMATION |
|---|---|---|---|
| Invite | START REQUESTING TERMINAL | None | Calling |
| | DESTINATION TERMINAL | None | Ringing |
| Private Invite | START REQUESTING TERMINAL | None | Private Calling |
| | DESTINATION TERMINAL | None | Private Ringing |
| Accept | START REQUESTING TERMINAL | Calling | Accepted |
| | | Private Calling | Private Accepted |
| | | Accepted | Accepted |
| | | Private Accepted | Private Accepted |
| | DESTINATION TERMINAL | Ringing | Accepted |
| | | Private Ringing | Private Accepted |

COMMUNICATION SYSTEM, COMMUNICATION METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2012-165239 filed in Japan on Jul. 25, 2012.

BACKGROUND OF THE INVENTION

1. Field of the Invention

The present invention relates to a communication system, a communication method, and a computer-readable recording medium.

2. Description of the Related Art

In recent years, as the need to reduce the cost and the time of business trip arises, call systems for conducting teleconference and the like via a communication network such as the Internet are widely prevalent. In such call system, when multiple call terminals start the call with each other, image data and voice data are transmitted and received, so that teleconference can be conducted.

With the recent advancement of broadband environment, high quality image data and high quality voice data can be transmitted and received between multiple call terminals. Therefore, this makes it easy to recognize the situation of the other party in the teleconference, and improves the degree of satisfaction of communication by conversation.

Depending on conferences, highly confidential data are transmitted in the conference, and it is desired to provide a technique to appropriately restrict participants to the conference. A technique for restricting participants to the conference includes a technique disclosed in Japanese Laid-open Patent Publication No. 7-177482. In this technique, in order to restrict participants to a conference, participants are registered before the conference, those other than the participants registered are not allowed to join the conference.

The present invention is made in light of the above, and an object of the present invention is to provide a communication system and a program which can restrict a terminal that is allowed to join communication in an easy and appropriate manner.

SUMMARY OF THE INVENTION

It is an object of the present invention to at least partially improve the conventional technology.

According to the present invention, there is provided: a communication system comprising a plurality of terminals, comprising: a start request information obtaining unit configured to obtain information for requesting start of a session between a first terminal and a second terminal of the plurality of terminals, the start request information including designation indicating presence/absence of participation restriction for allowing/restricting a terminal, other than the first terminal and the second terminal, to/from participating in the session; a session management unit configured to establish a session between the first terminal and the second terminal in accordance with the start request information; a participation request information obtaining unit configured to obtain participation request information with which a third terminal of the plurality of terminals requests participating in the already established session that has already been established between the first terminal and the second terminal; and a participation determination unit configured to allow the third terminal to participate in the already established session when the start request information designates absence of the participation restriction, and to prohibit the third terminal from participating in the already established session when the start request information designates presence of the participation restriction, wherein when the participation determination unit allows participation in the already established session, the session management unit lets the third terminal to participate in the already established session.

The present invention also provides a communication method using a communication system that comprises a plurality of terminals, a start request information obtaining unit, a session management unit, a participation request information obtaining unit, and a participation determination unit, the communication method comprising: obtaining, by the start request information obtaining unit, information for requesting start of a session between a first terminal and a second terminal of the plurality of terminals, the start request information including designation indicating presence/absence of participation restriction for allowing/restricting a terminal, other than the first terminal and the second terminal, to/from participating in the session; establishing, by the session management unit, a session between the first terminal and the second terminal in accordance with the start request information; obtaining, by the participation request information obtaining unit, participation request information with which a third terminal of the plurality of terminals requests participating in the already established session that has already been established between the first terminal and the second terminal; and allowing, by the participation determination unit, the third terminal to participate in the already established session when the start request information designates absence of the participation restriction, and prohibiting the third terminal from participating in the already established session when the start request information designates presence of the participation restriction, wherein when the allowing by the participation determination unit allows participation in the already established session, the establishing by the session management unit lets the third terminal to participate in the already established session.

The present invention also provides a non-transitory computer-readable recording medium that contains a computer program that causes a computer communicating with a plurality of terminals to function as: a start request information obtaining unit configured to obtain information for requesting start of a session between a first terminal and a second terminal of the plurality of terminals, the start request information including designation indicating presence/absence of participation restriction for allowing/restricting a terminal, other than the first terminal and the second terminal, to/from participating in the session; a session management unit configured to establish a session between the first terminal and the second terminal in accordance with the start request information; a participation request information obtaining unit configured to obtain participation request information with which a third terminal of the plurality of terminals requests participating in the already established session that has already been established between the first terminal and the second terminal; and a participation determination unit configured to allow the third terminal to participate in the already established session when the start request information designates absence of the participation restriction, and to prohibit the third terminal from participating in the already established session when the start request information designates presence of the participation restriction, and a second session management unit configured to let third terminal to participate in the already established session when the participation determination unit allows participation in the already established session.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a conceptual diagram illustrating a relay device management table;

FIG. 10 is a conceptual diagram illustrating a terminal authentication management table;

FIG. 11 is a conceptual diagram illustrating a terminal management table;

FIG. 12 is a conceptual diagram illustrating a destination list management table;

FIG. 13 is a conceptual diagram illustrating a session management table;

FIG. 14 is a conceptual diagram illustrating a quality management table;

FIG. 15 is a conceptual diagram illustrating a relay device selection management table;

FIG. 16 is a conceptual diagram illustrating a state change management table;

FIG. 17 is a conceptual diagram illustrating a state change management table;

DETAILED DESCRIPTION OF THE PREFERRED EMBODIMENTS

Figure 1:
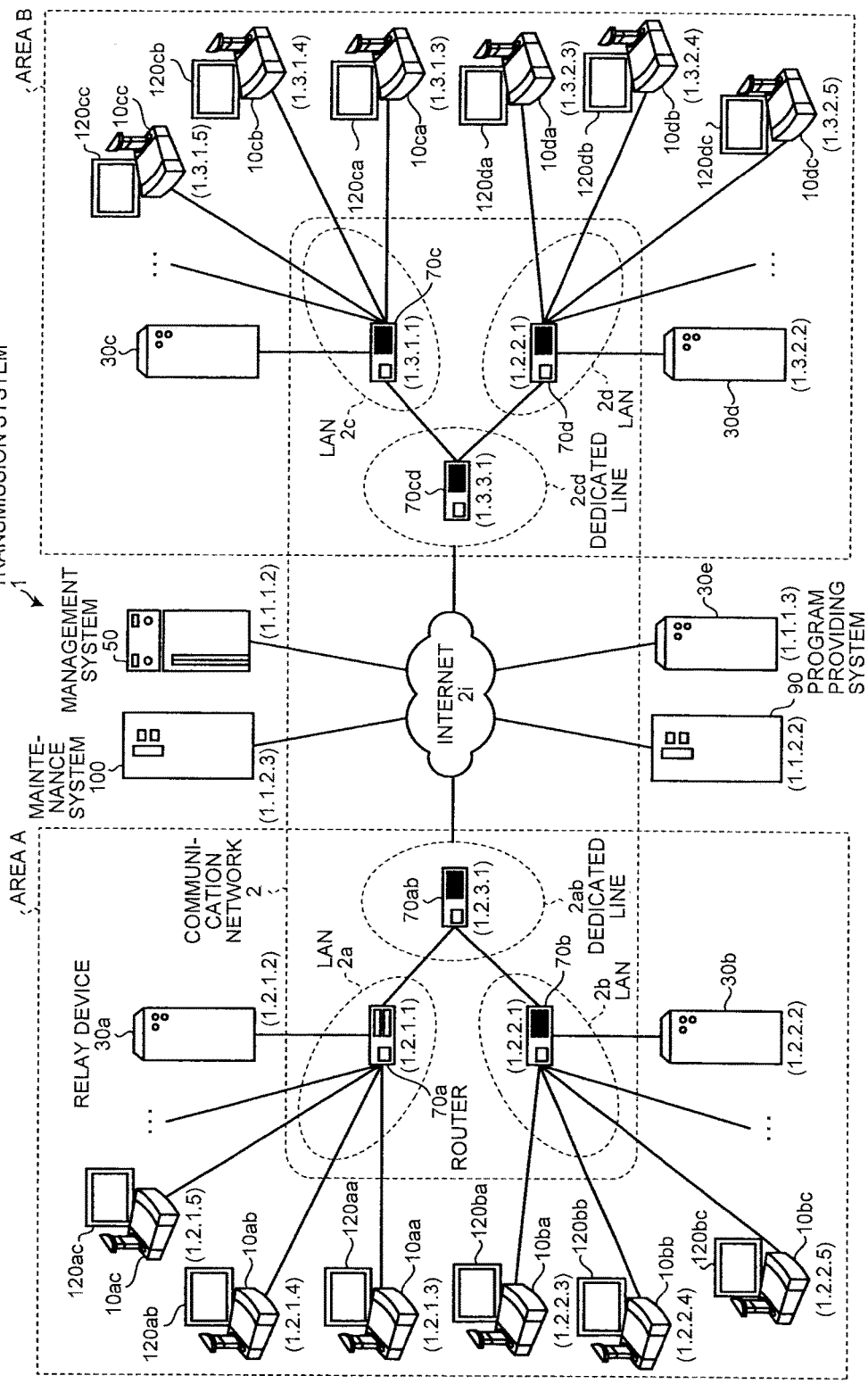
FIG. 1 is a schematic diagram illustrating a transmission system.

An embodiment of a communication system, a communication method and a program contained in a computer-readable recording medium will be described in detail below with reference to the accompanying drawings. FIG. 1 is a block diagram illustrating a configuration of a communication system and a program according to an embodiment.

Overall Configuration of Embodiment

Hereinafter, an embodiment of a communication system and a program will be explained in detail with reference to FIGS. 1 to 41. FIG. 1 is a schematic diagram illustrating a transmission system 1 serving as a communication system according to the embodiment. First, overview of the present embodiment will be explained with reference to FIG. 1.

Examples of transmission system 1 include a data providing system in which one transmission terminal transmits content data one-way to another transmission terminal via a transmission management system, and a communication system in which information, feelings and the like are mutually transmitted among a plurality of transmission terminals via a transmission management system. The communication system is a system for mutually transmitting information, feelings and the like among a plurality of communication terminals (corresponding to "transmission terminals") via a communication management system (corresponding to a "transmission management system"), and examples thereof include a teleconference system, a videophone system, an audio teleconference system, a voice call system, and a personal computer (PC) screen sharing system.

In the embodiment, a transmission system 1, a transmission management system 50, and a transmission terminal 10 will be described assuming a teleconference system as an example of the communication system, a teleconference management system as an example of the communication management system, and a teleconference terminal as an example of a communication terminal. Thus, the communication system according to the present invention is also applied to a communication system or a transmission system in addition to a teleconference system.

The transmission system 1 as illustrated in FIG. 1 includes multiple transmission terminals (10aa, 10ab, ... ), displays (120aa, 120ab, ... ) for the transmission terminals (10aa, 10ab, ... ), multiple relay devices (30a, 30b, 30c, 30d, 30e), a transmission management system 50, a program providing system 90, and a maintenance system 100. Hereinafter, the "transmission terminal" will be simply referred to as a "terminal", and the "transmission management system" will be simply referred to as a "management system".

In the present embodiment, any one of the transmission terminals (10aa, 10ab, ... ) is represented by a "transmission terminal 10". Any one of the displays (120aa, 120ab, ... ) is represented by a "display 120". Any one of the relay devices (30a, 30b, 30c, 30d, 30e) is represented by a "relay device 30".

The transmission terminal 10 transmits and receives various kinds of information with another device. The transmission terminal 10 establishes, for example, a session with another terminal 10, and in the established session, the transmission terminal 10 communicates by transmission and reception of content data including voice data and image data. Accordingly, in the transmission system 1, teleconference is achieved between multiple terminals 10.

Hereinafter, "image data and voice data" will be referred to as "content data". The data transmitted between the terminals 10 are not limited to the embodiment. In another example, the content data may be text data. In still another example, the content data may include not only voice data and image data but also text data. The image data may be either a motion image or a still picture. Alternatively, the image data may include both of the motion image and the still picture.

When teleconference is started in the transmission system 1 according to the present embodiment, a user who wants to start the teleconference operates a predetermined terminal 10, and the terminal 10 operated by the user transmits start request information to the management system 50.

In this case, the start request information is information for starting a session used for the teleconference, and includes information designating a terminal 10 which is the other party in the session. Hereinafter, the terminal 10 that transmits the start request information will be referred to as a start requesting terminal. The terminal 10 of the other party that is designated as the other party in the session will be referred to as a destination terminal.

The destination terminal (the other party) in the session may include a terminal 10 or may include two or more terminals 10. More specifically, in the transmission system 1, teleconference can be achieved using a session established between not only two terminals 10 but also three or more terminals 10.

Further, in the transmission system 1 according to the present embodiment, another user can participate in a teleconference for which the session has already been established and which has already been started. A user who wants to participate the teleconference operates a predetermined terminal 10, and the terminal 10 operated by the user transmits, to the management system 50, participation request information which is used for the teleconference which the user wants to participate in and which designates the established session (hereinafter referred to as already established session). Hereinafter, the terminal 10 transmitting the participation request information will be referred to as a participation requesting terminal.

The management system 50 manages the terminal 10 and the relay device 30 in an integrated fashion. The management system 50 establishes a session with the terminal 10, thus achieving teleconference by communication and the like between the terminals 10.

When the management system 50 receives the start request information of the session from the predetermined terminal 10, the management system 50 establishes a session between the terminal 10 having transmitted the start request information (start requesting terminal) and the destination terminal, and starts teleconference. Further, when the management system 50 receives participation request information for participating in the session that is already established from the predetermined terminal 10 (hereinafter referred to as already established session), the management system 50 determines whether or not to allow the participation requesting terminal to participate in the already established session.

Multiple routers (70a, 70b, 70c, 70d, 70ab, 70cd) as illustrated in FIG. 1 select optimum paths of content data. In the present embodiment, any one of the routers (70a, 70b, 70c, 70d, 70ab, 70cd) is represented by a "router 70". The relay device 30 relays content data between multiple terminals 10.

The program providing system 90 includes an HD (Hard Disk), not illustrated, storing programs for the terminals for allowing a terminal 10 to achieve various kinds of functions or various kinds of units, and can transmit programs for terminals to the terminal 10. The HD of the program providing system 90 also stores programs for relay device 30 for causing the relay device 30 to implement various kinds of functions or various kinds of units, and can transmit the programs for relay devices to the relay device 30. Further, the HD of the program providing system 90 also stores programs for managing transmission for causing the management system 50 to achieve various kinds of functions or various kinds of units, and can transmit the programs for managing transmission to the management system 50.

The maintenance system 100 is a computer for maintaining, managing, and repairing at least one of the terminal 10, the relay device 30, the management system 50, and the program providing system 90. For example, when the maintenance system 100 is installed in this country, and the terminal 10, the relay device 30, the management system 50, or the program providing system 90 are installed outside of this country, then, the maintenance system 100 performs maintenance, e.g., maintaining, managing, and repairing, of at least one of the terminal 10, the relay device 30, the management system 50, and the program providing system 90 in a remote manner via the communication network 2. In addition, without relying on the communication network 2, the maintenance system 100 performs maintenance such as management of model number, serial number, purchaser, maintenance and inspection, or failure history with regard to at least one of the terminal 10, the relay device 30, the management system 50, and the program providing system 90.

The terminals (10aa, 10ab, 10ac, 10a . . . ), the relay device 30a, and the router 70a are connected via a LAN 2a in a manner capable of communicating with one another. The terminals (10ba, 10bb, 10bc, 10b . . . ), the relay device 30b, and the router 70b are connected via a LAN 2b in a manner capable of communicating with one another. The LAN 2a and the LAN 2b are connected via a dedicated line 2ab including a router 70ab in a manner capable of communicating therebetween and built in a predetermined area A. For example, the area A is Japan, and the LAN 2a is built in an office in Tokyo and the LAN 2b is built in an office in Osaka.

On the other hand, the terminals (10ca, 10cb, 10cc, 10c . . . ), the relay device 30c, and the router 70c are connected via a LAN 2c in a manner capable of communicating with one another. The terminals (10da, 10db, 10dc, 10d . . . ), the relay device 30d, and the router 70d are connected via a LAN 2d in a manner capable of communicating with one another. The LAN 2c and the LAN 2d are connected via a dedicated line 2cd including a router 70cd in a manner capable of communicating therebetween and built in a predetermined area B. For example, the area B is the United States, and the LAN 2c is built in an office in New York and the LAN 2d is built in an office in Washington D.C. The area A and the area B are connected in a manner capable of communicating therebetween via the Internet 2i through the routers (70ab, 70cd), respectively.

The management system 50 and the program providing system 90 are connected via the Internet 2i with the terminal 10 and the relay device 30 in a manner capable of communicating therewith. The management system 50 and the program providing system 90 may be installed in an area A or an area B, or may be installed in areas other than those.

The relay device 30e is connected via the communication network 2 to the terminal 10 in a manner capable of communicating therewith. This relay device 30e is operating at all times, and in order to avoid being affected by the amount of communication within the local area of the area A or area B, the relay device 30e is installed outside of these areas. Accordingly, when the terminal 10 communicates with a terminal installed in another local area, the relay device 30e is used as the relay device for relaying content data. When communicating between terminals in the same local area, and the relay device installed in this local area is not operating, the relay device 30e is used as an emergency relay device.

In the embodiment, the LAN 2a, the LAN 2b, the dedicated line 2ab, the Internet 2i, the dedicated line 2cd, the LAN 2c and the LAN 2d constitute a communication network 2 of the embodiment. The communication network 2 may include part where communication is made wirelessly as well as part where wire communication is used.

In FIG. 1, four numbers indicated below each terminal 10, each relay device 30, the management system 50, each router 70, the program providing system 90, and the maintenance system 100 denote IP addresses of generally-available IPv4 in a simplified manner. For example, the IP address of the terminal 10aa is "1.2.1.3". Instead of IPv4, IPv6 may be used, but for the sake of simplicity of explanation, IPv4 is used in the explanation.

Hardware Configuration of the Embodiment

Figure 4:
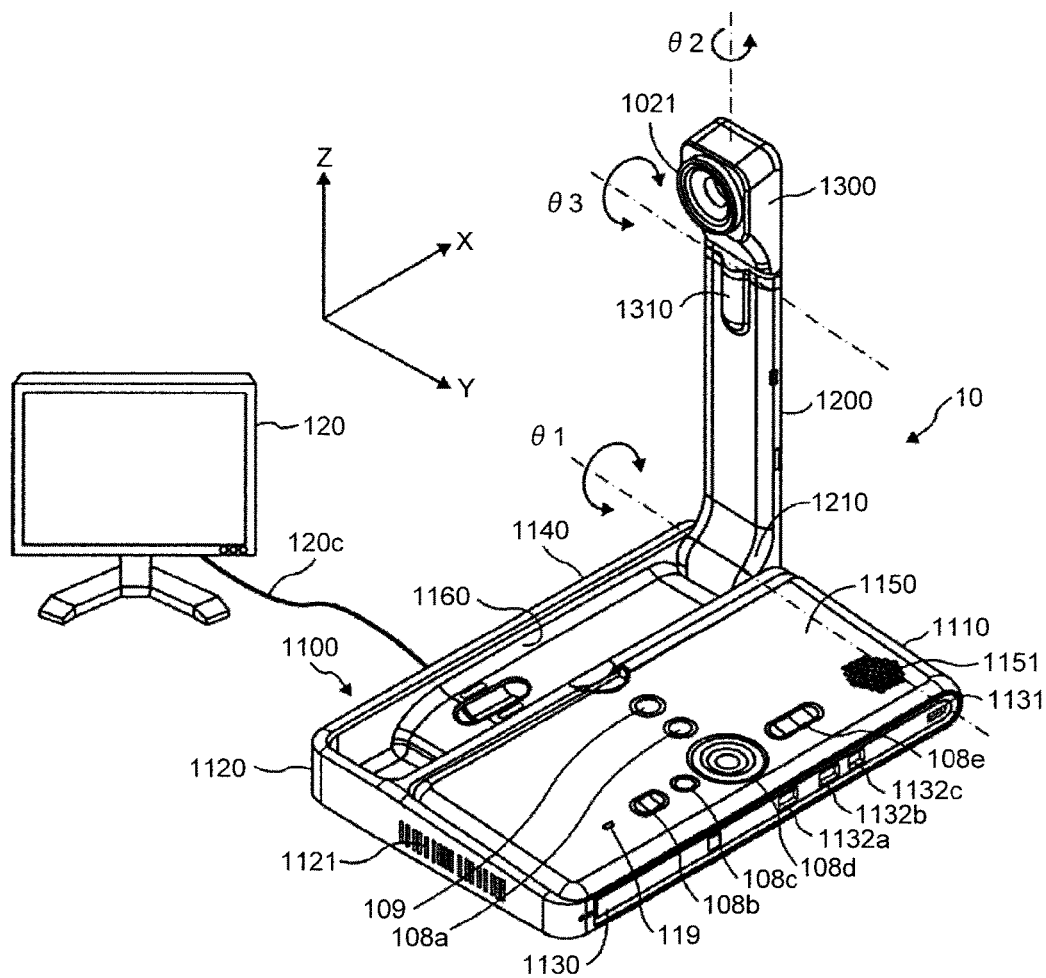
FIG. 4 is an external view illustrating a transmission terminal.

Subsequently, the hardware configuration of the present embodiment will be explained. FIG. 4 is an external view illustrating a terminal 10. In the explanation below, the longitudinal direction of the terminal 10 will be denoted as X axis direction, a direction perpendicular to the X axis direction within a horizontal plane will be denoted as Y axis direction, and a direction perpendicular to the X axis direction and the Y axis direction (vertical direction) will be denoted as Z axis direction.

As illustrated in FIG. 4, the terminal 10 includes a housing 1100, an arm 1200, a camera 1021, and a camera housing 1300. Among them, a front side wall surface 1110 of the housing 1100 is provided with an air suction surface, not illustrated, formed by multiple air suction holes, and a rear side wall surface 1120 of the housing 1100 is provided with an exhaust surface 1121 formed by multiple air discharge holes. Accordingly, when a cooling fan incorporated into the housing 1100 is driven, external air at the back of the terminal 10 is retrieved via the air suction surface, not illustrated, and the air can be discharged to the back side of the terminal 10 via the exhaust surface 1121. The right side wall surface 1130 of the housing 1100 is formed with sound collection hole 1131, and a built-in microphone 114 explained later can collect sound such as voice, sound, and noise.

An operation panel 1150 is formed at the right side wall surface 1130 of the housing 1100. This operation panel 1150 is provided with multiple operation buttons (108a to 108e) explained later, a power supply switch 109 explained later, and an alarm lamp 119 explained later, and is formed with a sound output surface 1151 formed by multiple voice output holes which pass output sound from a built-in speaker 115 explained later. At the left side wall surface 1140 of the housing 1100, a container unit 1160 is formed. The container unit 1160 is a recessed portion for accommodating the arm 1200 and the camera housing 1300. At the right side wall surface 1130 of the housing 1100, multiple connection ports (1132a to 1132c) are provided. The multiple connection ports (1132a to 1132c) electrically connect cables to an external device connection I/F 118 explained later. On the other hand, at the left side wall surface 1140 of the housing 1100, a connection port, not illustrated, is provided. The connection port electrically connects a cable 120c for the display 120 to the external device connection I/F 118 explained later.

In the explanation below, any one of the operation buttons (108a to 108e) is represented by an "operation button 108", and any one of the connection ports (1132a to 1132c) is represented by a "connection port 1132".

Subsequently, the arm 1200 is attached via a torque hinge 1210 to the housing 1100, and the arm 1200 is configured to be able to pivot in the upward and downward direction within a range of a tilt angle θ1 which is 135 degrees with respect to the housing 1100. FIG. 4 illustrates a state where the tilt angle θ1 is 90 degrees.

The camera housing 1300 is provided with a built-in camera 112 explained later, and can capture an image of a user, a document, a room, and the like. The camera housing 1300 is formed with the torque hinge 1310. The camera housing 1300 is attached via the torque hinge 1310 to the arm 1200. The camera housing 1300 is in turn attached via the torque hinge 1310 to the arm 1200, and the camera housing 1300 is configured to be able to pivot in the upward and downward direction within a range of a pan angle θ2 which is ±180 degrees, with the state as illustrated in FIG. 4 being 0 degrees, with respect to the arm 1200 and within a range of a tilt angle θ3 which is ±45 degrees.

Another example of terminal 10 may be a generally-available personal computer. When a computer used as the terminal 10 does not have any microphone or camera, external microphone and camera may be connected to the computer. Accordingly, a generally-available computer may be used as a terminal 10 according to the present embodiment. When a generally-available computer is used as the terminal 10, an application for executing the processing of the terminal 10 explained later may be installed to the computer.

The relay device 30, the management system 50, the program providing system 90, and the maintenance system 100 have the same external appearance as that of a generally-available server/computer, and therefore description about the external appearance is omitted.

Figure 2:
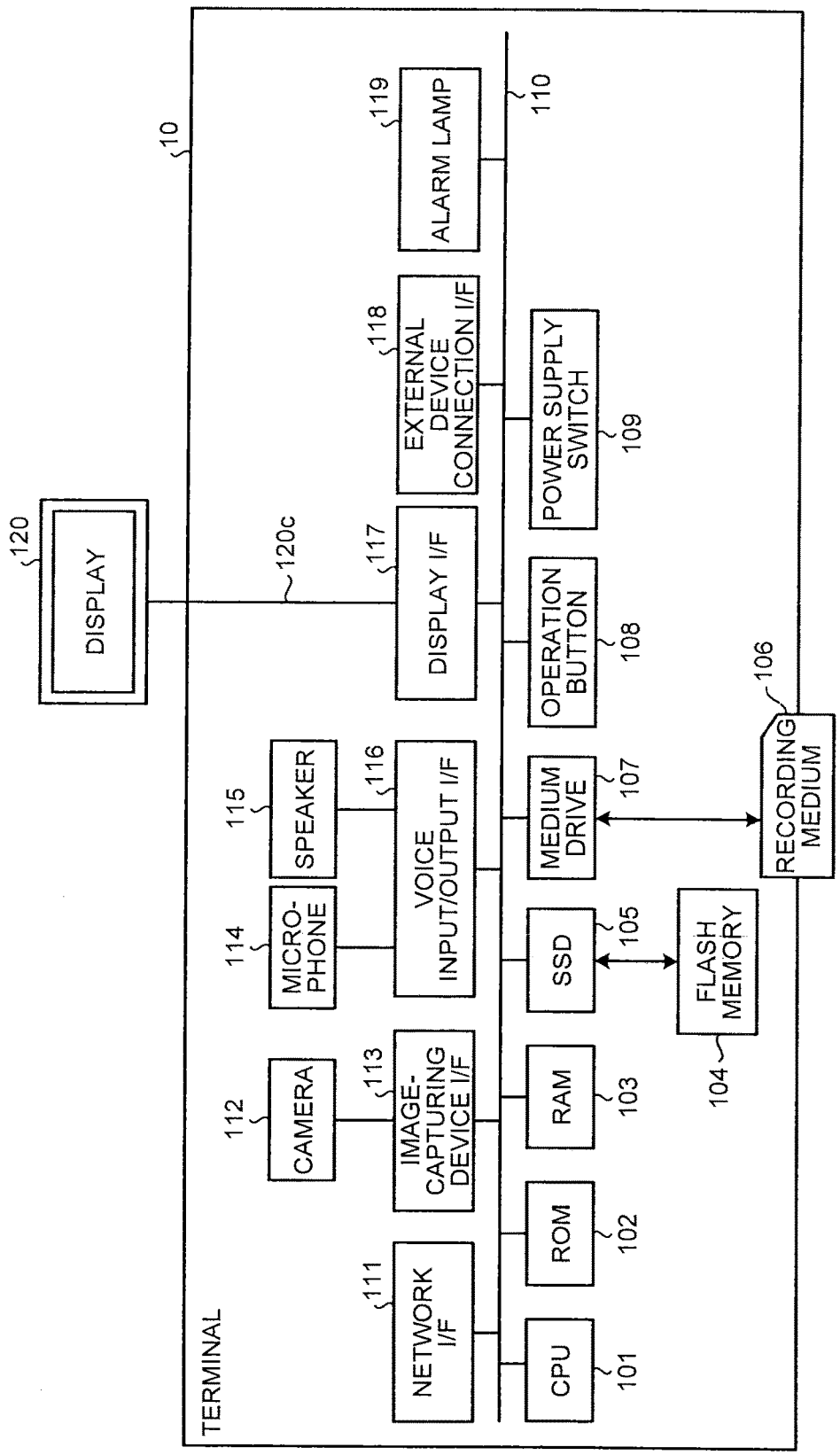
FIG. 2 is a hardware configuration diagram illustrating a transmission terminal.

FIG. 2 is a hardware configuration diagram illustrating a terminal 10 according to an embodiment of the present invention. As illustrated in FIG. 2, the terminal 10 of the present embodiment includes a CPU (Central Processing Unit) 101 controlling overall operation of the terminal 10, a ROM (Read Only Memory) 102 storing programs for terminals, a RAM (Random Access Memory) 103 used as a work area for the CPU 101, a flash memory 104 storing various kinds of data such as image data and voice data, an SSD (Solid State Drive) 105 for controlling reading or writing of various kinds of data to/from the flash memory 104 in accordance with the control of the CPU 101, a medium drive 107 for controlling reading or writing (storing) of data to/from the recording medium 106 such as flash memory, an operation button 108 operated when the destination of the terminal 10 is selected, a power supply switch 109 for switching ON/OFF of the power of the terminal 10, and a network I/F (Interface) 111 for transmitting data using the communication network 2 explained later.

The terminal 10 also includes the built-in camera 112 for obtaining image data by capturing an image of a subject in accordance with the control of the CPU 101, an image-capturing device I/F 113 for controlling driving of the camera 112, a built-in microphone 114 for inputting voice, the built-in speaker 115 for outputting voice, a voice input/output I/F 116 for processing input/output of the voice signal with the microphone 114 and the speaker 115 in accordance with the control of the CPU 101, a display I/F 117 for transmitting image data to the externally attached display 120 in accordance with the control of the CPU 101, an external device connection I/F 118 for connecting various kinds of external devices, the alarm lamp 119 for notifying abnormality of various kinds of functions of the terminal 10, and a bus line 110 such as an address bus and a data bus for electrically connecting each of the above constituent elements as illustrated in FIG. 2.

The display 120 is a display unit made of liquid crystal or organic EL that displays images of subjects, icons for operation, and the like. The display 120 is connected to the display I/F 117 via a cable 120c. The cable 120c may be a cable for analog RGB (VGA) signals, a cable for component video, or a cable for a high-definition multimedia interface (HDMI) or digital video interactive (DVI) signals.

The camera 112 includes a lens and a solid state image-capturing device for making the image (video) of the subject into an electronic form by converting light into electrical charge. A CMOS (Complementary Metal Oxide Semiconductor), a CCD (Charge Coupled Device), and the like are used as the solid state image-capturing device.

External devices such as an external camera, an external microphone, and an external speaker can each be electrically connected to the external device connection I/F 118 via a USB (Universal Serial Bus) cable and the like inserted into the connection port 1132 of the housing 1100 as illustrated in FIG. 4. When an external camera is connected, the external camera is driven in precedence to the built-in camera 112 according to the control of the CPU 101. Similarly, when an external microphone is connected or when an external speaker is connected, the external microphone or the external speaker is driven in precedence to the built-in microphone 114 or the built-in speaker 115 according to the control of the CPU 101.

Note that the recording medium 106 is attachable/removable to/from the terminal 10. The memory is not limited to the flash memory 104, and may be any nonvolatile memory from/into which data are read/written according to the control of the CPU 101 such as electrically erasable and programmable ROM (EEPROM).

Further, the programs for terminals may be recorded and distributed on a computer readable recording medium (the recording medium 106) in a form of a file that can be installed or executed. The programs for terminals may not be recorded in the flash memory 104 and may be recorded in the ROM 102.

Figure 3:
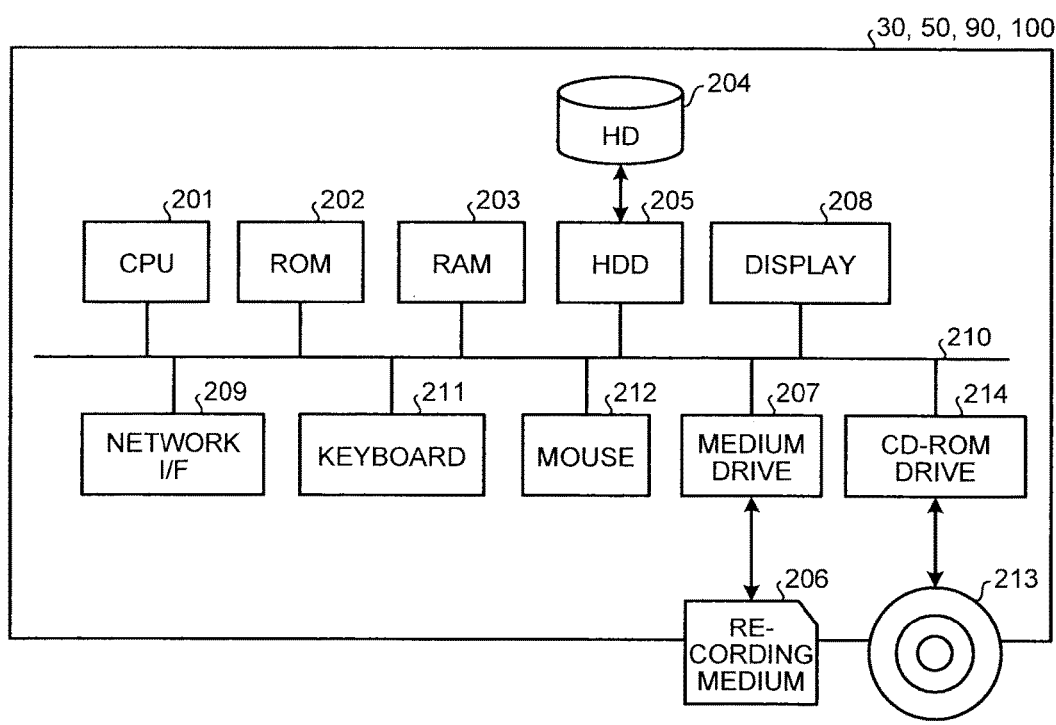
FIG. 3 is a hardware configuration diagram illustrating a transmission management system, a relay device, a program providing system, or a maintenance system.

FIG. 3 is a hardware configuration diagram illustrating a management system according to an embodiment of the present invention. The management system 50 includes a CPU 201 controlling overall operation of the management system 50, a ROM 202 storing programs for managing transmission, a RAM 203 used as a work area for the CPU 201, an HD (Hard Disk) 204 storing various kinds of data, an HDD (Hard Disk Drive) 205 for controlling reading or writing of various kinds of data to/from the HD 204 in accordance with the control of the CPU 201, a medium drive 207 for controlling reading or writing (storing) of data to/from the recording medium 206 such as flash memory, a display 208 displaying various kinds of information such as cursor, menu, window, character, or image, a network I/F 209 for transmitting data using the communication network 2 explained later, a keyboard 211 having multiple keys for inputting characters, numerical values, and various kinds of command, a mouse 212 for making selection and executing various kinds of commands, making selection of a processing target, moving a cursor, and the like, a CD-ROM drive 214 for controlling reading or writing of data to/from the CD-ROM (Compact Disc Read Only Memory) 213 which is an example of recording medium that can be attached and detached, and a bus line 210 such as an address bus and a data bus for electrically connecting each of the above constituent elements as illustrated in FIG. 3.

The programs for managing transmission may be recorded and distributed on a computer readable recording medium such as the recording medium 206 and the CD-ROM 213 described above in a form of a file that can be installed or executed.

The relay device 30 has the same hardware configuration as that of the management system 50, and therefore, description thereabout is omitted. However, the ROM 202 records programs for the relay device for controlling the relay device 30. The programs for the relay device may be recorded and distributed on a computer readable recording medium such as the recording medium 206 and the CD-ROM 213 described above in a form of a file that can be installed or executed.

The program providing system 90 has the same hardware configuration as that of the management system 50, and therefore, description thereabout is omitted. However, the ROM 202 records program for providing programs for controlling the program providing system 90. The program for providing programs may be recorded and distributed on a computer readable recording medium such as the recording medium 206 and the CD-ROM 213 described above in a form of a file that can be installed or executed.

The maintenance system 100 has the same hardware configuration as that of the management system 50, and therefore, description thereabout is omitted. However, the ROM 202 records programs for maintenance which controls the maintenance system 100. The programs for maintenance may be recorded and distributed on a computer readable recording medium such as the recording medium 206 and the CD-ROM 213 described above in a form of a file that can be installed or executed.

Other examples of detachable recording media include computer-readable recording media such as a CD-R (Compact Disc Recordable), a DVD (Digital Versatile Disk), a Blu-ray disk, and the programs for maintenance may be recorded and provided therein.

Functional Configuration of the Embodiment

Figure 5:
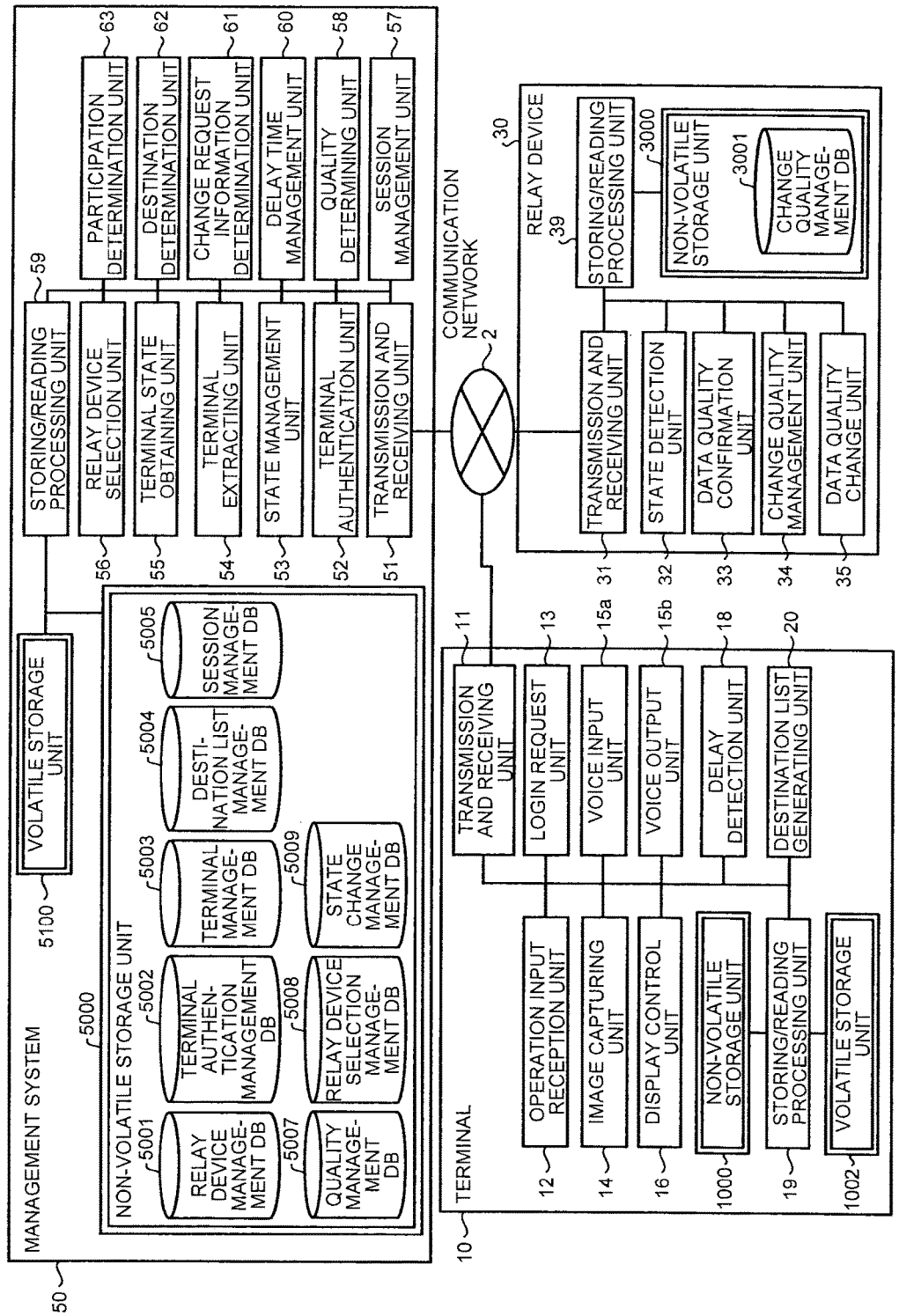
FIG. 5 is a functional block diagram illustrating each terminal, device, and system constituting the transmission system.

Subsequently, the functional configuration of the embodiment of the present embodiment will be explained. FIG. 5 is a functional block diagram illustrating each terminal, device, and system constituting the transmission system 1 of the present embodiment. In FIG. 5, the terminal 10, the relay device 30, and the management system 50 are connected to be able to communicate data via the communication network 2. The program providing system 90 and the maintenance system 100 illustrated in FIG. 1 are not directly related to teleconference communication, and therefore, they are omitted in FIG. 5.

Functional Configuration of the Terminal

The terminal 10 includes a transmission and receiving unit 11, an operation input reception unit 12, a login request unit 13, an image capturing unit 14, a voice input unit 15a, a voice output unit 15b, a display control unit 16, a delay detection unit 18, a storing/reading processing unit 19, and a destination list generating unit 20. These units are functions implemented or means caused to function by any of the constituent elements illustrated in FIG. 2 operating by commands from the CPU 101 according to the programs stored in the RAM 103. The terminal 10 also includes a volatile storage unit 1002 structured by the RAM 103 as illustrated in FIG. 2 and a non-volatile storage unit 1000 structured by the flash memory 104 as illustrated in FIG. 2.

Each Functional Unit of the Terminal

Subsequently, the details of each unit of the terminal will be explained. The transmission and receiving unit 11 of the terminal 10 is achieved by the network I/F 111 illustrated in FIG. 2, and transmits and receives various kinds of data (or information) to/from other terminals, devices, or systems via the communication network 2.

Before the terminal 10 establishes a session with another terminal 10 and starts teleconference by communication, the transmission and receiving unit 11 starts receiving the state information indicating the state of each of the terminals 10 serving as a destination terminal candidate from the management system 50.

In this case, the destination terminal candidate is a terminal 10 that can be designated as a terminal with which the terminal 10 conducts teleconference, i.e., the other party in the session. More specifically, the terminal 10 cannot establish a session with a terminal that is not set as the destination terminal candidate in advance, and therefore, cannot conduct teleconference. The destination terminal candidate is a candidate of terminal with which teleconference is conducted, i.e., teleconferencing terminal candidate.

This state information indicates detailed state (hereinafter referred to as communication state) indicating, e.g., as to whether the operation state of each terminal 10 (the state indicating whether the terminal is in ON line or OFF line) and whether the terminal is communicating or not when it is in ON line. This state information indicates not only the operation state and the communication state of the each terminal 10 but also various states, e.g., the cable is disconnected from the terminal 10, voice can be output but image cannot be output, and setting does not allow output of voice (MUTE). In the explanation below, for example, a case will be explained where the state information indicates the operation state and the communication state.

The transmission and receiving unit 11 also transmits start request information to the management system 50 when the terminal 10 operates as the start requesting terminal. In this case, the start request information is information for requesting start of session used for the teleconference. More specifically, the start request information includes information indicating request of start, a terminal ID of the start requesting terminal which is the source of transmission of the start request information, a terminal ID for identifying the destination terminal which is the other party in the session, and restriction information indicating whether or not there is participation restriction for restricting a terminal other than the destination terminal from participating in the session. The terminal ID is information for identifying the terminal 10.

More specifically, the start request information includes "Invite" or "Private Invite". In this case, "Invite" is information indicating request of start and is restriction information indicating absence of participation restriction. On the other hand, "Private Invite" is information indicating request of start and is restriction information indicating presence of participation restriction.

Hereinafter, the restriction information will be described in detail. In the transmission system 1 according to the present embodiment, another terminal 10 can participate in the session that is already established. However, in some conferences, it is desired not to allow other terminals 10 to participate in the conference when highly confidential conference is conducted. Therefore, in the transmission system 1 according to the present embodiment, participation of another terminal 10 to the already established session is restricted in accordance with whether or not there is participation restriction indicated by the restriction information.

The transmission and receiving unit 11 also transmits the participation request information to the management system 50 when the terminal 10 operates as the participation requesting terminal. In this case, the participation request information is information for requesting participation in an already established session that is used in a teleconference already started. More specifically, the participation request information is information including information "Call" indicating the participation request information, a terminal ID of the participation requesting terminal which is the source of transmission of the participation request information, and a terminal ID of the participating terminal that is participating in the already established session in which it is desired to participate. In this case, more specifically, the participating terminal is the start requesting terminal or destination terminal indicated by the start request information that is transmitted when the already established session is started. In this case, the transmission and receiving unit 11 functions as a start request information obtaining unit for obtaining the start request information and a participation request information obtaining unit for obtaining the participation request information.

The operation input reception unit 12 is achieved by the operation button 108 and the power supply switch 109 as illustrated in FIG. 2, and receives various kinds of inputs from users. For example, when the user turns on the power supply switch 109 as illustrated in FIG. 2, the operation input reception unit 12 as illustrated in FIG. 5 receives the power-ON and turns on the power.

The login request unit 13 is achieved with commands given by the CPU 101 as illustrated in FIG. 2, and upon receiving power-ON, the login request unit 13 automatically transmits login request information indicating request of login and the current IP address of the terminal 10 from the transmission and receiving unit 11 via the communication network 2 to the management system 50. When the user changes the power supply switch 109 from the ON state to the OFF state, the transmission and receiving unit 11 transmits state information for turning off the power to the management system 50 and then the operation input reception unit 12 completely turns off the power. As a result, the management system 50 can find that the terminal 10 is changed from the power ON state to the power OFF state.

The image capturing unit 14 is achieved with commands given by the CPU 101 as illustrated in FIG. 2, the camera 112, and the image-capturing device I/F 113 as illustrated in FIG. 2, and captures an image of a subject, and outputs image data obtained by capturing the image. The voice input unit 15a is achieved with the voice input/output I/F 116 as illustrated in FIG. 2, and after the microphone 114 converts user's voice into voice signal, the voice data about the voice signal are input into the voice input unit 15a. The voice output unit 15b is achieved with commands given by the CPU 101 as illustrated in FIG. 2 and the voice input/output I/F 116 as illustrated in FIG. 2, and outputs the voice signal about the voice data to the speaker 115 to output the voice from the speaker 115.

The display control unit 16 is achieved with the display I/F 117 as illustrated in FIG. 2, and performs control so as to transmit image data to the external display 120. Before the terminal 10, which is the source of the request, starts communication of teleconference with the terminal 10, which is the desired destination, the display control unit 16 displays, on the display 120, a destination list including the destination names upon reflecting the state information received after the start of reception by the transmission and receiving unit 11.

The delay detection unit 18 is achieved with commands given by the CPU 101 as illustrated in FIG. 2, and detects a delay time (ms) of image data or voice data transmitted from another terminal 10 via the relay device 30.

The storing/reading processing unit 19 is executed by a command given by the CPU 101 as illustrated in FIG. 2 and for example the SSD 105 as illustrated in FIG. 2, and performs processing to store various kinds of data to the non-volatile storage unit 1000 and read various kinds of data stored in the non-volatile storage unit 1000. This non-volatile storage unit 1000 stores a terminal ID (Identification), a password, and the like for identifying the terminal 10. Further, the storing/reading processing unit 19 also performs processing to store various kinds of data to the volatile storage unit 1002 and read various kinds of data stored in the volatile storage unit 1002. In this volatile storage unit 1002, the content data received during communication with the destination terminal are overwritten on every reception. Among them, an image is displayed on the display 120 using the image data before overwritten, and voice is output from the speaker 115 using the voice data before overwritten.

Figure 23:
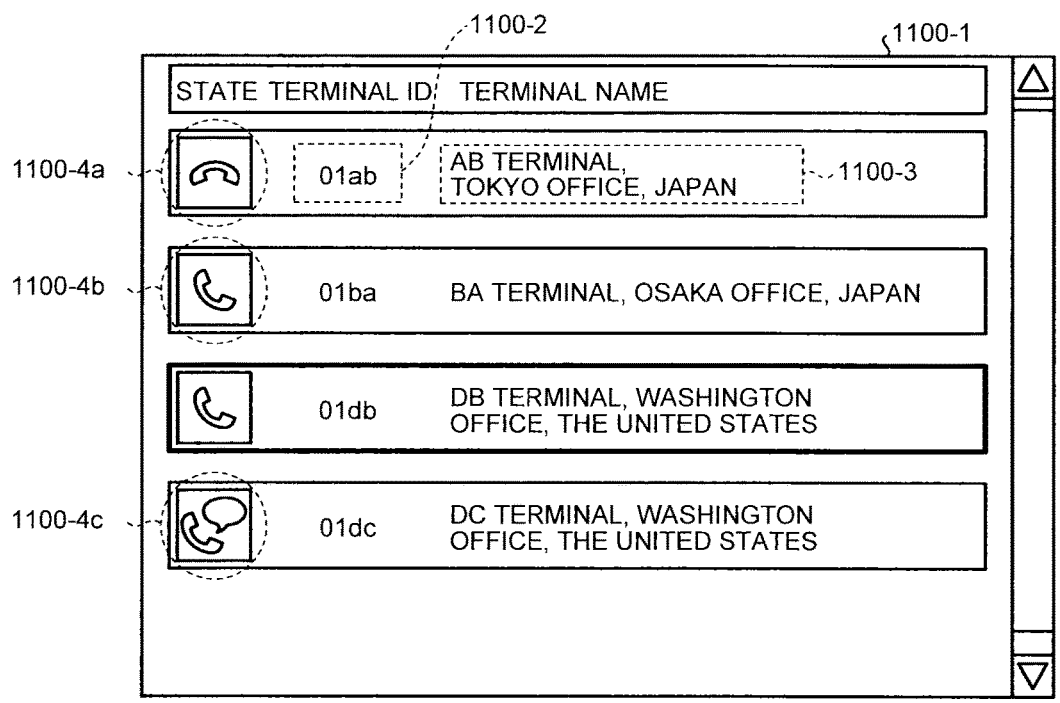
FIG. 23 is a figure illustrating an example of display of a destination list.

On the basis of the state information of the terminal 10 serving as each destination candidate explained later and destination list information explained later which are received from the management system 50, the destination list generating unit 20 generates and updates the destination list in which the state of a destination candidate is indicated by an icon as illustrated in FIG. 23.

Functional Configuration of the Relay Device

Subsequently, the function or means of the relay device 30 will be explained. The relay device 30 includes a transmission and receiving unit 31, a state detection unit 32, a data quality confirmation unit 33, a change quality management unit 34, a data quality change unit 35, and a storing/reading processing unit 39. These units are functions implemented or means caused to function by any of the constituent elements illustrated in FIG. 3 operating by commands from the CPU 201 according to the programs stored in the ROM 202. The relay device 30 is structured by the HD 204 illustrated in FIG. 3, and includes a non-volatile storage unit 3000 maintaining storage of various kinds of data and information even when the relay device 30 is turned off.

Change Quality Management Table

Figures 6, 7:
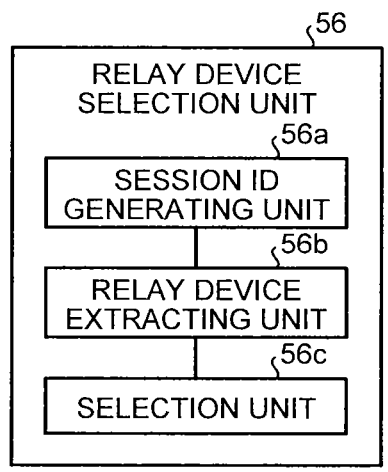
FIG. 6 is a functional block diagram illustrating the details of the relay device selection unit of FIG. 5.
FIG. 7 is a conceptual diagram illustrating a change quality management table.

A change quality management DB (Data Base) 3001 constituted by the change quality management table as illustrated in FIG. 7 is structured in the non-volatile storage unit 3000. FIG. 7 is a conceptual diagram illustrating the change quality management table. In the change quality management table, the IP address of the terminal 10 serving as the destination of relaying of the image data and the image quality of image data relayed by the relay device 30 to the destination of relaying are managed in association with each other.

Figure 8A:
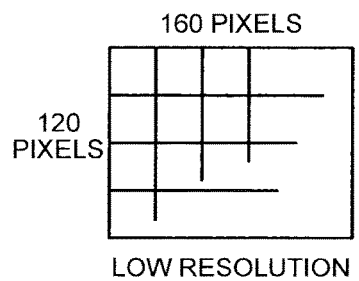
FIGS. 8(a) to 8(c) are conceptual diagrams illustrating image quality of image data.
Figure 8B:
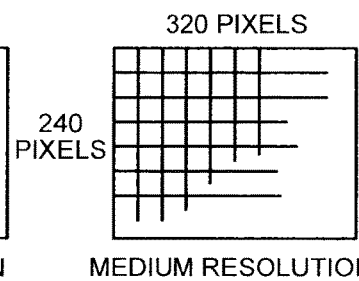
Figure 8C:
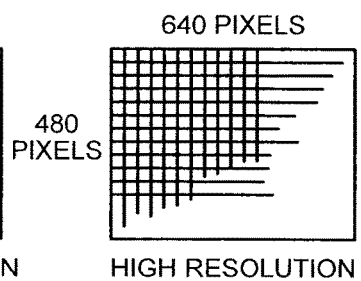

In this case, the resolution of the image of the image data treated in the present embodiment will be explained with reference to FIGS. 8(a) to 8(c). FIGS. 8(a) to 8(c) are conceptual diagrams explaining the image quality of the image data. This includes a low-resolution image serving as a base image and having 160 pixels in the horizontal direction and 120 pixels in the vertical direction as illustrated in FIG. 8(a), a medium-resolution image and having 320 pixels in the horizontal direction and 240 pixels in the vertical direction as illustrated in FIG. 8(b), and a high-resolution image and having 640 pixels in the horizontal direction and 480 pixels in the vertical direction as illustrated in FIG. 8(c). Among them, when passing through a narrow band path, low quality image data including only low-quality image data serving as the base image are relayed. When the band width is relatively broad, low resolution image data serving as the base image and medium quality image data including image data of the medium resolution are relayed. When the band width is extremely broad, low resolution image data serving as a base image quality, medium resolution image data, and high quality image data including high resolution image data are relayed. For example, in the change quality management table as illustrated in FIG. 7, when the relay device 30 relays image data to the destination terminal of the IP address "1.3.2.4", the image quality (the quality of the image) of relayed image data is "high image quality".

Each Functional Unit of Relay Device

Subsequently, each functional configuration of the relay device 30 will be explained in detail. In the explanation below, in the explanation about each unit of the relay device 30, relationship with main constituent elements for achieving the units of the relay device 30 among the constituent elements as illustrated in FIG. 3 will also be explained.

The transmission and receiving unit 31 of the relay device 30 as illustrated in FIG. 5 is achieved with the network I/F 209 as illustrated in FIG. 3, and transmits and receives various kinds of data (or information) to/from another terminal, device, or system via the communication network 2. The state detection unit 32 is achieved with commands given by the CPU 201 as illustrated in FIG. 3, and detects the operation state of the relay device 30 having this state detection unit 32. Operation states include "ON line", "OFF line", and "malfunction".

The data quality confirmation unit 33 is achieved with commands given by the CPU 201 as illustrated in FIG. 3, and searches the change quality management table (see FIG. 7) using the IP address of the destination terminal as a search key and extracts the image quality of the corresponding image data which are relayed, thus confirming the image quality of the image data which are relayed. The change quality management unit 34 is achieved with commands given by the CPU 201 as illustrated in FIG. 3, and changes the contents of the change quality management table of the change quality management DB 3001 on the basis of quality information, explained later, which is transmitted from the management system 50. For example, suppose a case where, while teleconference is being conducted by transmitting and receiving high quality image data between the start requesting terminal having the terminal ID "01aa" (terminal 10aa) and the destination terminal having the terminal ID "01db" (terminal 10db), another start requesting terminal conducting teleconference (terminal 10bb) and the destination terminal (terminal 10ca) starts teleconference via the communication network 2, whereby delay of reception of image data occurs in the destination terminal (terminal 10db). In such case, the relay device 30 relays the image quality of the image data relayed until then from the high image quality to the medium image quality. In this case, the contents of the change quality management table of the change quality management DB 3001 are changed to reduce the image quality of the image data relayed by the relay device 30 from the high image quality to the medium image quality on the basis of the quality information indicating the medium image quality.

The data quality change unit 35 is achieved with commands given by the CPU 201 as illustrated in FIG. 3, and changes the image quality of the image data, transmitted from the terminal 10 of the transmission source, on the basis of the contents of the change quality management table of the change quality management DB 3001 thus changed. The storing/reading processing unit 39 is achieved with an HDD 205 indicated in FIG. 3, and performs processing such as storing various kinds of data to the non-volatile storage unit 3000 and reading various kinds of data stored in the non-volatile storage unit 3000.

Functional Configuration of Management System

Subsequently, the function or means of the management system 50 will be explained. The management system 50 includes a transmission and receiving unit 51, a terminal authentication unit 52, a state management unit 53, a terminal extracting unit 54, a terminal state obtaining unit 55, a relay device selection unit 56, a session management unit 57, a quality determining unit 58, a storing/reading processing unit 59, a delay time management unit 60, a change request information determination unit 61, a destination determination unit 62, and a participation determination unit 63. These units are functions implemented or means caused to function by any of the constituent elements illustrated in FIG. 3 operating by commands from the CPU 201 according to the programs stored in the ROM 202. The management system 50 is structured by the HD 204 illustrated in FIG. 3, and includes a non-volatile storage unit 5000 maintaining storage of various kinds of data and information even when the management system 50 is turned off. This non-volatile storage unit 5000 stores various kinds of information. Further, the management system 50 includes a volatile storage unit 5100 structured by the RAM 203 as illustrated in FIG. 3.

Relay Device Management Table

In the non-volatile storage unit 5000, a relay device management DB 5001 constituted by the relay device management table as illustrated in FIG. 9 is structured. FIG. 9 is a conceptual diagram illustrating the relay device management table. In this relay device management table, for each of the relay device IDs identifying each relay device 30, the following information is managed in association with each other: operation state of the relay device 30, a reception date/time when the management system 50 receives the state information indicating the operation state, the IP address of the relay device 30, and the maximum data transmission speed (Mbps) of the relay device 30. For example, the relay device management table illustrated in FIG. 9 indicates that the operation state of the relay device 30a of which relay device ID is "111a" is "ON line", the date/time when the management system 50 receives the state information is "13:00 on Nov. 10, 2009", the IP address of the relay device 30a is "1.2.1.2", and the maximum data transmission speed of the relay device 30a is 100 Mbps.

Terminal Authentication Management Table

Further, in the non-volatile storage unit 5000, a terminal authentication management DB 5002 constituted by the terminal authentication management table as illustrated in FIG. 10 is structured. FIG. 10 is a conceptual diagram illustrating the terminal authentication management table. In the terminal authentication management table, each of the terminal IDs of all the terminals 10 managed by the management system 50 is managed in association with a corresponding password. In this case, the terminal ID is information for identifying the terminal 10, and the password is information used to authenticate the terminal 10. For example, the terminal authentication management table illustrated in FIG. 10 indicates that the terminal ID of the terminal 10aa is "01aa", and the password thereof is "aaaa".

The terminal ID and the relay device ID of the present embodiment are identification information such as language, character, symbol, or various kinds of marks, which are used to uniquely identify the terminal 10 and the relay device 30, respectively. Alternatively, the terminal ID and the relay device ID may be identification information made by combining at least two of the language, character, symbol, and various kinds of marks.

Terminal Management Table

In the non-volatile storage unit 5000, a terminal management DB 5003 constituted by the terminal management table as illustrated in FIG. 11 is structured. FIG. 11 is a conceptual diagram illustrating the terminal management table. In the terminal management table, for the terminal ID of each terminal 10, the following information is stored in association with each other: a terminal name, the operation state of each terminal 10, communication state with other terminals, a reception date/time when the management system 50 receives login request information explained later, and the IP address of the terminal 10.

In this case, the operation state includes an ON line which is a state in which the power is turned on and communication can be made or communication is being performed and an OFF line which is a state in which communication cannot be made, e.g., the power is not turned on.

The communication state includes "Calling" which is a state in which another terminal 10 is called, i.e., start request information of a session used for teleconference is transmitted to another terminal 10 and response is waited for, "Ringing" which is a state in which call is received from another terminal 10, i.e., start request information is received from another terminal 10 and response to the received start request information has not yet been completed, "Accepted" which is a state in which a response of permission to the start request information from another terminal 10 has been completed but the session has not yet been established and a response of permission to the start request information that the terminal in question has transmitted has been received but the session has not yet been established, "Busy" which is a state in which the session with another terminal 10 has been established and content data in the teleconference are being transmitted, and "None" which is a state in which communication with another terminal is not performed and the terminal in question is in the waiting state.

The above communication state is a communication state corresponding to a session without any participation restriction, established in accordance with start request information including restriction information indicating absence of participation restriction. Further, the management system 50 according to the present embodiment manages a communication state corresponding to a session with participation restriction, established in accordance with start request information including restriction information indicating presence of participation restriction, which is treated as a communication state different from the communication state corresponding to a session without any participation restriction. More specifically, there are "Private Calling", "Private Ringing", "Private Accepted", "Private Busy" which are communication states corresponding to sessions with participation restriction and which correspond to "Calling", "Ringing", "Accepted", "Busy", respectively, for sessions without any participation restriction. As described above, the communication state is identified and managed in accordance with absence/presence of participation restriction, and therefore in the management system 50 according to the present embodiment, presence/absence of participation restriction can be identified by the communication state.

For example, the terminal management table illustrated in FIG. 11 indicates that the terminal 10aa of which terminal ID is "01aa" is such that the terminal name is "AA terminal, Tokyo office, Japan", the operation state is "ON line", the communication state is "None" indicating the reception state in which communication is not performed with another terminal, the date when the management system 50 received the login request information is "13:40 on Nov. 10, 2009", and the IP address of the terminal 10aa is "1.2.1.3".

Destination List Management Table

Further, in the non-volatile storage unit 5000, a destination list management DB 5004 constituted by the destination list management table as illustrated in FIG. 12 is structured. FIG. 12 is a conceptual diagram illustrating the destination list management table. In the destination list management table, the terminal ID for identifying the destination terminal candidate which is the terminal 10, i.e., a candidate of destination to which the content data are transmitted from the terminal 10, is managed in association with the terminal ID of the start requesting terminal which is the terminal 10, i.e., a source of the start request information of the session used in the teleconference including communication managed by the management system 50. For example, the destination list management table as illustrated in FIG. 12 indicates that destination terminal candidates with which the terminal (terminal 10aa) of which terminal ID is "01aa" can request start of teleconference include a terminal 10ab of which terminal ID is "01ab", a terminal 10ba of which terminal ID is "01ba", a terminal 10db of which terminal ID is "01db", and a terminal 10dc of which terminal ID is "01dc". This destination terminal candidate is updated by addition or removal in response to request of addition or removal which is given by the start requesting terminal to the management system 50.

Session Management Table

In the non-volatile storage unit 5000, a session management DB 5005 constituted by the session management table as illustrated in FIG. 13 is structured. FIG. 13 is a conceptual diagram illustrating the session management table. In this session management table, for each of the session IDs identifying a session in which content data are transmitted between terminals, the following information is managed in association with each other: the relay device ID of the relay device 30 used to relay the content data in this session, the terminal ID of the start requesting terminal which is the transmission source of the start request information of the session, the terminal ID of the destination terminal designated, as the other party with which communication is made, in the start request information of the session, the delay time (ms) of reception with which the destination terminal receives image data, and the reception date/time when the management system 50 receives the delay information indicating the delay time transmitted from the destination terminal. For example, the session management table illustrated in FIG. 13 indicates that the relay device 30e (relay device ID "111e") selected in the session executed using the session ID "se1" relays content data between the start requesting terminal (terminal 10aa) of which terminal ID is "01aa" and the start requesting terminal (terminal 10aa) of which terminal ID is "01db", and the delay time of the image data at "14:00 on Nov. 10, 2009" at the destination terminal (terminal 10db) is 200 (ms). When teleconference is conducted between two terminals 10, the reception date/time of the delay information may be managed on the basis of delay information transmitted from the start requesting terminal instead of the destination terminal. However, when teleconference is conducted between three or more terminals 10, the reception date/time of the delay information is managed on the basis of the delay information transmitted from the terminal 10 at the reception side of the content data.

Quality Management Table

Further, in the non-volatile storage unit 5000, a quality management DB 5007 constituted by the quality management table as illustrated in FIG. 14 is structured. FIG. 14 is a conceptual diagram illustrating the quality management table. In this quality management table, the image quality of the image data (the quality of the image) relayed by the relay device 30 is associated and managed in accordance with the delay time (ms) of the image data of the start requesting terminal or destination terminal.

Relay Device Selection Management Table

Further, in the non-volatile storage unit 5000, a relay device selection management DB 5008 constituted by the relay device selection management table as illustrated in FIG. 15 is structured. FIG. 16 is a conceptual diagram illustrating the relay device selection management table. In this relay device selection management table, the relay device ID of the relay device 30 used for relaying of the content data are associated and managed with the terminal ID of each of all the terminals 10 managed by the management system 50.

State Change Management Table

In the non-volatile storage unit 5000, a state change management DB 5009 constituted by the state change management table as illustrated in FIGS. 16 and 17 is structured. FIGS. 16 and 17 are conceptual diagrams illustrating the state change management table. In the state change management table of the FIG. 16, the following information is managed in association with each other: change request information indicating request for changing the state of communication between terminals, prior-to-change state information indicating the communication state before the change is made by the state management unit 53 explained later, and change information indicating the communication state after the change is made by the state management unit 53. In the state change management table of the FIG. 17, the following information is managed in association with each other: the change request information, terminal information for identifying the start requesting terminal and the destination terminal, the prior-to-change state information, and the change information.

In the state change management table of the FIG. 17, when the management system 50 receives change request information "Invite", the management system 50 changes the communication state "None", which is the state before the change, of the start requesting terminal to "Calling", and changes the communication state "None", which is the state before the change, of the destination terminal to "Ringing". The change request information includes, e.g., "Invite", "Private Invite", "Accept" as illustrated in FIG. 17 and "Join", "Call", "Leave" as illustrated in FIG. 16.

"Invite" is information included in the start request information, and is change request information according to the transmission of the start request information. "Accept" is change request information according to the reception of the response to the start request information, and indicates the start of communication, i.e., permission of establishing of the session. "Join" is change request information according to completion of establishing of the session corresponding to the start request information, and indicates request of start of relaying of content data. "Call" is information included in the participation request, and is change request information according to the transmission of the participation request, and indicates request for participating in the already established session. "Leave" is change request information for requesting the termination of the session.

Each Functional Unit of Management System

Subsequently, each functional unit of the management system 50 will be explained in detail. In the explanation below, in the explanation about each unit of the management system 50, relationship with main constituent elements for achieving the units of the management system 50 among the constituent elements as illustrated in FIG. 3 will also be explained.

The transmission and receiving unit 51 is executed by the network I/F 209 illustrated in FIG. 3, and transmits and receives various kinds of data (or information) to/from other terminals, devices, or systems via the communication network 2. The terminal authentication unit 52 searches the terminal authentication management table of the non-volatile storage unit 5000 (see FIG. 10) using a search key which is the terminal ID and the password included in the login request information received via the transmission and receiving unit 51, and performs terminal authentication by determining whether or not the same terminal ID and the password are managed in the terminal authentication management table.

The state management unit 53 manages the operation state and the communication state of the terminal management table illustrated in FIG. 11. The state management unit 53 manages and stores the following information in association with each other in the terminal management table (see FIG. 11) in order to manage the operation state of the terminal 10 (login requesting terminal) that sent login request: the terminal ID of the login requesting terminal, the operation state of the login requesting terminal, the reception date/time when the management system 50 receives login request information, and the IP address of the login requesting terminal. When the user of the terminal 10 changes the power supply switch 109 of the terminal 10 from the OFF state to the ON state, the state management unit 53 changes the operation state, which indicates the OFF line in terminal management table (see FIG. 11), to the ON line, on the basis of information indicating that the power is to be turned on which is sent from this terminal 10. On the other hand, when the user changes the power supply switch 109 of the terminal 10 from the ON state to the OFF state, the state management unit 53 changes the operation state, which indicates the ON line in terminal management table (see FIG. 11), to the OFF line, on the basis of information indicating that the power is to be turned off which is sent from this terminal 10.

When the transmission and receiving unit 51 receives the change request information transmitted by the start requesting terminal or the destination terminal of the start request information of the teleconference, the state management unit 53 changes, as necessary, at least one of the communication state and the operation state of at least one of the start requesting terminal and the destination terminal in the terminal management table (see FIG. 11) on the basis of the change request information.

Figure 18:
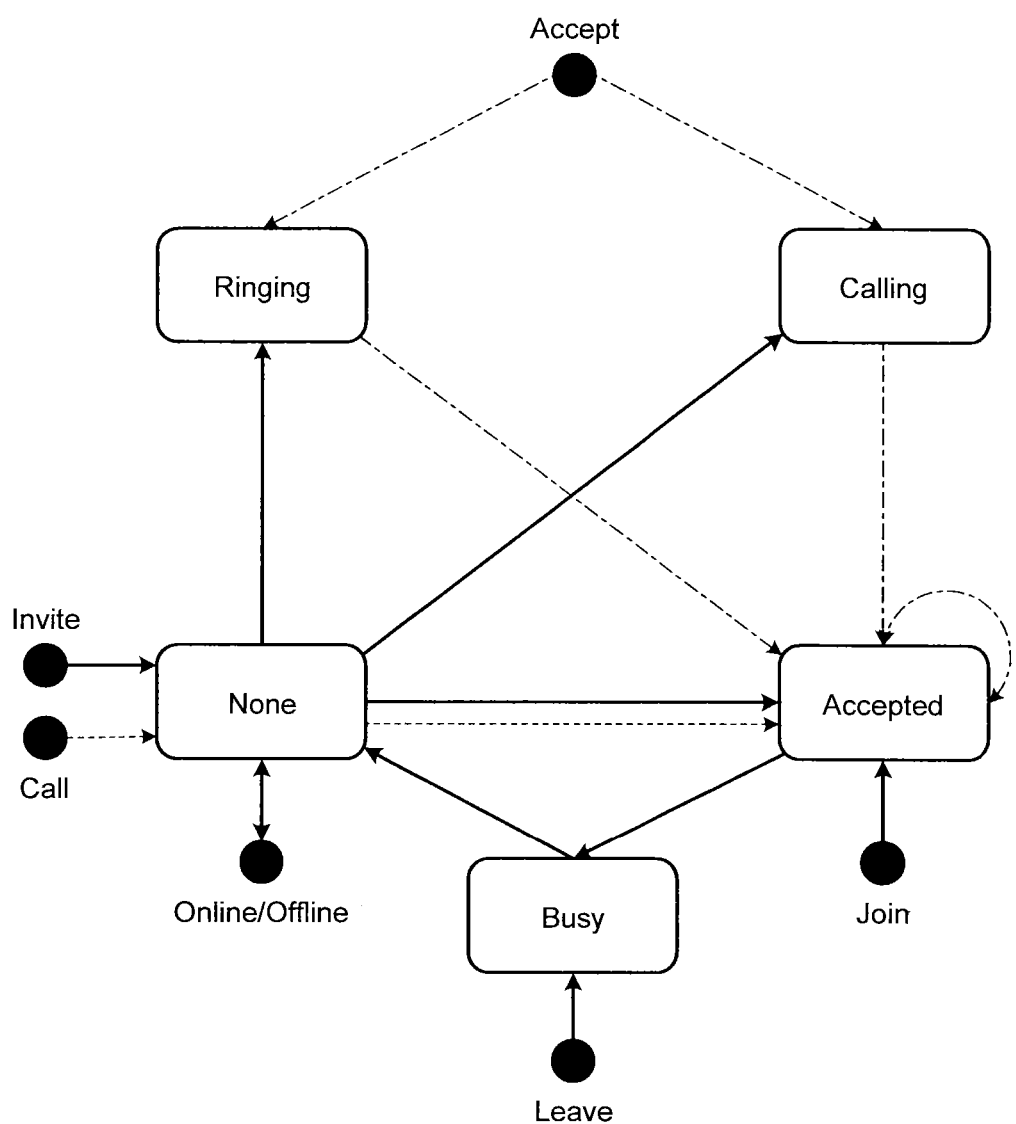
FIG. 18 is a state transition diagram illustrating a communication state.
Figure 19:
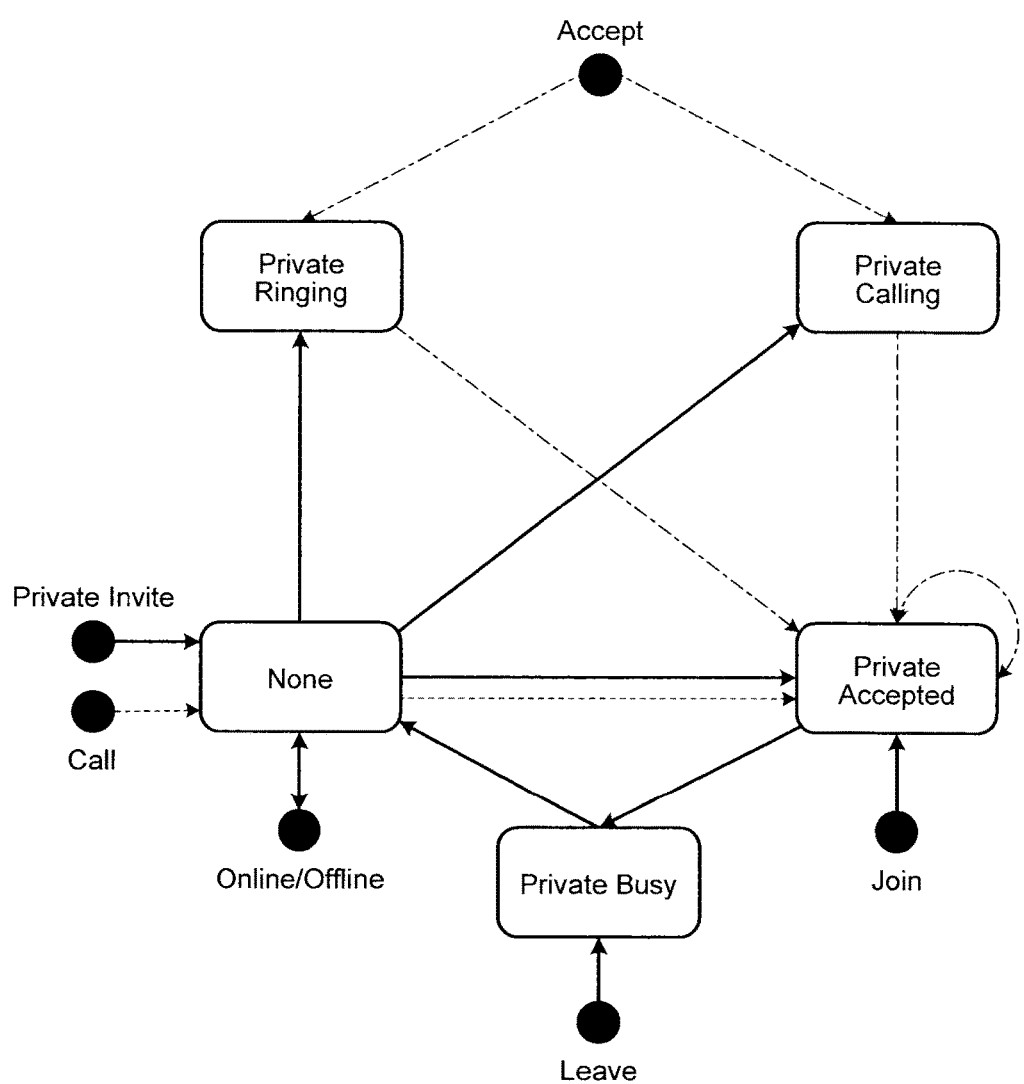
FIG. 19 is a state transition diagram illustrating a communication state.

FIGS. 18 and 19 are state transition diagrams illustrating the communication state managed by the state management unit 53. The state management unit 53 changes the communication state of the terminal 10 in accordance with rule of change of the communication state (see FIGS. 18 and 19) achieved by looking up the state change management table as illustrated in FIGS. 16 and 17.

For example, when the change request information "Accept" is received and the communication state of the terminal 10 is "Ringing" or "Calling" as illustrated in FIG. 18, then the state management unit 53 changes the communication state to "Accepted", and when the communication state of the terminal 10 is "Accepted", the state management unit 53 keeps the communication state "Accepted" as it is.

For example, when the change request information "Accept" is received and the communication state of the terminal 10 is "Private Ringing" or "Private Calling" as illustrated in FIG. 19, then the state management unit 53 changes the communication state to "Private Accepted", and when the communication state of the terminal 10 is "Private Accepted", the state management unit 53 keeps the communication state "Private Accepted" as it is.

In the present embodiment, for example, the state change management table (see FIGS. 16 and 17) is used in order to achieve the change of the state with the state management unit 53, but the embodiment is not limited thereto. In this case, definition may be made by the programs for the management system so as to allow the state management unit 53 to change the communication state in accordance with the rule of the transition of the communication state as illustrated by the state transition diagram of FIGS. 18 and 19.

The terminal extracting unit 54 searches the destination list management table (see FIG. 12) using a search key which is the terminal ID of the target terminal which is to be processed, such as the terminal 10 that has made login request, and can extract the terminal ID by reading the terminal ID of the destination terminal candidate that can communicate with the target terminal, i.e., establish a session. More specifically, in the destination list management table (see FIG. 12), the terminal extracting unit 54 reads the terminal ID of the destination terminal candidate associated with the corresponding terminal ID of the start requesting terminal which matches the terminal ID of the target terminal.

The terminal extracting unit 54 searches the destination list management table using the terminal ID of the target terminal as a key, and also extracts the terminal ID of another terminal 10 which registers the terminal ID of the target terminal as the destination terminal candidate. More specifically, in the destination list management table (see FIG. 12), the terminal extracting unit 54 reads the terminal ID of the destination terminal candidate associated with the corresponding terminal ID of the destination terminal candidate which matches the terminal ID of the target terminal.

The terminal state obtaining unit 55 searches the terminal management table (see FIG. 11) using the terminal ID as a search key, and reads the operation state and the communication state for each terminal ID. Accordingly, the terminal state obtaining unit 55 can obtain the operation state of the candidate of the destination terminal that can communicate with the terminal that made login request. The terminal state obtaining unit 55 searches the terminal management table, and obtains the operation state of the terminal that made the login request.

The relay device selection unit 56 performs processing to select one of multiple relay devices 30. Accordingly, in accordance with a command given by the CPU 201 as illustrated in FIG. 3, the relay device selection unit 56 achieves a session ID generating unit 56a, a relay device extracting unit 56b, and a selection unit 56c as illustrated in FIG. 6. FIG. 6 is a functional block diagram illustrating the details of the relay device selection unit 56 of FIG. 5.

Among them, the session ID generating unit 56a generates a session ID for identifying the session in which content data are transmitted between terminals. On the basis of the terminal ID of the start requesting terminal and the terminal ID of the destination terminal included in the start request information transmitted from the start requesting terminal, the relay device extracting unit 56b searches the relay device selection management table (see FIG. 15), thus extracting each of the corresponding relay devices ID. The selection unit 56c selects the relay device ID of the relay device 30 of which operation state is "ON line" from among the relay devices 30 managed by the relay device management table (see FIG. 9), thus selecting the relay device 30.

The session management unit 57 manages and stores the following information in association with each other in the session management table of the non-volatile storage unit 5000 (see FIG. 13): a session ID generated by the session ID generating unit 56a, a terminal ID of a request source terminal, and a terminal ID of the destination terminal. In the session management table, the session management unit 57 stores and manages the relay device ID of the relay device 30 ultimately selected for each session ID.

Further, the session management unit 57 searches the session management table (see FIG. 13) using a search key which is the terminal ID of the participating terminal that has already participated in the target of the participation request included in the participation request information, and extracts the session ID of the session of the target of the participation request. More specifically, in the session management table (FIG. 13), the terminal ID of the start requesting terminal or the terminal ID of the destination terminal that matches the terminal ID of the participating terminal is searched. Then, the session ID associated with the matching terminal ID is extracted.

The quality determining unit 58 searches the quality management table (see FIG. 14) using the delay time as the search key, and extracts the image quality of the corresponding image data, thus determining the image quality of the image data related by the relay device 30. The storing/reading processing unit 59 is executed by the HDD 205 indicated in FIG. 3, and performs processing such as storing various kinds of data to the non-volatile storage unit 5000 and reading various kinds of data stored in the non-volatile storage unit 5000. Further, the storing/reading processing unit 59 also performs processing to store various kinds of data to the volatile storage unit 5100 and read various kinds of data stored in the volatile storage unit 5100.

The delay time management unit 60 searches the terminal management table (see FIG. 11) using the IP address of the destination terminal as a search key to extract the corresponding terminal ID, and further, stores and manages the delay time indicated by the delay information in the field portion of the delay time of the record including the extracted terminal ID in the session management table (see FIG. 13).

The change request information determination unit 61 looks up the change request information, and determines whether the change request information is particular change request information or not. In this case, the particular change request information includes "Invite", "Private Invite", and "Accept". More particularly, the particular change request information is change request information stored in the state change management table as illustrated in FIG. 17.

The destination determination unit 62 looks up the destination list management table (see FIG. 12), and determines whether or not the destination terminals ID of the terminals 10 participating in the content data session sed extracted by the terminal extracting unit 54 include the destination terminal ID of the terminal 10 requesting participation.

When the transmission and receiving unit 51 receives participation request for participating in the already established session from a predetermined terminal, the participation determination unit 63 looks up the restriction information corresponding to the already established session, and determines whether the participation requesting terminal which is a terminal of transmission source of the participation request information is allowed to participate in the already established session or not.

Processing/Operation of Embodiment

Figure 20:
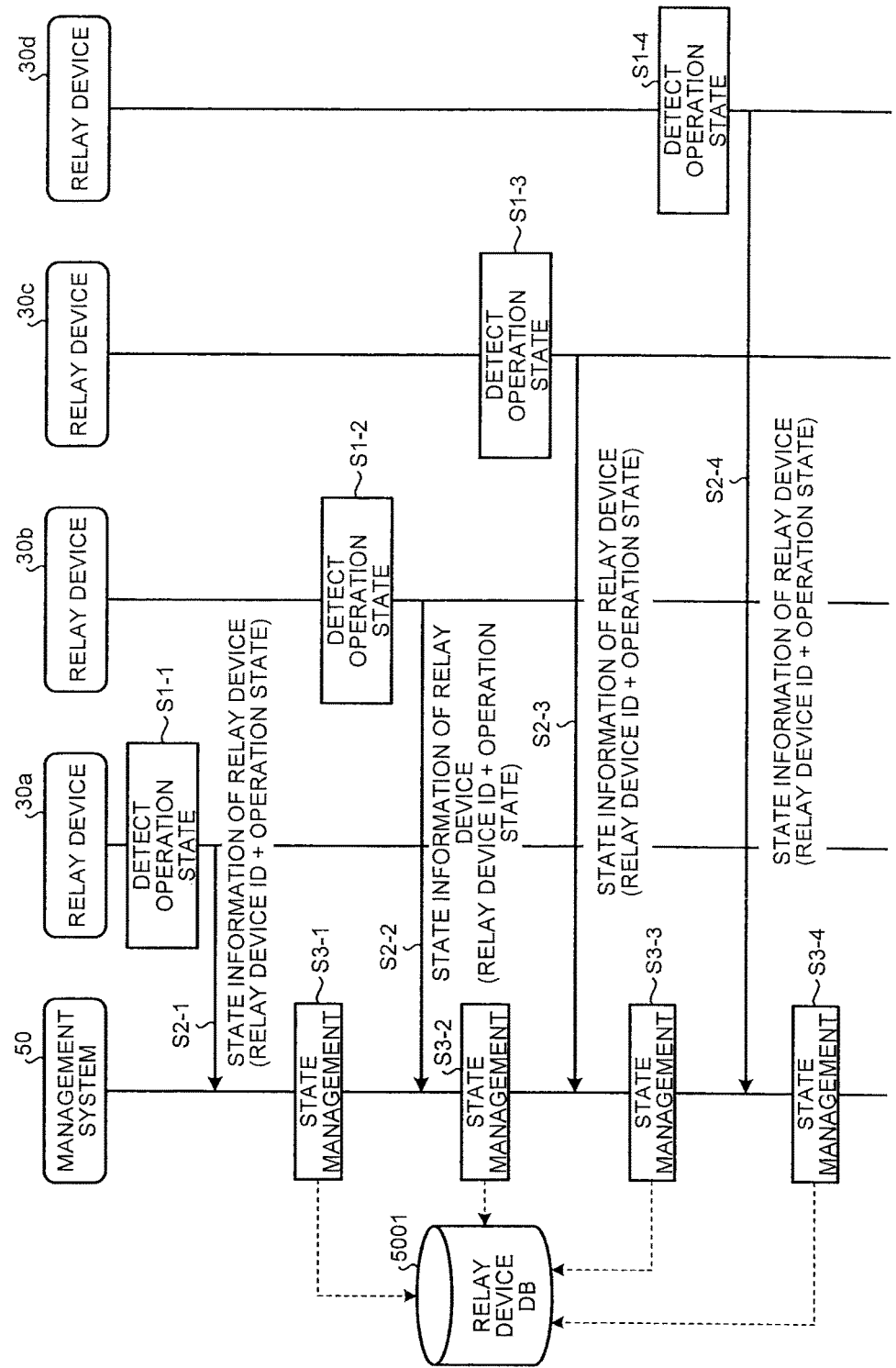
FIG. 20 is a sequence diagram illustrating processing for managing state information representing an operation state of each relay device.
Figure 21:
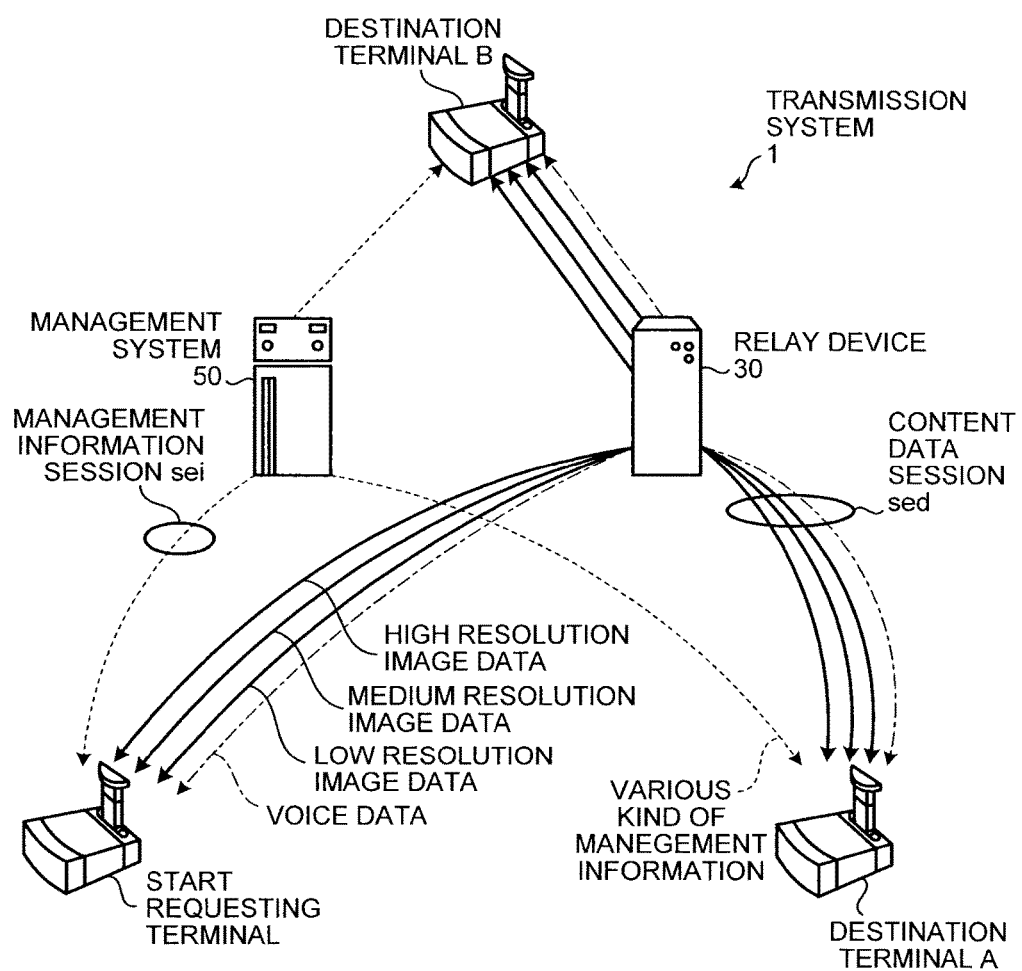
FIG. 21 is a conceptual diagram illustrating a state of transmission and reception of content data and various kinds of management information in the transmission system.
Figure 22:
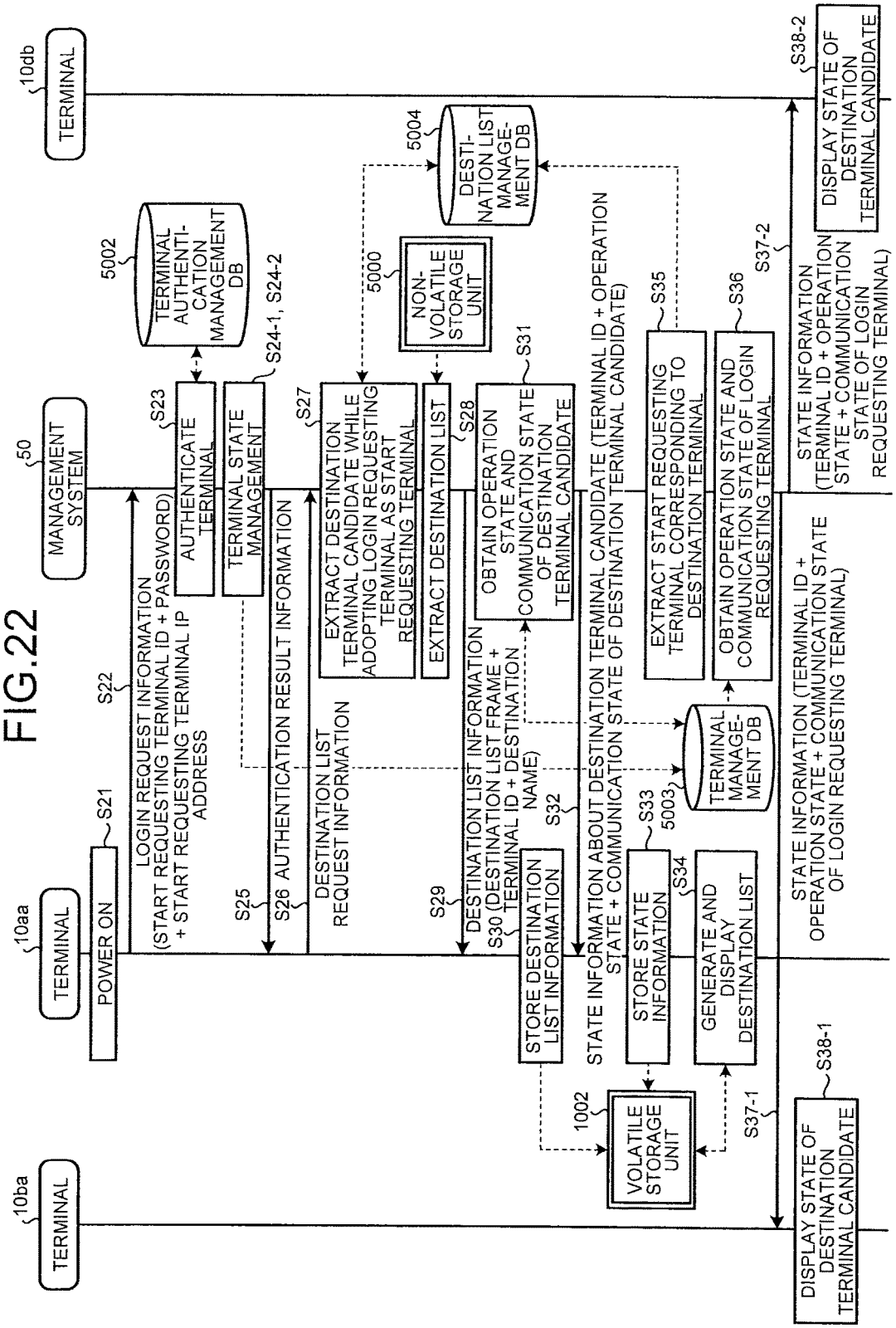
FIG. 22 is a sequence diagram illustrating processing of preparation stage for starting communication between transmission terminals.
Figure 24:
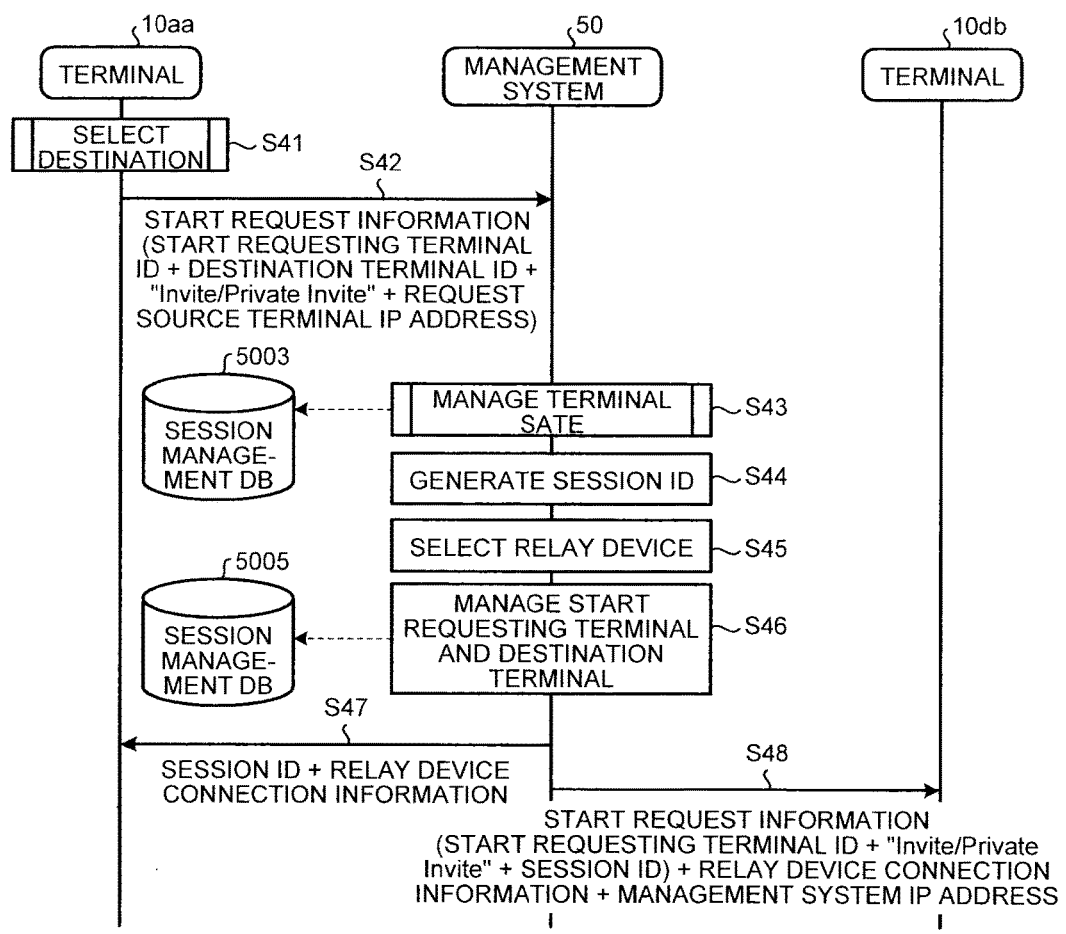
FIG. 24 is a sequence diagram illustrating processing for requesting start of communication.
Figure 25:
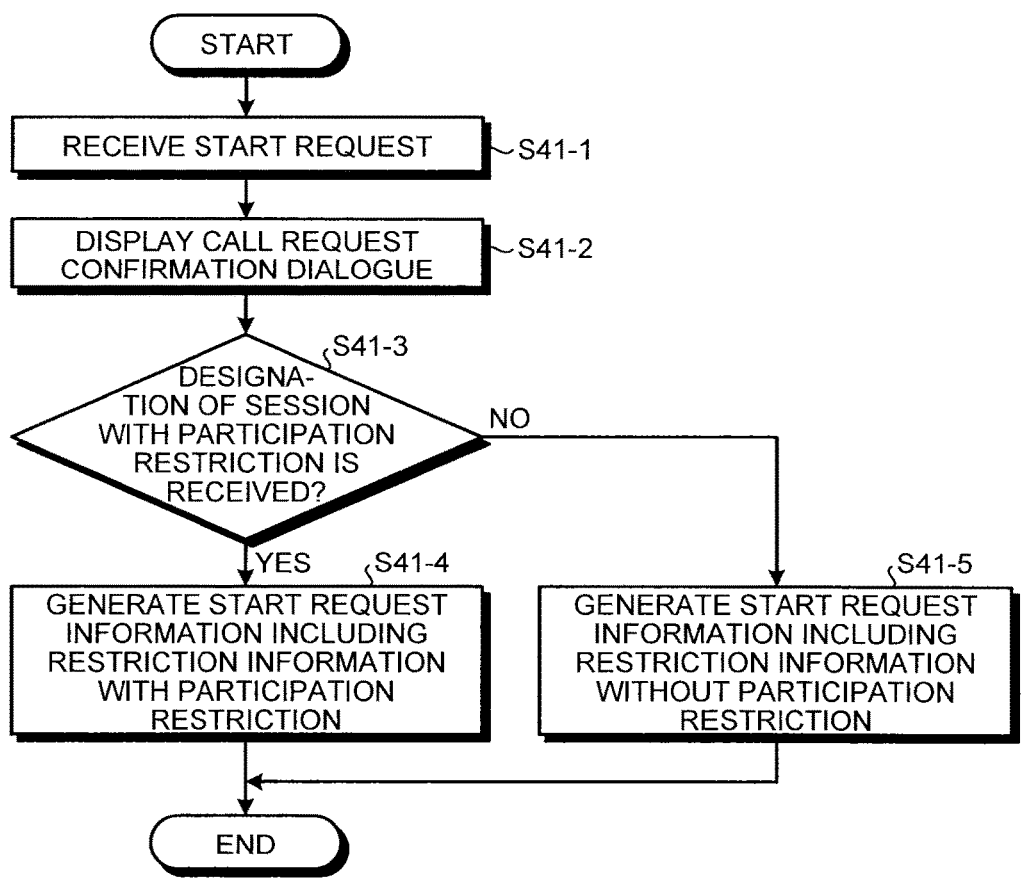
FIG. 25 is a flow diagram illustrating detailed processing of start requesting terminal in destination selection processing.
Figure 26:
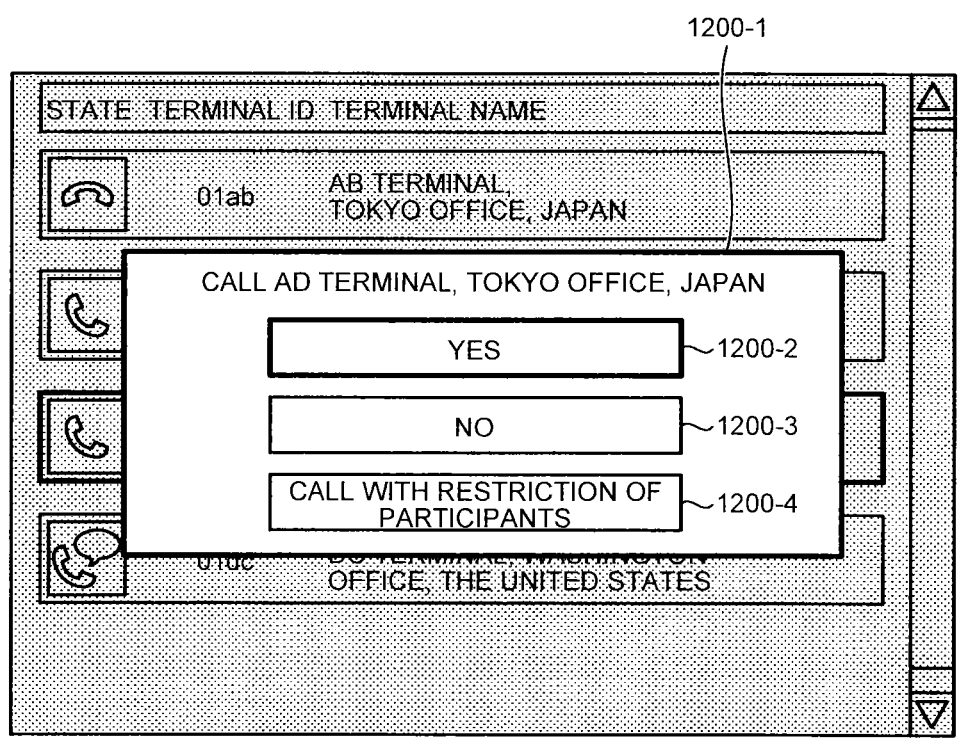
FIG. 26 is a figure illustrating an example of display of a call request confirmation dialogue.
Figure 27:
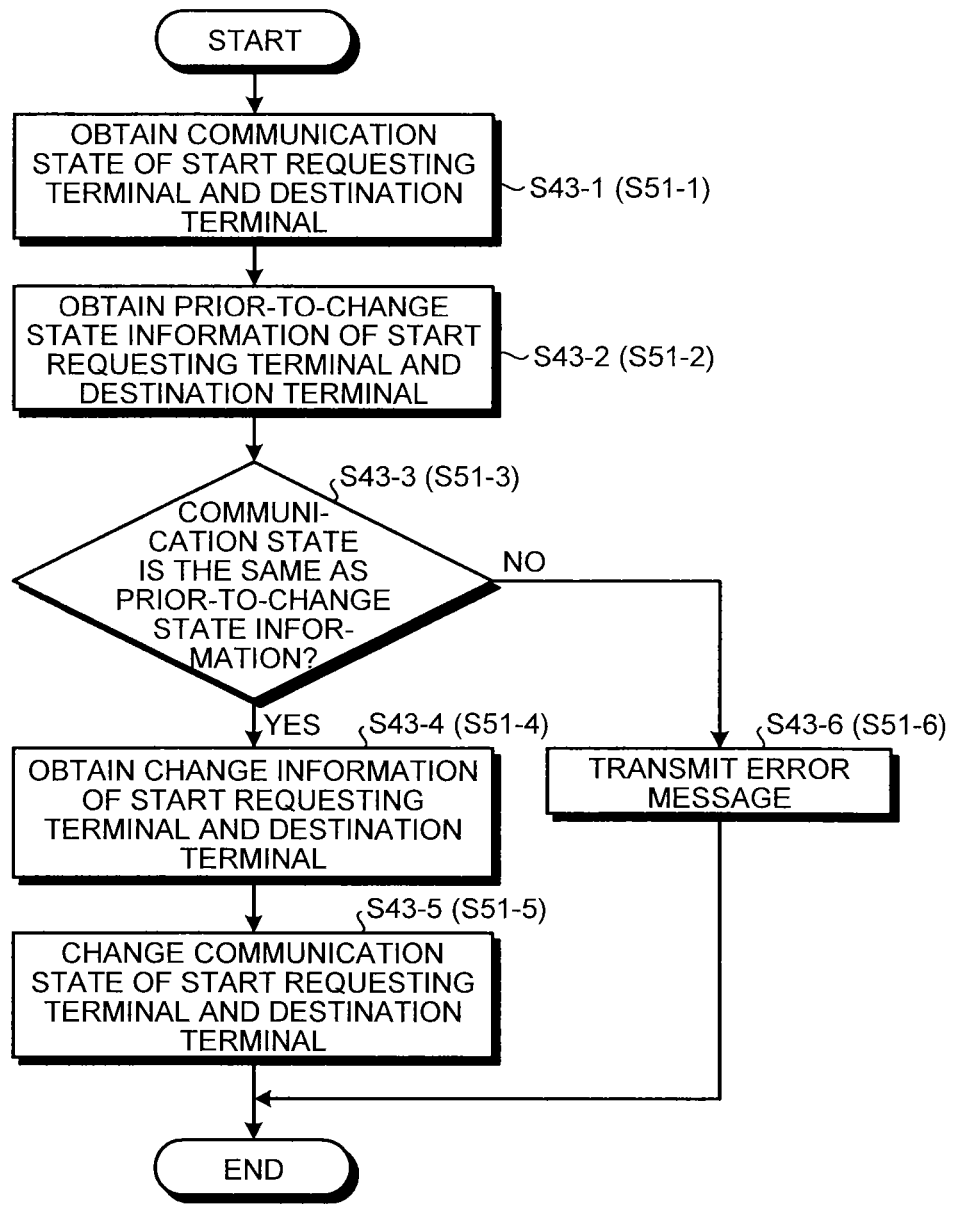
FIG. 27 is a processing flow diagram illustrating processing for changing the state of communication.
Figure 28:
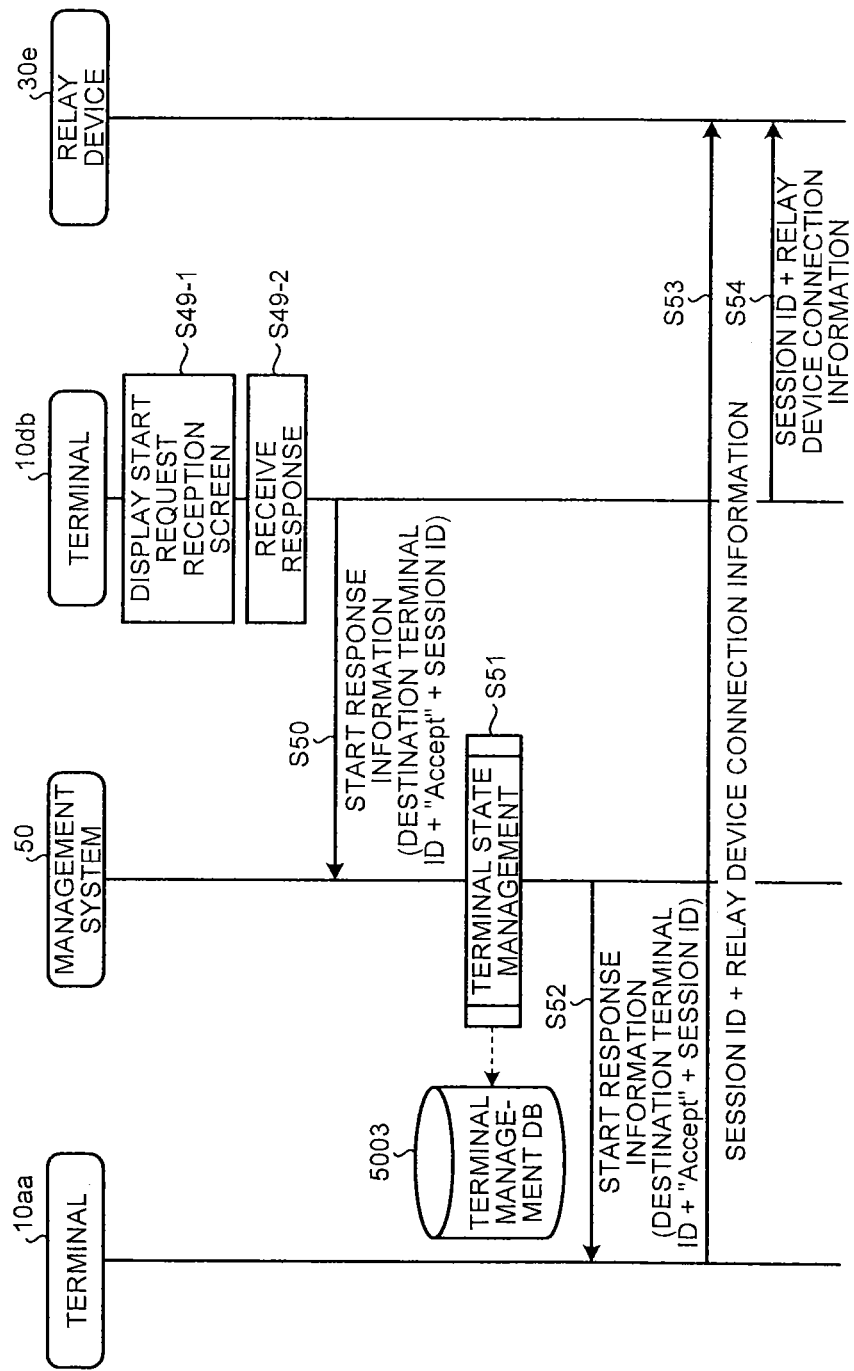
FIG. 28 is a sequence diagram illustrating processing for permitting request of start of communication.
Figure 29:
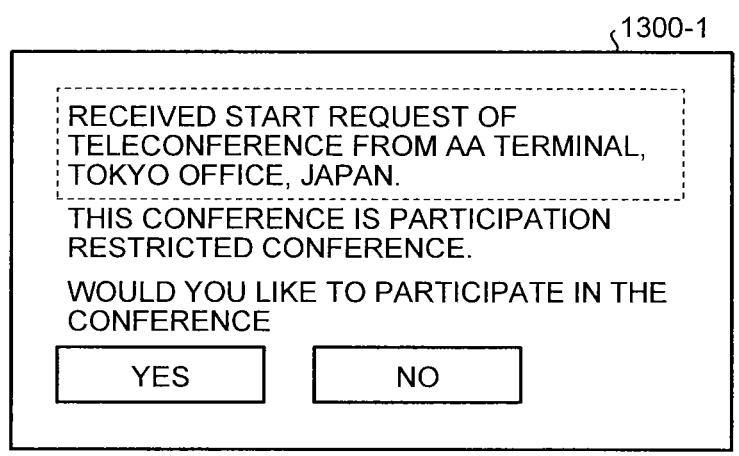
FIG. 29 is a figure illustrating an example of display of a start request reception screen.
Figure 30:
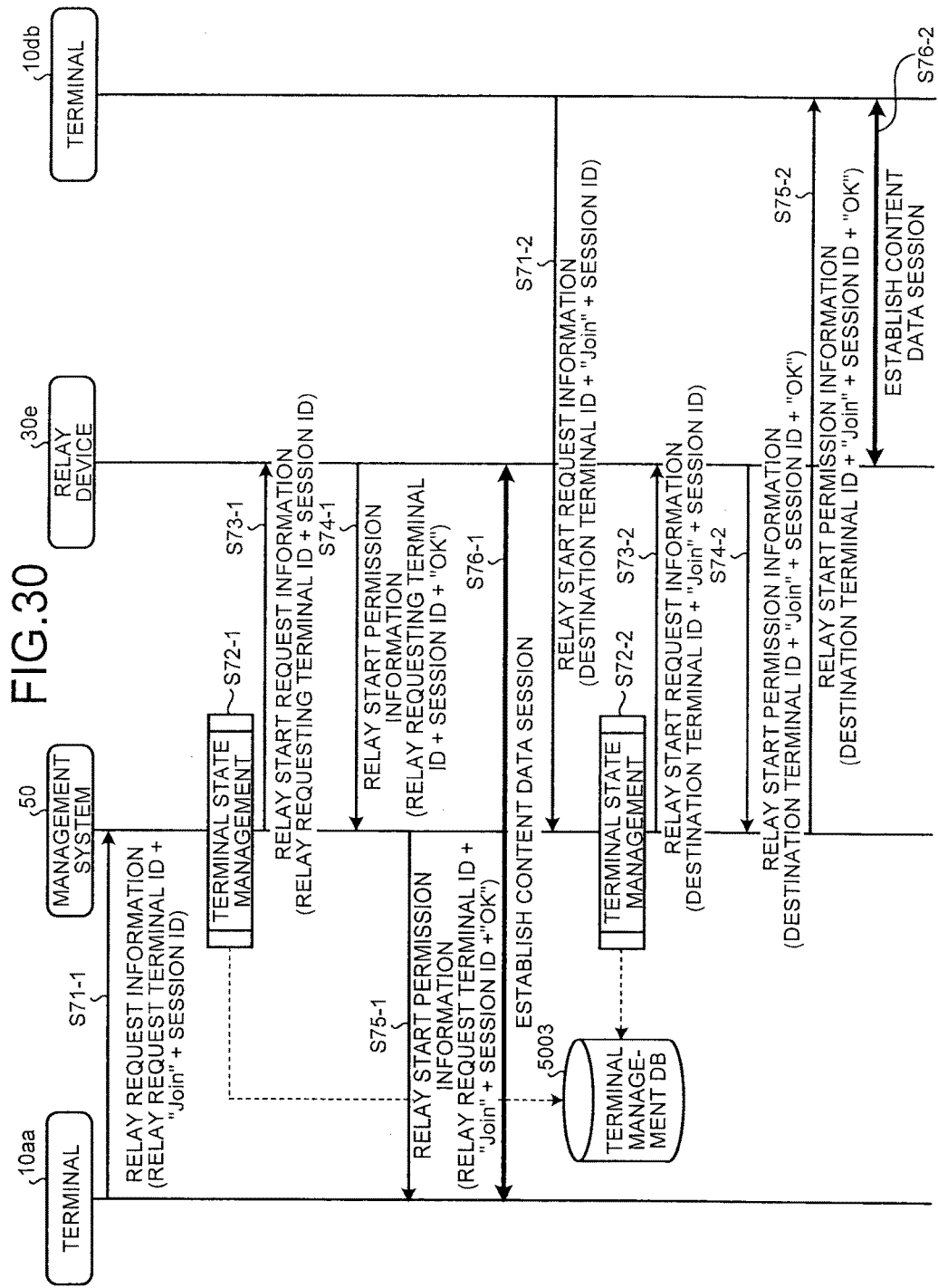
FIG. 30 is a sequence diagram illustrating processing for requesting relay of content data.
Figure 31:
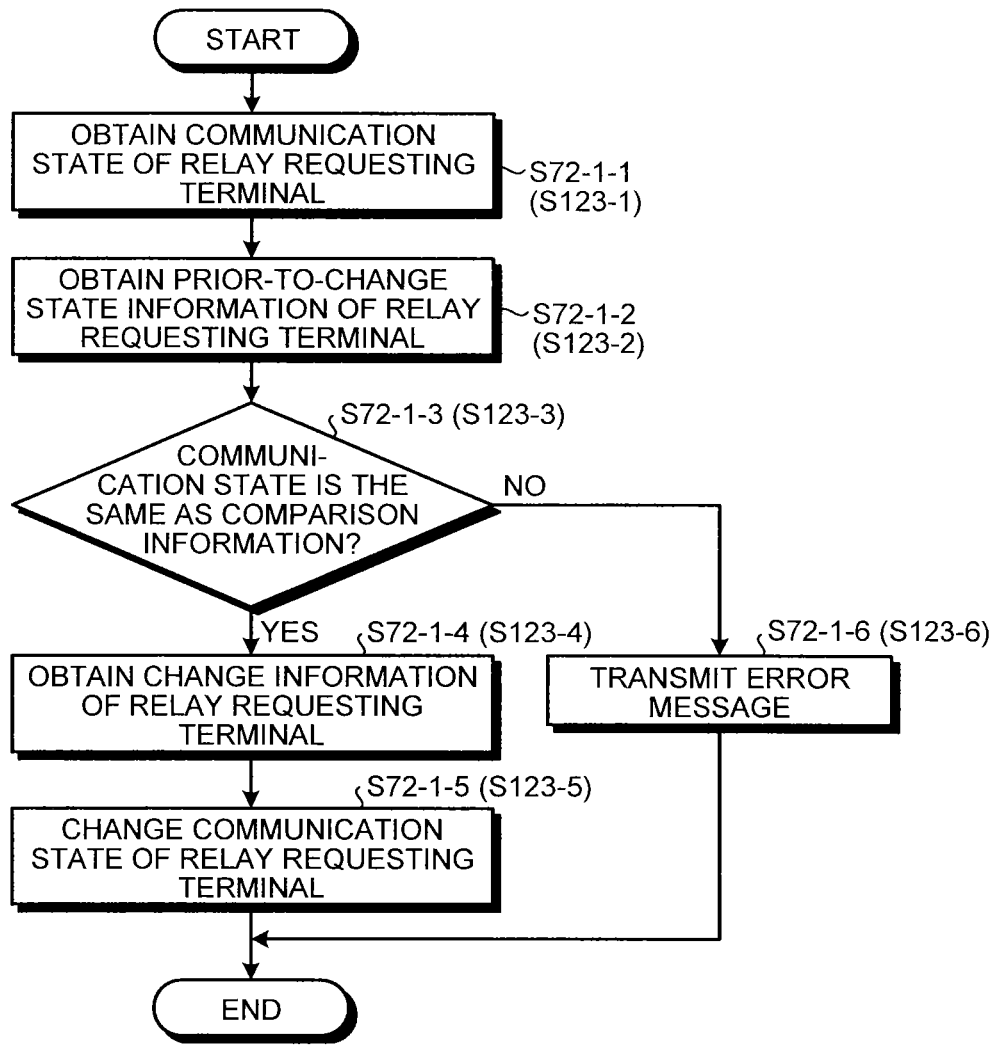
FIG. 31 is a processing flow diagram illustrating processing for changing a state of communication.
Figure 32:
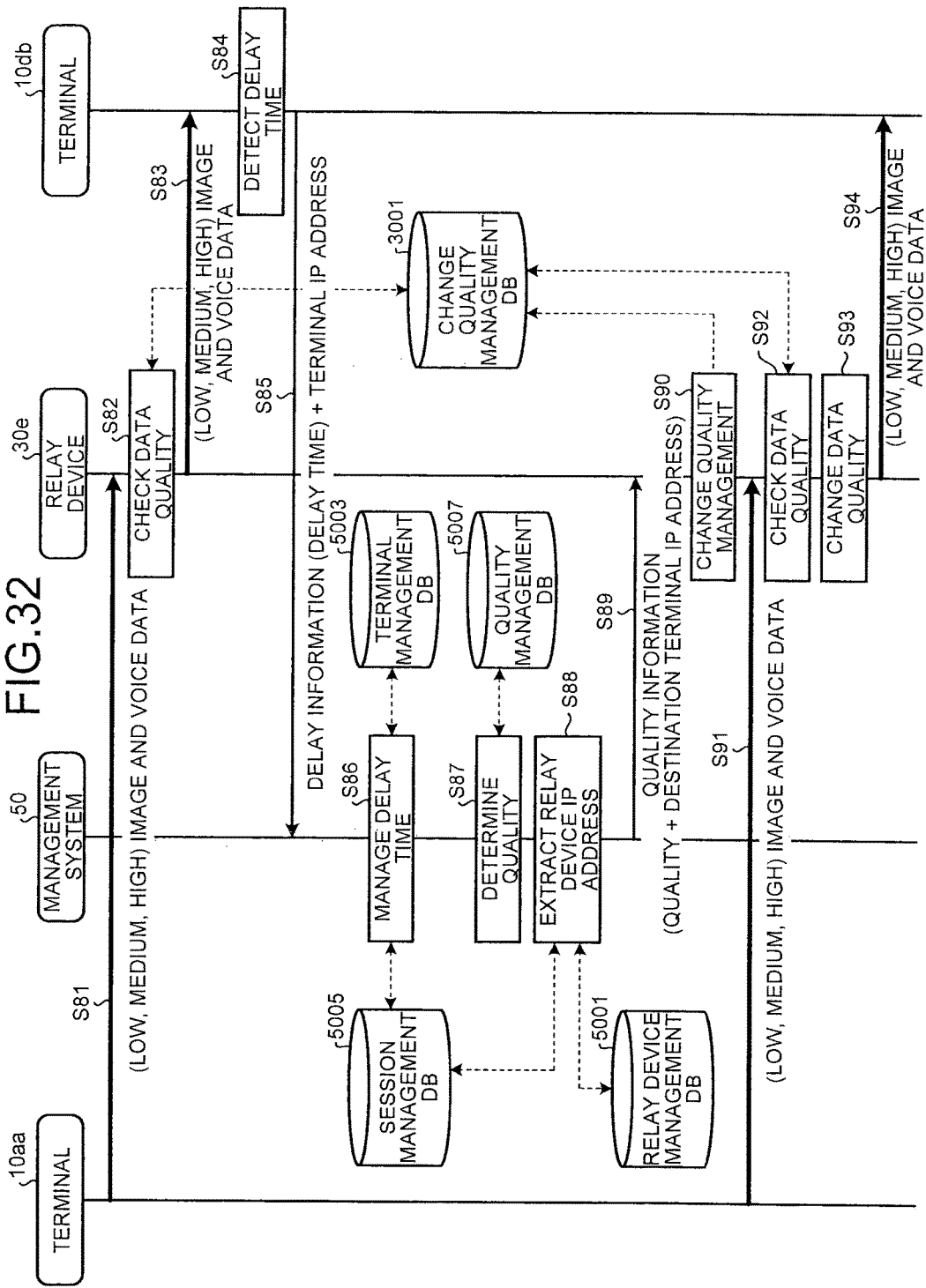
FIG. 32 is a sequence diagram illustrating processing for transmitting and receiving content data between transmission terminals.
Figure 33:
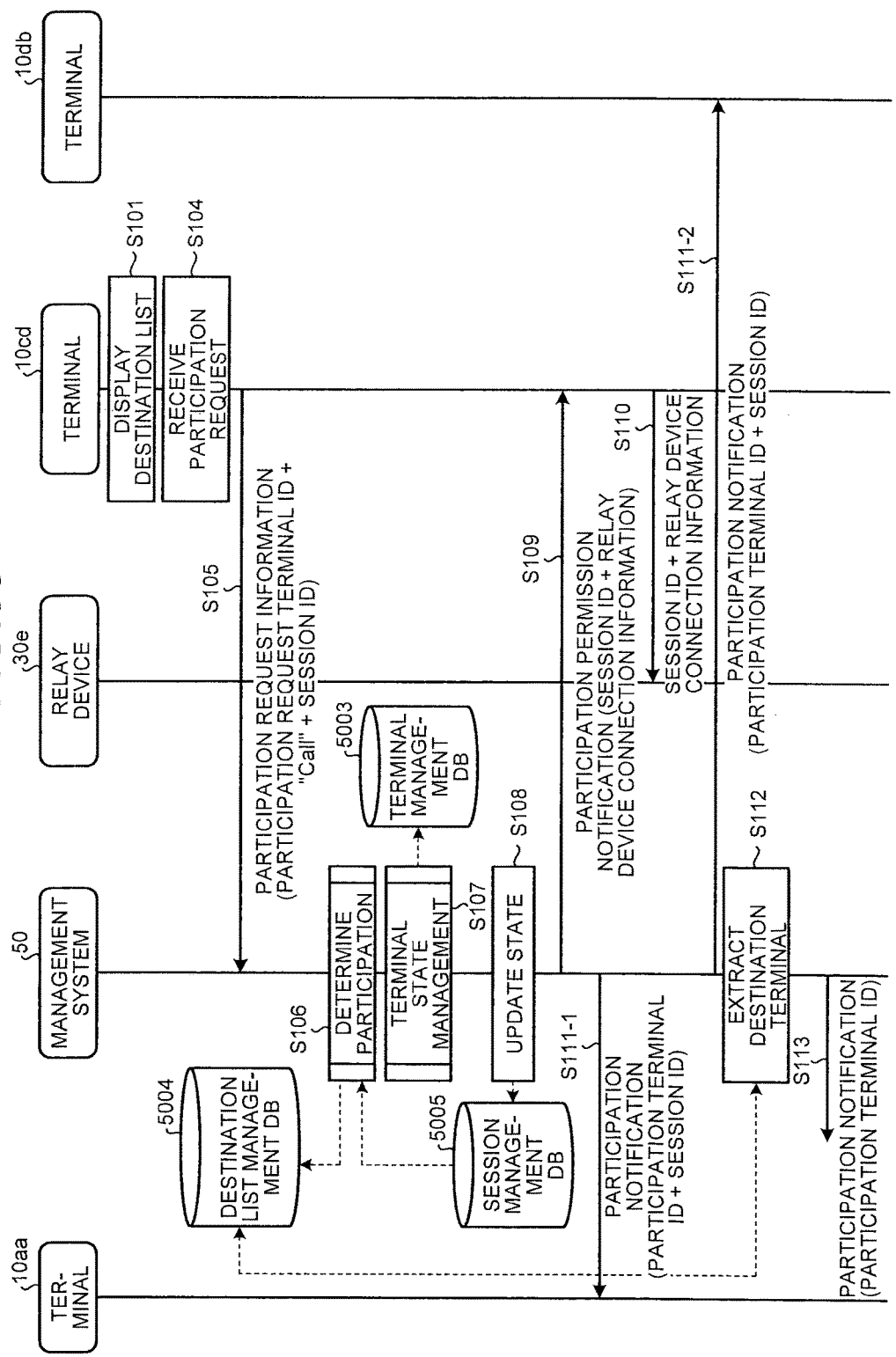
FIG. 33 is a sequence diagram illustrating processing for transmitting participation request information for participating in a content data session.
Figure 34:
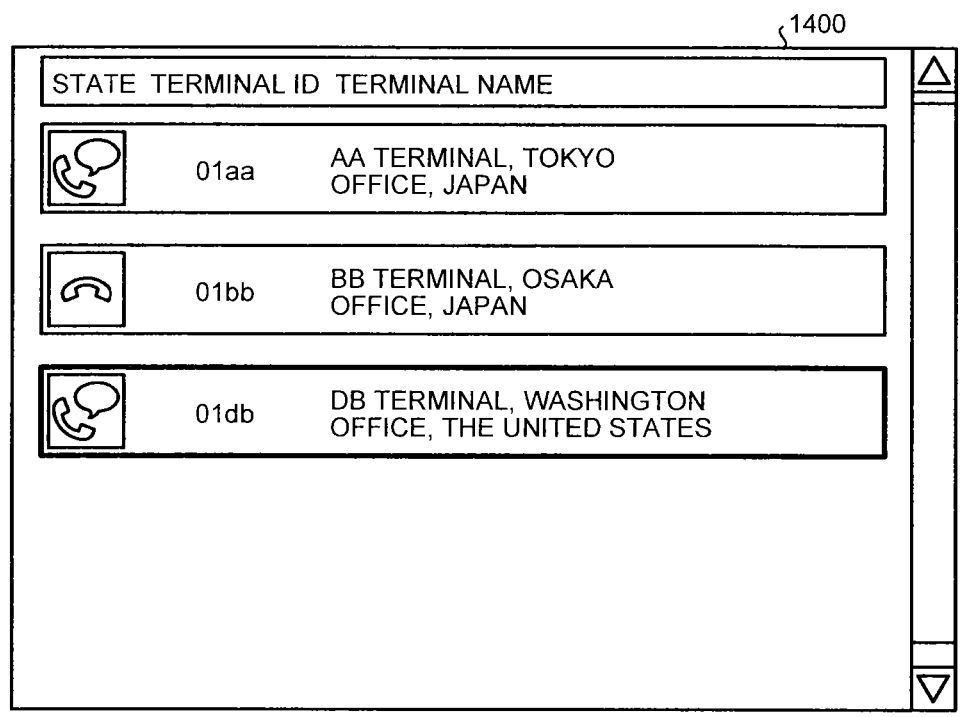
FIG. 34 is a figure illustrating an example of display of a destination list.
Figure 35:
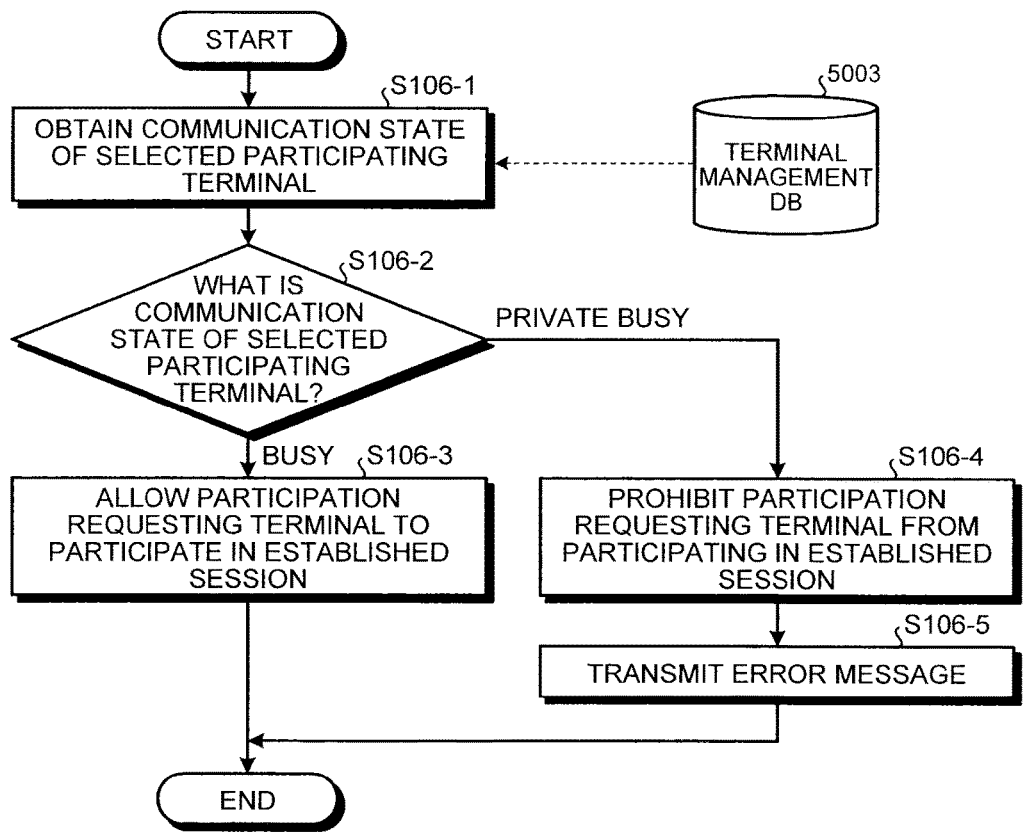
FIG. 35 is a processing flow diagram illustrating determination processing of participation based on a communication state.
Figure 36:
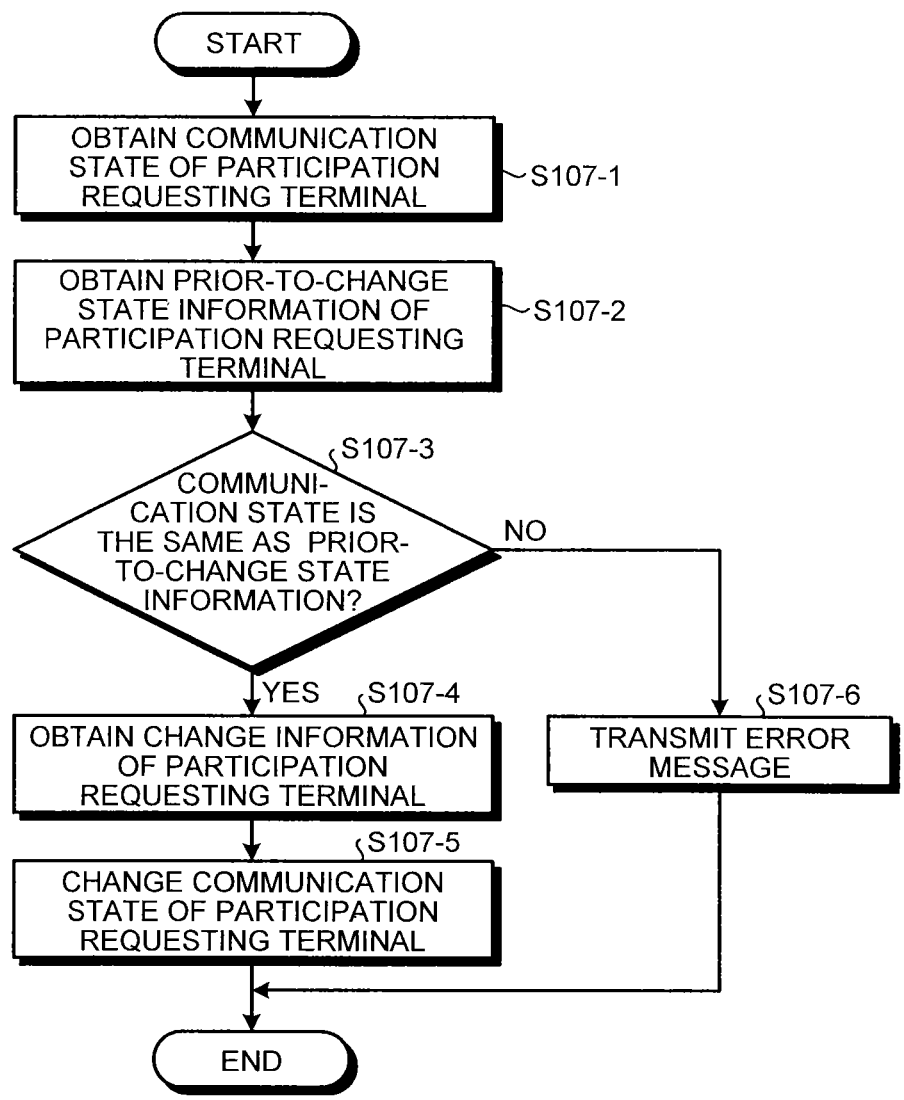
FIG. 36 is a processing flow diagram illustrating processing for changing a communication state.
Figure 37:
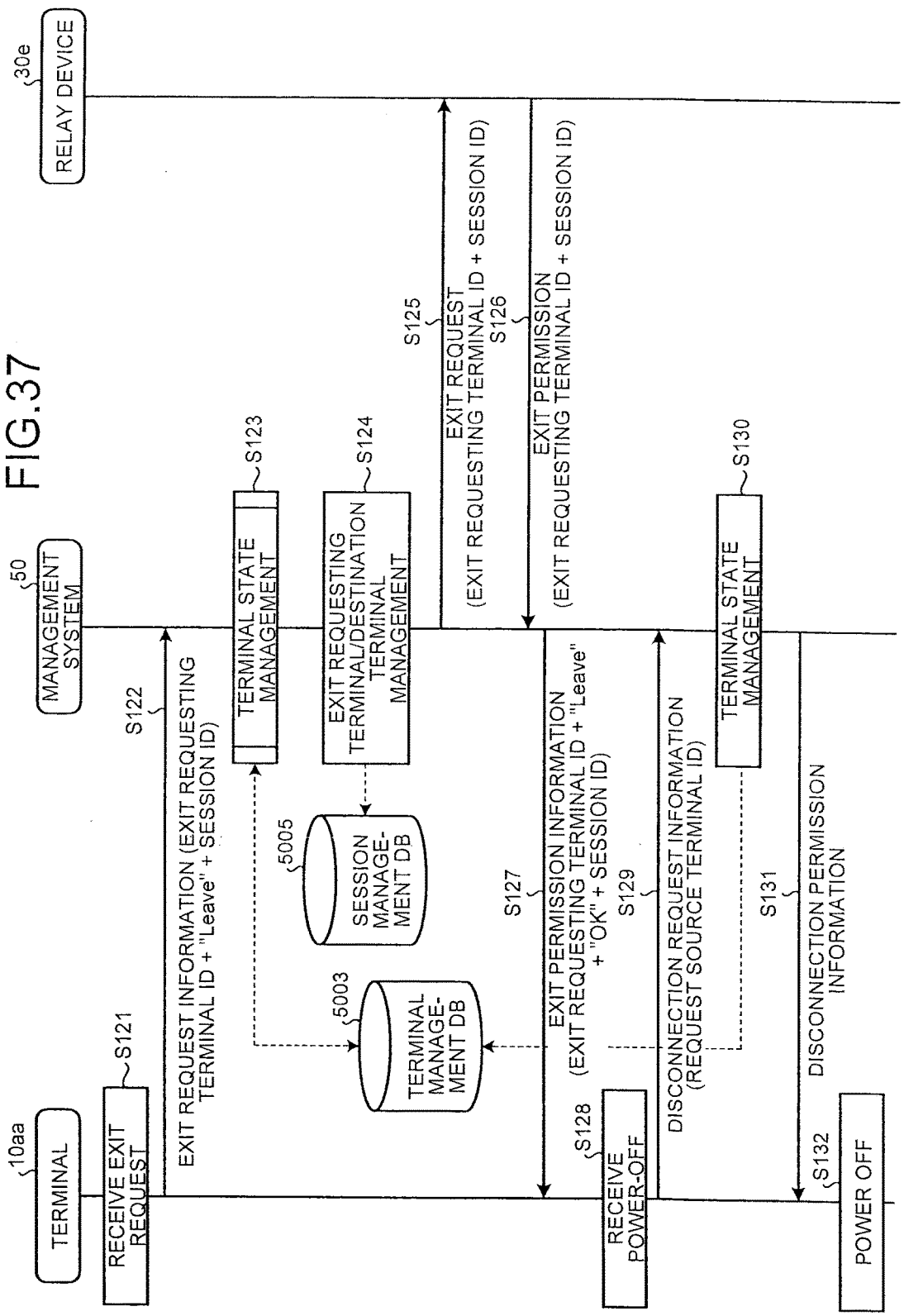
FIG. 37 is a sequence diagram illustrating processing for requesting leaving from a content data session.

The configuration and function (or means) of the transmission system 1 according to the present embodiment has been hereinabove explained. Subsequently, processing method performed by the transmission system 1 according to the present embodiment will be explained with reference to FIGS. 20 to 37. FIG. 20 is a sequence diagram illustrating processing for managing state information representing an operation state of each relay device. FIG. 21 is a conceptual diagram illustrating a state of transmission and reception of image data, voice data, and various kinds of management information in the transmission system. FIG. 22 is a sequence diagram illustrating processing of preparation stage for starting communication between terminals. FIG. 23 is a figure illustrating an example of display of a destination list according to the present embodiment. FIG. 24 is a sequence diagram illustrating processing for requesting start of communication. FIG. 25 is a flow diagram illustrating detailed processing of start requesting terminal in destination selection processing. FIG. 26 is a figure illustrating an example of display of a call request confirmation dialogue. FIG. 27 is a processing flow diagram illustrating processing for changing the state of communication. FIG. 28 is a sequence diagram illustrating processing for permitting request of start of communication. FIG. 29 is a figure illustrating an example of display of a start request reception screen. FIG. 30 is a sequence diagram illustrating processing for requesting relay of content data. FIG. 31 is a processing flow diagram illustrating processing for changing a state of communication. FIG. 32 is a sequence diagram illustrating processing for transmitting and receiving content data between transmission terminals. FIG. 33 is a sequence diagram illustrating processing for transmitting participation request information for participating in a content data session. FIG. 34 is a figure illustrating an example of display of a destination list. FIG. 35 is a processing flow diagram illustrating determination processing of participation based on a communication state. FIG. 36 is a processing flow diagram illustrating processing for changing a communication state. FIG. 37 is a sequence diagram illustrating processing for requesting leaving from a content data session.

First, processing for managing the state information indicating the state of each relay device 30 transmitted from each relay device 30 to the management system 50 will be explained with reference to FIG. 20. First, in each relay device 30, the state detection unit 32 illustrated in FIG. 5 detects the operation state of the relay device 30 which is the device in question with a regular interval (step S1-1 to S1-4). Then, the transmission and receiving unit 31 of the each relay device 30 transmits each piece of state information via the communication network 2 to the management system 50 with a regular interval in order to let the management system 50 to manage the operation state of the each relay device 30 in real time (step S2-1 to S2-4). Each piece of state information includes the relay device ID of each of the relay devices 30 and the operation state detected by the state detection unit 32 of the relay device 30 concerning the relay device ID. In the present embodiment, FIG. 9 illustrates the following case: the relay device (30a, 30b, 30d) operates normally to be in the "ON line", and on the other hand, the relay device 30c is in the operating state but some kind of malfunction occurs in the program for executing the relay operation of the relay device 30c, and accordingly, it is in the "OFF line".

Subsequently, in the management system 50, the transmission and receiving unit 51 receives each piece of state information transmitted from each relay device 30, and by way of the storing/reading processing unit 59, the state information for each relay device ID is stored and managed in the relay device management table of the non-volatile storage unit 5000 (see FIG. 9) (step S3-1 to S3-4). Accordingly, in the relay device management table as illustrated in FIG. 9, the operation state of any one of "ON line", "OFF line", or "malfunction" is stored and managed for each of the relay devices ID. At this occasion, for each relay device ID, the reception date/time when the management system 50 received the state information is also stored and managed. When the state information is not transmitted from the relay device 30, the field portion of the operation state and the field portion of the reception date/time in each record of the relay device management table as illustrated in FIG. 9 become vacant, or they indicate the operation state and the reception date/time of the previous reception, respectively.

Subsequently, a conceptual of a state of transmission and reception of content data and various kinds of management information in the transmission system 1 will be explained with reference to FIG. 21. As illustrated in FIG. 21, in the transmission system 1, management information session sei for transmitting and receiving various kinds of management information is established via the management system 50 between a start requesting terminal, a destination terminal A, and a destination terminal B. Four sessions for transmitting and receiving four pieces of data, i.e., high resolution image data, medium resolution image data, low resolution image data, and voice data, are established via the relay device 30 between the start requesting terminal, the destination terminal A, and the destination terminal B. In this case, these four sessions are collectively referred to as content data session sed. More specifically, the content data session sed is a session used for teleconference.

Subsequently, transmission and reception processing of each piece of management information in the preparation stage before the terminal 10aa starts communication will be explained with reference to FIG. 22. FIG. 22 illustrates processing for transmitting and receiving all of various kinds of management information by the management information session sei.

First, when the user of the terminal 10aa turns on the power supply switch 109 as illustrated in FIG. 2, the operation input reception unit 12 as illustrated in FIG. 5 receives the power ON, and turns on the power (step S21). Then, upon receiving the power-ON, the login request unit 13 automatically transmits login request information indicating request of login from the transmission and receiving unit 11 via the communication network 2 to the management system 50 (step S22). This login request information includes a terminal ID and a password for identifying the terminal 10aa which is the terminal in question serving as the source of request. The terminal ID and the password are data that are read via the storing/reading processing unit 19 from the non-volatile storage unit 1000 and are transmitted to the transmission and receiving unit 11. When the login request information is transmitted from the terminal 10aa to the management system 50, the management system 50, which is the receiving side, can find the IP address of the terminal 10aa, which is the transmitting side.

Subsequently, the terminal authentication unit 52 searches the terminal authentication management table of the non-volatile storage unit 5000 (see FIG. 10) using a search key which is the terminal ID and the password included in the login request information received via the transmission and receiving unit 51, and performs terminal authentication by determining whether or not the same terminal ID and the password are managed in the terminal authentication management DB 5002 (step S23).

When the terminal authentication unit 52 determines that the same terminal ID and the password are determined to be managed and accordingly the request is determined to be a login request from a terminal 10 that has authentic permission, then the state management unit 53 stores, in the terminal management table (see FIG. 11), the reception date/time when the login request information was received and the IP address of the terminal 10aa are stored in association with each other, for each record indicated by the terminal ID and the terminal name of the terminal 10aa (step S24-1). Accordingly, in the terminal management table illustrated in FIG. 11, the reception date/time "2009.11.10.13:40" and the terminal IP address "1.2.1.3" are managed in association with the terminal ID "01aa".

Subsequently, the state management unit 53 sets the operation state "ON line" and the communication state "None" of the terminal 10aa, and stores, in the terminal management table (see FIG. 11), the operation state and the communication state, for each record indicated by the terminal ID and the terminal name of the terminal 10aa (step S24-2). Accordingly, in the terminal management table illustrated in FIG. 11, the operation state "ON line" and the communication state "None" are managed in association with the terminal ID "01aa".

Then, the transmission and receiving unit 51 of the management system 50 transmits authentication result information which indicates authentication result obtained by the terminal authentication unit 52 via the communication network 2 to the login requesting terminal (terminal 10aa) which makes login request (step S25). In the present embodiment, a case where the terminal authentication unit 52 determines that the terminal have authentic permission will be hereinafter explained.

When the terminal 10aa receives the authentication result information indicating the result in which the terminal have authentic permission, then the transmission and receiving unit 11 transmits the destination list request information, indicating that the destination list is requested, via the communication network 2 to the management system 50 (step S26). Accordingly, the transmission and receiving unit 51 of the management system 50 receives destination list request information.

Subsequently, the terminal extracting unit 54 searches the destination list management table (see FIG. 12) using a search key which is the terminal ID "01aa" of the login requesting terminal (terminal 10aa) that made the login request, and performs extraction by reading the terminal ID of the destination terminal candidate with which the login requesting terminal (terminal 10aa) can communicate as the start requesting terminal, i.e., establish a session (step S27). The terminal extracting unit 54 searches the terminal management table (see FIG. 11) using the extracted terminal ID as a search key, and performs extraction by reading the terminal name corresponding to the terminal ID, i.e., the terminal name of the destination terminal candidate. In this case, the terminal IDs ("01ab", "01ba", "01db", "01dc") of the destination terminal candidates (terminals (10ab, 10ba, 10db, 10dc)) corresponding to the terminal ID "01aa" of the start requesting terminal (terminal 10aa) and the terminal names corresponding thereto ("AB terminal, Tokyo office, Japan", "BA terminal, Osaka office, Japan", "DB terminal, Washington office, the United States", "DC terminal, Washington office, the United States") are extracted.

Subsequently, the transmission and receiving unit 51 of the management system 50 reads data in the destination list frame (data in the portion of the destination list frame 1100-1 as illustrated in FIG. 23) via the storing/reading processing unit 59 from the non-volatile storage unit 5000 (step S28), and transmits "destination list information (destination list frame, terminal ID, terminal name)" including the terminal ID and the terminal name of the destination terminal candidate extracted by the terminal extracting unit 5 and the destination list frame to the start requesting terminal (terminal 10aa) (step S29). Accordingly, in the start requesting terminal (terminal 10aa), the transmission and receiving unit 11 receives the destination list information, and the storing/reading processing unit 19 stores the destination list information to the volatile storage unit 1002 (step S30).

As described above, in the present embodiment, each terminal 10 does not manage the destination list information, and the management system 50 manages the destination list information of all the terminals in a centralized manner. Therefore, the management system 50 can cope with the following cases in a collective manner: for example, a case where the transmission system 1 includes a new terminal 10, a case where a new type of terminal 10 is included in place of an already included terminal 10, or a case where the appearance of the destination list frame is changed. Therefore, each terminal 10 saves the trouble of changing the destination list information.

The terminal state obtaining unit 55 of the management system 50 searches the terminal management table (see FIG. 11) using search keys which are the terminal ID ("01ab", "01ba", "01db", "01dc") of the destination terminal candidates extracted by the terminal extracting unit 54, and reads the corresponding operation state and the corresponding communication state for each terminal ID extracted by the terminal extracting unit 54, thus obtaining the operation state and the communication state of each of the terminals (10ab, 10ba, 10db, 10dc) serving as the destination terminal candidates (step S31).

Subsequently, the transmission and receiving unit 51 transmits the terminal ID serving as the search key used in the step S31 and the state information including the operation state and the communication state of the corresponding destination terminal candidate via the communication network 2 to the login requesting terminal (step S32). More specifically, in step S32, the state information including the terminal ID "01ab" serving as the search key and the operation state "OFF line" of the destination terminal candidate (terminal 10ab) are transmitted to the login requesting terminal (terminal 10aa). When the operation state is "OFF line", the state information does not include the communication state. In a part of the same step S32, the transmission and receiving unit 51 transmits each piece of state information corresponding to all the destination terminal candidates, e.g., the terminal ID "01ba" and the state information including the operation state "ON line" of the corresponding destination terminal candidate (terminal 10ba) and the communication state "Calling", to the login requesting terminal (terminal 10aa).

Subsequently, the storing/reading processing unit 19 of the login requesting terminal (terminal 10aa) successively stores the state information received from the management system 50 to the volatile storage unit 1002 (step S33). Therefore, the login requesting terminal (terminal 10aa) receives the state information of each terminal, and can obtain the operation state and the communication state of each of the terminals at that moment such as the terminal 10ab which is the destination terminal candidate that can communicate with the login requesting terminal (terminal 10aa) serving as the start requesting terminal.

Subsequently, the destination list generating unit 20 of the login requesting terminal (terminal 10aa) generates a destination list reflecting the operation state and the communication state of the terminal 10 which is the destination terminal candidate, on the basis of the destination list information and the state information of the terminal stored in the volatile storage unit 1002. Then, the display control unit 16 displays the destination list with predetermined operational timing on the display 120aa as illustrated in FIG. 1 (step S34).

FIG. 23 is a figure illustrating an example of display of a destination list. As illustrated in FIG. 23, the destination list is a display screen including, e.g, a terminal ID 1100-2 of the destination terminal candidate, a terminal name 1100-3, and icons 1100-4*a* to 1100-4*c* reflecting the state information in the destination list frame 1100-1.

The icons include an OFF line icon 1100-4*a* indicating the OFF line and that communication is impossible, a communication possible icon 1100-4*b* indicating the ON line and that communication is possible, and a communicating icon 1100-4*c* indicating the ON line and that communication is being performed.

When the operation state of the destination terminal candidate is in the "ON line" and the communication state is "None", the destination list generating unit 20 allocates the communication possible icon 1100-4*b* to the destination terminal candidate. When the operation state of the destination terminal candidate is in the "ON line" and the communication state is other than "None", the destination list generating unit 20 allocates the communicating icon 1100-4*c* to the destination terminal candidate. When the operation state of the destination terminal candidate is in the "OFF line", the destination list generating unit 20 allocates the OFF line icon 1100-4*a* to the destination terminal candidate.

On the other hand, back to FIG. 22, the terminal extracting unit 54 of the management system 50 the destination list management table (see FIG. 12) using a search key which is the terminal ID "01aa" of the login requesting terminal (terminal 10*aa*), and extracts the terminal ID of another terminal (start requesting terminal) which registers the terminal ID "01aa of the login requesting terminal (terminal 10*aa*)" as the destination terminal candidate (step S35). In the destination list management table as illustrated in FIG. 12, the terminals ID of other extracted request source terminals are "01ab", "01ba", "01cb", and "01db".

Subsequently, the terminal state obtaining unit 55 of the management system 50 searches the terminal management table (see FIG. 11) using the terminal ID "01aa" of the login requesting terminal (terminal 10*aa*) as a search key, and obtains the operation state and the communication state of the login requesting terminal (terminal 10*aa*) (step S36).

Then, the transmission and receiving unit 51 transmits the state information including the terminal ID "01aa" of the login requesting terminal (terminal 10*aa*), the operation state "ON line", and the communication state "None" obtained in the step S36 to terminals of which operation state is the "ON line" in the terminal management table (see FIG. 11) (in this case, the operation state of the terminal 10*ba* and the terminal 10*db* are in the "ON line") from among terminals (10*ab*, 10*ba*, 10*cb*, and 10*db*) having the terminals ID ("01ab", "01ba", "01cb", and "01db") extracted in the step S35 (step S37-1, S37-2). Subsequently, the terminal 10*ba* and terminal 10*db* display the state information of the destination terminal candidates on the display 120 (step S38-1, S38-2). When the transmission and receiving unit 51 transmits the state information to the terminals (10*ba*, 10*db*), the IP address of the terminal managed by the terminal management table as illustrated in FIG. 11 is looked up on the basis of each terminal ID ("01ba", "01db"). Accordingly, the terminal ID "01aa", the operation state "ON line", the communication state "None" of the login requesting terminal (terminal 10*aa*) can be transmitted to the terminals (terminals (10*ba*, 10*db*)) capable of performing communication adopting the login requesting terminal (terminal 10*aa*) as the destination.

On the other hand, like the step S21, in another terminal 10, when a user turns on the power supply switch 109 as illustrated in FIG. 2, the operation input reception unit 12 as illustrated in FIG. 5 receives the power-ON, and the same processing as the processing of the processing in the steps S22 to S38-1 and S38-2 is performed, and therefore, description thereabout is omitted.

Subsequently, processing that is performed when a terminal requests communication with another terminal will be explained with reference to FIG. 24. FIG. 24 illustrates processing for transmitting and receiving all of various kinds of management information by the management information session sei.

FIG. 24 explains an example where the terminal 10*aa* that is allowed to login in FIG. 22 transmits start request information, i.e., the terminal 10*aa* operates as the start requesting terminal. The terminal 10*aa* serving as the start requesting terminal can communicate with at least one terminal of which operation state is the "ON line" and the communication state is "None", from among the terminals of the destination terminal candidates, on the basis of the state information of the destination terminal candidate received in step S32 explained in FIG. 22.

In the present embodiment, the start requesting terminal (terminal 10*aa*) can communicate with the terminal 10*db* of which operation state is the "ON line" and communication state is "None" according to the state information of the terminal received in the step S32, from among the terminals (10*ab*, 10*ba*, 10*db*, 10*dc*) serving as the destination terminal candidates. Accordingly, in the explanation below, the user of the start requesting terminal (terminal 10*aa*) selects to start communication with the destination terminal (terminal 10*db*).

In the state before the processing as illustrated in FIG. 24 is started, the display 120*aa* of the terminal 10*aa* serving as the start requesting terminal displays the destination list as illustrated in FIG. 23. Then, the user of the start requesting terminal can select with whom the user communicates from among the destination list, i.e., the other party in the session.

In the processing as illustrated in FIG. 24, first, when the user of the start requesting terminal presses down the operation button 108 as illustrated in FIG. 2 to select the destination terminal (terminal 10*db*), the destination selection processing is performed (step S41).

FIG. 25 is a flowchart illustrating detailed processing of the start requesting terminal in destination selection processing (step S41). When, in the destination list, destination terminal (10*db*) is selected in response to user's pressing of the operation button 108 explained above, the operation input reception unit 12 as illustrated in FIG. 5 receives request for starting call designating the destination terminal (terminal 10*db*), i.e., request of start of the session (step S41-1). Subsequently, the display control unit 16 displays the call request confirmation dialogue 1200-1 as illustrated in FIG. 26 in such a manner that it is overlaid on the destination list (step S41-2).

The call request confirmation dialogue 1200-1 is a user interface for confirming the request of start that is received in step S41-1 and for designating whether or not to restrict terminals participating in the session concerning the request of the start. The call request confirmation dialogue 1200-1 includes a "Yes" button 1200-2 for confirming the transmission of the start request information, a "No" button 1200-3 for cancelling the transmission of the start request information, and a button 1200-4 for "making call request upon restricting participants" for designating a session with participation restriction.

In this case, when the "Yes" button 1200-2 is selected, the operation input reception unit 12 receives designation of a session without participation restriction. On the other hand, when the button 1200-4 for "making call request upon restricting participants" is selected, the operation input reception unit 12 receives designation of a session with participation restriction.

When the designation of a session with participation restriction is received (step S41-3, YES), the transmission and receiving unit 11 generates start request information including restriction information for a session with participation restriction (step S41-4). The start request information generated in step S41-4 is information indicating request of start and includes "Private Invite" which is restriction information of a session with participation restriction, the terminal ID "01aa" of the start requesting terminal, and the terminal ID "01db" of the destination terminal.

On the other hand, when the designation of a session without participation restriction is received (step S41-3, NO), the transmission and receiving unit 11 generates start request information including restriction information for a session without participation restriction (step S41-5). The start request information generated in step S41-5 is information indicating request of start and includes "Invite" which is restriction information of a session without participation restriction, the terminal ID "01aa" of the start requesting terminal, and the terminal ID "01db" of the destination terminal.

Back to FIG. 24, the transmission and receiving unit 11 of the terminal 10aa transmits, to the management system 50, the IP address of the start requesting terminal and start request information including the terminal ID "01aa" of the start requesting terminal (terminal 10aa), the terminal ID "01db" of the destination terminal (terminal 10db), and "Invite" or "Private Invite" indicating request of start including restriction information of a session with participation restriction or without participation restriction (step S42). Accordingly, the transmission and receiving unit 51 of the management system 50 receives the start request information and finds the IP address "1.2.1.3" of the start requesting terminal (terminal 10aa) which is the transmission source.

Then, the state management unit 53 changes the field portion of the communication state of the record including each of the terminal ID "01aa" and terminal ID "01db" in the terminal management table of the terminal management DB 5003 (see FIG. 11) on the basis of the terminal ID "01aa" of the start requesting terminal (terminal 10aa) and the terminal ID "01db" of the destination terminal (terminal 10db) included in the start request information (step S43).

Hereinafter, the processing in step S43 will be explained in detail with reference to FIG. 27. First, the state management unit 53 illustrated in FIG. 5 obtains the communication state of the terminal managed in the terminal management DB 5003 (step S43-1). In this case, "Invite" or "Private Invite" included in the start request information received by the transmission and receiving unit 51 is identified as the change request information of the communication state. The change request information "Invite" or "Private Invite" is determined to be particular change request information by the change request information determination unit 61 in advance. Based on this, the state management unit 53 obtains not only the communication state of the start requesting terminal (terminal 10aa) but also the communication state of the destination terminal (terminal 10db). In this case, the state management unit 53 searches the terminal management table (see FIG. 11) using a search key which is the terminal ID "01aa" of the start requesting terminal (terminal 10aa), and obtains the communication state "None" of the start requesting terminal (terminal 10aa) that transmitted the start request information. Likewise, the communication state "None" of the destination terminal (terminal 10db) is obtained.

Subsequently, the state management unit 53 obtains the prior-to-change state information of the start requesting terminal and destination terminal corresponding to the change request information "Invite" or "Private Invite" (step S43-2). In this case, the state management unit 53 searches the state change management table (see FIG. 17) using search keys which are the change request information "Invite" or "Private Invite" and the terminal information "start requesting terminal", and obtains the prior-to-change state information "None" of the start requesting terminal. Likewise, the state management unit 53 searches the state change management table (see FIG. 17) using search keys which are the change request information "Invite" or "Private Invite" and the terminal information "destination terminal", and obtains the prior-to-change state information "None" of the destination terminal.

Subsequently, the state management unit 53 compares the obtained communication state and the prior-to-change state information, and determines whether or not they are the same (step S43-3). In this case, the state management unit 53 compares the communication state "None" of the obtained start requesting terminal (terminal 10aa) and the prior-to-change state information "None" of the obtained start requesting terminal, and determines whether or not they are the same. Likewise, the state management unit 53 compares each communication state of each of the obtained destination terminal (terminal 10db) and the prior-to-change state information of the obtained destination terminal, and determines whether or not they are the same.

When, in step S43-3, it is determined that the prior-to-change state information and the communication state of the start requesting terminal are the same and the prior-to-change state information and the communication state of the destination terminal are the same (step S43-3, YES), the state management unit 53 obtains the change information of the start requesting terminal and destination terminal corresponding to the change request information "Invite" or "Private Invite" (step S43-4). In this case, the state management unit 53 searches the state change management table (see FIG. 17) using search keys which are the change request information "Invite" or "Private Invite" and the terminal information "start requesting terminal", and obtains the change information "Calling" or "Private Calling" of each start requesting terminal. Likewise, the state management unit 53 searches the state change management table (see FIG. 17) using search keys which are the change request information "Invite" or "Private Invite" and the terminal information "destination terminal", and obtains the change information "Ringing" or "Private Ringing" of each destination terminal.

Subsequently, the state management unit 53 changes the field portion of the communication state of the record including each of the terminal ID "01aa" and terminal ID "01db" in the terminal management table (see FIG. 11) on the basis of the terminal ID "01aa" of the start requesting terminal (terminal 10aa) and the terminal ID "01db" of the destination terminal (terminal 10db). In this case, the field portion of the communication state of the record including the terminal ID "01aa" of the terminal management table is changed to "Calling" or "Private Calling" on the basis of the obtained change information of the start requesting terminal. Likewise, the field portion of the communication state of the record including the terminal ID "01db" is changed to "Ringing" or "Private Ringing" on the basis of the obtained change information of the destination terminal.

When, in step S43-3, it is determined that the prior-to-change state information is not the same as the communication state of the request source terminal or the prior-to-change state information is not the same as the communication state of the destination terminal (step S43-3, NO), the state management unit 53 does not change the field portion of the communication state of the record including each of the terminal ID "01aa" and the terminal ID "01db" in the terminal management table (see FIG. 11). This is because any one of the start requesting terminal (terminal 10aa) and the destination terminal (terminal 10db) is not ready to start communication. In this case, the transmission and receiving unit 51 generates a predetermined error message, and transmits this to the start requesting terminal (terminal 10aa), and then the processing is completed (step S43-6). At this occasion, at the start requesting terminal, the error message is displayed on the display 120.

Subsequently, back to FIG. 24, subsequent processing after the communication state was changed in step S43-5 will be explained. First, the session ID generating unit 56a generates a session ID "se1" for identifying a session (content data session sed) for executing communication with the destination terminal requested by the start requesting terminal (terminal 10aa) (step S44). When the session ID is generated, the session management unit 57 stores the session ID "se1" to the volatile storage unit 5100.

Subsequently, the relay device selection unit 56 of the management system 50 selects a relay device 30 for relaying content data in content data session between the start requesting terminal (terminal 10aa) the destination terminal (terminal 10db) (step S45). In this case, first, the relay device extracting unit 56b searches the relay device selection management table (see FIG. 15) on the basis of the terminal ID "01aa" of the start requesting terminal (terminal 10aa) and the terminal ID "01db" of the destination terminal (terminal 10db) included in the start request information transmitted from the start requesting terminal (10aa), and extracts the relay device ID ("111a", "111d") corresponding to the terminal (10aa, 10db).

When the extracted relay device IDs are the same, the selection unit 56c looks up the operation state of the extracted relay device ID from among the operation state of the relay device 30 managed in the relay device management table (see FIG. 9). In this case, when the operation state of the relay device ID is the "ON line", then the selection unit 56c selects the extracted relay device as a relay device for relaying the content data. When the extracted relay device IDs are not the same, or the operation state of the relay device ID is the "OFF line" as a result of the looking up process, then the relay device 30e of the relay device ID "111e" is selected as a relay device for relaying the content data. In the present embodiment, subsequently, a case where the selection unit 56c selects the relay device 30e will be hereinafter explained.

When the selection processing of the relay device 30 is completed, the session management unit 57 stores and manages the relay device ID "111e" of the selected relay device, the terminal ID "01aa" of the start requesting terminal (terminal 10aa), and the terminal ID "01db" of the destination terminal (terminal 10db) in the field portion of the relay device ID of the record including the session ID "se1", the terminal ID of the start requesting terminal, and the terminal ID of the destination terminal in the session management table (see FIG. 13) of the non-volatile storage unit 5000 (step S46).

Subsequently, the transmission and receiving unit 51 illustrated in FIG. 5 transmits the session ID generated by the session ID generating unit 56a and the relay device connection information used to connect to the selected relay device 30e selected by the selection unit 56c via the communication network 2 to the start requesting terminal (terminal 10aa) (step S47). This relay device connection information may include the IP address "1.1.1.3", the authentication information, the port number and the like of the relay device 30e. Accordingly, when the terminal 10aa executes the session of the session ID "se1", the terminal 10aa can find the relay device connection information used for connecting to the relay device 30e used for relaying of content data.

Subsequently, the transmission and receiving unit 51 transmits the terminal ID "01aa", "Invite" or "Private Invite" of the start requesting terminal (terminal 10aa), the start request information including the session ID "se1", the relay device connection information used to connect to the relay device 30e, and the IP address of the management system 50 to the destination terminal (terminal 10db) (step S48). Accordingly, the transmission and receiving unit 11 of the destination terminal (terminal 10db) receives the start request information, and finds the relay device connection information used to connect to the relay device 30e used to relay content data and the IP address "1.1.1.2" of the management system 50 of the transmission source.

Subsequently, processing will be explained with reference to FIGS. 28 and 27. In this processing, the user of the destination terminal (terminal 10db) having received the start request information presses down the operation button 108 illustrated in FIG. 2, and a response indicating permission of start of communication (establishment of session) with the start requesting terminal (terminal 10aa) is received.

When the transmission and reception processing illustrated in FIG. 28 is started, the display 120db of the destination terminal (terminal 10db) displays a start request reception screen indicating reception of the start request information (step S49-1). As illustrated in FIG. 29, the start request reception screen 1300-1 indicates that the start request information has been received. Further, when the start request information includes restriction information indicating presence of participation restriction, then, for example, a message indicating presence of participation restriction, e.g., "this conference is participation restriction conference.", is displayed.

The user views this start request reception screen to confirm the reception of the start request, and further, can confirm whether or not the teleconference concerning the session which is requested to be started is participation restriction conference designating presence of participation restriction.

When the user of the destination terminal manipulates the operation button 108 of the destination terminal (terminal 10db), the operation input reception unit 12 receives a response indicating permission of start of communication (establishment of session) with the start requesting terminal (terminal 10aa) (step S49-2). Subsequently, the transmission and receiving unit 11 of the destination terminal (terminal 10db) transmits the terminal ID "01db" of the destination terminal (terminal 10db), the terminal ID "01aa" of the start requesting terminal (terminal 10aa), change request information "Accept" indicating permission of establishment of session, and start response information including the session ID "se1" to the management system 50 (step S50).

When the transmission and receiving unit 51 of the management system 50 receives this start response information, the state management unit 53 changes the field portion of the communication state of the record each including the terminal ID "01aa" and the terminal ID "01db" in the terminal management table (see FIG. 11) on the basis of the terminal ID "01aa" of the request source terminal (terminal 10aa) and the terminal ID "01db" of the destination terminal (terminal 10db) (step S51).

Hereinafter, the processing in step S51 will be explained in detail with reference to FIG. 27. First, the transmission and receiving unit 51 of the management system 50 receives this start response information, the state management unit 53 obtains the communication state of the terminal managed in the terminal management table (see FIG. 11) just like the processing in step S43-1 (step S51-1). In this case, the change request information determination unit 61 determines, in advance, that the change request information "Accept" received by the transmission and receiving unit 51 is particular change request information. On the basis of this, the state management unit 53 obtains not only the communication state "Ringing" or "Private Ringing" of the destination terminal (terminal 10db) but also the communication state "Calling" or "Private Calling" of the start requesting terminal (terminal 10aa).

Subsequently, the state management unit 53 obtains the prior-to-change state information "Calling", "Private Calling", "Accepted", and "Private Accepted" of the start requesting terminal corresponding to the change request information "Accept" managed in the state change management table (see FIG. 17) just like the processing in step S43-2.

Likewise, the state management unit 53 obtains the prior-to-change state information "Ringing" and "Private Ringing" of the destination terminal corresponding to the change request information "Accept" managed in the state change management table (see FIG. 17) (step S51-2).

Subsequently, the state management unit 53 compares the obtained communication state and the prior-to-change state information, and determines whether or not they are the same (step S51-3). In this case, the state management unit 53 determines whether the communication state "Calling" or "Private Calling" of the obtained start requesting terminal (terminal 10aa) is the same as any one of the prior-to-change state information "Calling", "Private Calling", "Accepted", and "Private Accepted" of the start requesting terminal. Likewise, the state management unit 53 determines whether the communication state "Ringing" or "Private Ringing" of the obtained destination terminal (terminal 10db) is the same as the prior-to-change state information "Ringing" or "Private Ringing" of the destination terminal.

When, in step S51-3, it is determined that the communication state of the start requesting terminal and the prior-to-change state information are the same and the communication state of the destination terminal and the prior-to-change state information are the same (step S51-3, YES), the state management unit 53 obtains the change information of the start requesting terminal and the destination terminal corresponding to the response information "Accept" (step S51-4). In this case, the state management unit 53 searches the state change management table (see FIG. 17) using search keys which are the response information "Accept", the terminal information "start requesting terminal" indicating the start requesting terminal, and the prior-to-change state "Calling" or "Private Calling" indicating the communication state of the start requesting terminal before the change, and obtains the change information "Accepted" or "Private Accepted" of each start requesting terminal. Likewise, the state management unit 53 searches the state change management table (see FIG. 17) using search keys which are the response information "Accept", the terminal information "destination terminal" indicating the destination terminal, and the prior-to-change state "Ringing" or "Private Ringing" indicating the communication state of the destination terminal before the change, and obtains the change information "Accepted" or "Private Accepted" of the destination terminal.

Subsequently, the state management unit 53 changes the field portion of the communication state of the record each including the terminal ID "01aa" and terminal ID "01db in the terminal management table (see FIG. 11) on the basis of the terminal ID "01aa" of the start requesting terminal (terminal 10aa) and the terminal ID "01db" of the destination terminal (terminal 10db) included in the start response information (step S51-5). In this case, the field portion of the communication state of the record including the terminal ID "01aa" of the terminal management table is changed to "Accepted" or "Private Accepted" on the basis of the change information of the obtained start requesting terminal. Likewise, the field portion of the communication state of the record including the terminal ID "01db" of the terminal management table is changed to "Accepted" or "Private Accepted" on the basis of the change information of the obtained destination terminal.

When, in step S51-3, it is determined that the communication state of the start requesting terminal (10aa) and the prior-to-change state information are not the same or the communication state of the destination terminal (terminal 10db) and the prior-to-change state information are not the same (step S51-3, NO), the state management unit 53 does not change the field portion of the communication state of the record each including the terminal ID "01aa" and terminal ID "01db" in the terminal management table (see FIG. 11). In this case, the transmission and receiving unit 51 generates this error message, and transmits this to the destination terminal (terminal 10db), and then the processing is completed (step S51-6).

Subsequently, back to FIG. 28, subsequent processing where the communication state has been changed in step S51-5 will be explained. The transmission and receiving unit 51 transmits the terminal ID "01db" of the destination terminal (terminal 10db), the change request information "Accept" indicating permission of request of start of communication with the destination terminal, and the start response information including the session ID "se1" to the start requesting terminal (terminal 10aa) (step S52). When this start response information is received, the start requesting terminal (terminal 10aa) causes the transmission and receiving unit 11 to transmit the session ID "se1" and the relay device connection information obtained in step S47 to the relay device 30e, thus connecting with the relay device 30e (step S53). On the other hand, the destination terminal (terminal 10db) causes the transmission and receiving unit 11 to transmit the session ID "se1" and the relay device connection information obtained in step S48 to the relay device 30e, thus connecting with the relay device 30e (step S54).

Subsequently, processing in which the relay device 30e starts relaying content data transmitted between the start requesting terminal (terminal 10aa) and the destination terminal (terminal 10db) will be explained with reference to FIG. 30. FIG. 30 illustrates processing for transmitting and receiving all of various kinds of management information by the management information session sei.

First, with predetermined timing after making connection with the relay device 30e (see step S53), the start requesting terminal (terminal 10aa) causes the transmission and receiving unit 11 to transmit the terminal ID "01aa" of the start requesting terminal (terminal 10aa), the session ID "se1", and relay request information including change request information "Join" indicating request of start of relay to the management system 50 (step S71-1).

When the transmission and receiving unit 51 of the management system 50 receives relay request information, the state management unit 53 changes the field portion of the communication state of the record including the terminal ID "01aa" in the terminal management table (see FIG. 11) on the basis of the terminal ID "01aa" of the start requesting terminal (terminal 10aa) included in the relay request information (step S72-1).

Hereinafter, the processing in step S72-1 will be explained in detail with reference to FIG. 31. In FIG. 31, the start requesting terminal is considered to be a transmission source of the relay request information, and is referred to as a relay requesting terminal. First, the state management unit 53 illustrated in FIG. 5 obtains the communication state of the terminal managed in the terminal management DB 5003 (step S72-1-1). In this case, the change request information determination unit 61 determines, in advance, that the change request information "Join" received by the transmission and receiving unit 51 is not particular change request information. Based on this, the state management unit 53 obtains only the communication state of the relay requesting terminal (terminal 10aa). In this case, the state management unit 53 searches the terminal management table (see FIG. 11) using a search key which is the terminal ID "01aa" of the relay requesting terminal (terminal 10aa), and obtains the communication state "Accepted" or "Private Accepted" of the relay requesting terminal (terminal 10aa) which requested start of the relaying.

Subsequently, the state management unit 53 obtains the prior-to-change state information corresponding to the change request information "Join" (step S72-1-2). In this case, the state management unit 53 searches the state change management table (see FIG. 16) using search key which is the change request information "Join", and obtains the prior-to-change state information "Accepted" or "Private Accepted".

Subsequently, the state management unit 53 compares the obtained communication state and the prior-to-change state information, and determines whether or not they are the same (step S72-1-3). In this case, the state management unit 53 compares the communication state "Accepted" or "Private Accepted" of the relay requesting terminal (terminal 10aa) thus obtained and the prior-to-change state information "Accepted" or "Private Accepted" obtained by the state management unit 53, and determines whether or not they are the same.

When, in step S72-1-3, it is determined that the communication state of the relay requesting terminal and the prior-to-change state information are the same (step S72-1-3, YES), the state management unit 53 obtains the change information corresponding to the change request information "Join" (step S72-1-4). In this case, the state management unit 53 searches the state change management table (see FIG. 16) using the change request information "Join" as a search key, and obtains the change information "Busy" or "Private Busy".

Subsequently, the state management unit 53 changes the field portion of the communication state of the record including the terminal ID "01aa" in the terminal management table (see FIG. 11) on the basis of the terminal ID "01aa" of the start requesting terminal (terminal 10aa) (step S72-1-5). In this case, the field portion of the communication state of the record including the terminal ID "01aa" of the terminal management table is changed to "Busy" or "Private Busy" on the basis of the obtained change information.

When, in step S72-1-3, it is determined that the communication state of the request source terminal and the prior-to-change state information are not the same (step S72-1-3, NO), the state management unit 53 does not change the field portion of the communication state of the record including the terminal ID "01aa" in the terminal management table (see FIG. 11). In this case, the transmission and receiving unit 51 transmits this error message to the start requesting terminal (terminal 10aa), and then the processing is completed (step S72-1-6).

Subsequently, back to FIG. 30, subsequent processing after the communication state was changed in step S72-1-5 will be explained. First, the management system 50 transmits the relay start request information including the terminal ID "01aa" of the relay requesting terminal (terminal 10aa) and the session ID "se1" to the relay device 30e (step S73-1). When this relay start request information is received, the relay device 30e transmits relay start permission information including a notice information "OK" indicating permission of start of relaying to the management system 50 (step S74-1). When this response is received, the transmission and receiving unit 51 of the management system 50 transmits this relay start permission information to the relay requesting terminal (terminal 10aa) (step S75-1). Accordingly, the content data session sed between the relay requesting terminal (terminal 10aa) and the relay device 30e is established (step S76-1).

On the other hand, with predetermined timing after making connection with the relay device 30e (see step S54 of FIG. 28), the destination terminal (terminal 10db) causes the transmission and receiving unit 11 to transmit the terminal ID "01db" of the destination terminal (terminal 10db), the session ID "se1", and relay request information including change request information "Join" indicating request of start of relay to the management system 50 (step S71-2).

Subsequently, the management system 50 and the relay device 30e execute the same processing as steps S72-1, S73-1, S74-1, S75-1, whereby the content data session sed between the destination terminal (terminal 10db) and the relay device 30a is established (step S72-2, S73-2, S74-2, S75-2, S76-2). In step S72-2, the destination terminal is treated as the transmission source of the relay request information, i.e., the relay requesting terminal. When the content data session sed between the relay requesting terminal (terminal 10aa) and the relay device 30e and the content data session sed between the destination terminal (terminal 10aa) and the relay device 30e are established, the relay device 30e can relay three pieces of image data including low resolution, medium resolution, and high resolution image data and the voice data between the terminals (10aa, 10db). Accordingly, the terminals (10aa, 10db) can start teleconference.

Subsequently, processing for transmitting and receiving content data in order to communicate for teleconference between the start requesting terminal (terminal 10aa) and the destination terminal (terminal 10db) will be explained with reference to FIGS. 5 and 32. Detection of a delay time explained later and the transmission and reception of the content data and the like are the same processing in both of the processing in one direction for transmitting content data from the terminal 10*aa* to the terminal 10*db* and the processing in the other direction for transmitting content data from the terminal 10*db* to the terminal 10*aa*, and therefore, only the communication in one direction will be explained, and the communication in the other direction will not be explained.

First, the start requesting terminal (terminal 10*aa*) uses the content data session sed to transmit voice data of voice which is input by the voice input unit 15*a* and the image data of the subject taken by the image capturing unit 14 to the relay device 30*e* via the communication network 2 from the transmission and receiving unit 11 (step S81). In the present embodiment, high quality image data including three pieces of image data including low resolution, medium resolution, and high resolution image data as illustrated in FIG. 21, and the voice data are transmitted. Accordingly, in the relay device 30*e*, the transmission and receiving unit 31 receives the image data of the three resolutions and the voice data.

Then, the data quality confirmation unit 33 searches the change quality management table (see FIG. 7) using the IP address "1.3.2.4" of the destination terminal (terminal 10*db*) as a search key, and extracts the corresponding image quality of the image data which are to be relayed, so that the quality of the image of the image data which are to be relayed is checked (step S82). In the present embodiment, the image quality of the image of the image data thus checked is "high image quality", and is the same as the image quality of the image data received by the transmission and receiving unit 31, and therefore, the relay device 30*a* uses the content data session sed to transfer the image data of the unchanged image quality and the voice data of the unchanged sound quality to the destination terminal (terminal 10*db*) (step S83). Accordingly, in the destination terminal (terminal 10*db*), the transmission and receiving unit 11 receives the content data, and the display control unit 16 can display an image based on the image data on the display 120, and the voice output unit 15*b* can output voice based on the voice data.

Subsequently, the delay detection unit 18 of the terminal 10*db* detects, with a regular interval of time (for example, every one second), the delay time of reception of the image data received by the transmission and receiving unit 11 (step S84). In the present embodiment, hereinafter explained is a case where the delay time is 200 (ms).

The transmission and receiving unit 11 of the destination terminal (terminal 10*db*) uses the management information session sei to transmit the delay information indicating the delay time "200 (ms)" to the management system 50 via the communication network 2 (step S85). Accordingly, the management system 50 finds the delay time, and can find the IP address "1.3.2.4" of the terminal 10*db* which is the transmission source of the delay information.

Subsequently, the delay time management unit 60 of the management system 50 searches the terminal management table (see FIG. 11) using the IP address "1.3.2.4" of the destination terminal (terminal 10*db*) as a search key to extract the corresponding terminal ID "01db", and further, stores and manages the delay time "200 (ms)" indicated by the delay information in the field portion of the delay time of the record of the terminal ID "01db" in the session management table (see FIG. 13) (step S86).

Subsequently, the quality determining unit 58 searches the quality management table (see FIG. 14) using the delay time "200 (ms)" as a search key to extract the corresponding image quality of the image data "medium image quality, thus determining that the image quality is "medium image quality" (step S87).

Subsequently, the transmission and receiving unit 51 searches the relay device management table (see FIG. 9) using a search key which is the relay device ID "111e" associated with the terminal ID "01db" in the session management table (see FIG. 13), and extracts the IP address "1.1.1.3" of the corresponding relay device 30*e* (step S88).

Then, the transmission and receiving unit 51 uses the management information session sei to transmit the quality information indicating the image quality of the image data "medium image quality" determined in the step S87 to the relay device 30*e* via the communication network 2 (step S89). This quality information includes the IP address "1.3.2.4" of the destination terminal (terminal 10*db*) used as the search key in the step S86. Accordingly, in the relay device 30*e*, the change quality management unit 34 stores and manages, in the change quality management table (see FIG. 7), the IP address "1.3.2.4" of the destination terminal 10 (in this case, the destination terminal (terminal 10*db*)) and the image quality of the relayed image data "medium image quality" in such a manner they are associated with each other (step S90).

Subsequently, like the step S81, the terminal 10*aa* uses the content data session sed to transmit high quality image data including three pieces of image data including low resolution, medium resolution, and high resolution image data, and the voice data to the relay device 30*e* (step S91). Accordingly, like the step S82, in the relay device 30*e*, the data quality confirmation unit 33 searches the change quality management table (see FIG. 7) using the IP address "1.3.2.4" of the destination terminal (terminal 10*db*) as a search key, and extracts the corresponding image quality of the corresponding image data "medium image quality" which are to be relayed, so that the quality of the image of the image data which are to be relayed is checked (step S92).

In the present embodiment, the checked image quality of the image data is "medium image quality", is lower than the image quality of the image data "high image quality" received by the transmission and receiving unit 31, the data quality change unit 35 suppresses the image quality of the image data from "high image quality" to "medium image quality", thus changing the quality of the image of the image data (step S93). Then, the transmission and receiving unit 31 uses the content data session sed to transmit, to the terminal 10*db* via the communication network 2, the image data of which image quality is changed to "medium image quality" and the voice data of which sound quality is not changed (step S94). As described above, when delay of reception occurs in the destination terminal (terminal 10*db*) receiving the image data, the relay device 30*e* can change the quality of the image to prevent a person participating in the teleconference from becoming uncomfortable.

During the teleconference, the terminal 10 participating in the teleconference, i.e., the display 120 of the terminal 10 participating in the already established session, may display whether the teleconference is using a session with participation restriction or the teleconference is using a session without participation restriction, so that the participant can recognize whether or not participation restriction is imposed in the teleconference.

Subsequently, processing will be explained with reference to FIG. 33, in which the content data session between the start requesting terminal (terminal 10*aa*) and the destination terminal (terminal 10*db*) is established, and thereafter the terminal 10*cb* transmits the participation request information requesting participation in this content data session. More specifically, the terminal 10cb operates as the participation requesting terminal transmitting the participation request information. FIG. 33 illustrates processing for transmitting and receiving all of various kinds of management information by the management information session sei.

When the user wants to participate in the already established session which is a session that has already been established and participate in the teleconference using this session, then the user uses the login processing explained with reference to FIG. 22 with the terminal used by the user (in this case, the terminal 10cb) to display a destination list on the display 120cd of the terminal 10cd (step S101).

As illustrated in FIG. 34, the display 120cd of the terminal 10cd displays a destination list 1400 displaying a list of destination terminals with which the terminal 10cd serving as the start requesting terminal can establish a session.

The user of the participation requesting terminal (terminal 10cb) operates the operation button 108 illustrated in FIG. 2 and selects a terminal that has already participated in the session in which the user wants to participate (hereinafter referred to as participating terminal) from the destination list 1400. In response to this, the operation input reception unit 12 receives the participation request for participating in the content data session that has been already established (step S104). Hereinafter, a case where the terminal 10db serving as the participating terminal is selected will be explained.

Accordingly, the transmission and receiving unit 11 of the participation requesting terminal (terminal 10cb) requesting participation transmits, to the management system 50, the terminal ID "01cb" of the participation requesting terminal (terminal 10cb), the change request information "Call" indicating request for participating in the content data session, and the participation request information including the terminal ID "01db" of the selected participating terminal (step S105).

When the management system 50 receives the session participation request information, the management system 50 uses the destination list management table (FIG. 12) to determine whether or not to continue processing to connect the participation requesting terminal (terminal 10cb) and the participating terminal (terminal 10aa, 10db) that has already participated in the content data session sed (step S106). Hereinafter, the processing in step S106 will be explained in detail with reference to FIG. 35. FIG. 35 is a processing flow diagram illustrating determination processing of participation based on a communication state.

First, the state management unit 53 looks up the terminal management table (FIG. 11), and obtains the communication state of the participating terminal (terminal 10db) using the terminal ID "01db" of the selected participating terminal (terminal 10db) as a search key indicated by the participation request information (step S106-1). Subsequently, the participation determination unit 63 looks up the obtained communication state. When the obtained communication state is "Busy" (step S106-2, Busy), the participation determination unit 63 allows the participation requesting terminal to participate in the already established session (step S106-3).

On the other hand, when the obtained communication state is "Private Busy" (step S106-2, Private Busy), the participation determination unit 63 prohibits the participation requesting terminal from participating in the already established session (step S106-4). Then, the transmission and receiving unit 11 transmits an error message for notifying that it is not allowed to participate in the session to the participation requesting terminal (terminal 10cd) (step S106-5). When the participation requesting terminal (terminal 10cd) receives the error message, this is displayed on the display 120.

Subsequently, back to FIG. 33, the participation requesting terminal (terminal 10cb) is allowed to participate in the already established session, and processing is continued to connect the participation requesting terminal with the participating terminal (terminal (10aa, 10db)), and processing subsequent thereto will be hereinafter explained. First, the state management unit 53 of the management system 50 changes the field portion of the communication state of the record including the terminal ID "01cb" in the terminal management table (see FIG. 11) on the basis of the terminal ID "01cb" of the participation requesting terminal (terminal 10cb) included in the participation request information (step S107).

Hereinafter, the processing in step S107 will be explained in detail with reference to FIG. 36. First, the state management unit 53 illustrated in FIG. 5 obtains the communication state of the participation requesting terminal managed by the terminal management DB (step S107-1). In this case, the change request information determination unit 61 determines, in advance, that the change request information "Call" received by the transmission and receiving unit 51 is not particular change request information. Based on this, the state management unit 53 obtains only the communication state of the participation requesting terminal (terminal 10cb). In this case, the state management unit 53 searches the terminal management table (see FIG. 11) using the terminal ID "01cb" of the participation requesting terminal (terminal 10cb) as a search key, and obtains the communication state "None" of the participation requesting terminal (terminal 10cb).

Subsequently, the state management unit 53 obtains the prior-to-change state information of the destination terminal corresponding to the change request information "Call" (step S107-2). In this case, the state management unit 53 searches the state change management table (see FIG. 16) using the change request information "Call" as a search key, and obtains the prior-to-change state information "None".

Subsequently, the state management unit 53 compares the communication state of the obtained participation requesting terminal and the prior-to-change state information, and determines whether or not they are the same (step S107-3). In this case, the state management unit 53 compares the communication state "None" of the participating requesting terminal (terminal 10cb) and the prior-to-change state information "None" of the obtained start requesting terminal, and determines whether or not they are the same.

When, in step S107-3, it is determined that the communication state of the participation requesting terminal and the prior-to-change state information are the same (step S107-3, YES), the state management unit 53 obtains the change information corresponding to the change request information "Call" (step S107-4). In this case, the state management unit 53 searches the state change management table (see FIG. 16) using the change request information "Call" as a search key, and obtains the change information "Accepted".

Subsequently, the state management unit 53 changes the field portion of the communication state of the record including the terminal ID "01cb" in the terminal management table (see FIG. 11) on the basis of the terminal ID "01cb" of the participation requesting terminal (terminal 10cb) (step S107-5). In this case, the field portion of the communication state of the record including the terminal ID "01cb" of the terminal management table is changed to "Accepted" on the basis of the obtained change information.

When, in step S107-3, it is determined that the communication state of the terminal requesting participation and the prior-to-change state information are not the same (step S107-3, NO), the state management unit 53 does not change the field portion of the communication state of the record including the terminal ID "01cb" in the terminal management table (see FIG. 11). In this case, the transmission and receiving unit 51 transmits this error message to the participation requesting terminal (terminal 10cb), and then the processing is completed (step S107-6).

Subsequently, back to FIG. 33, subsequent processing after the communication state was changed in step S107-5 will be explained. First, the session management unit 57 adds the terminal ID "01cb" of the participation requesting terminal (terminal 10cb) to the field portion of the destination terminal of the record including the session ID "se1" in the session management table (see FIG. 13) of the non-volatile storage unit 5000 (step S108).

Subsequently, when, in step S106-3 illustrated in FIG. 35, the participation requesting terminal is allowed to participate in the already established session (content data session sed), the transmission and receiving unit 51 of the management system 50 transmits the session ID "se1" and the participation permission notice including the relay device connection information used to connect to the relay device 30e to the participation requesting terminal (terminal 10cb) (step S109).

When the terminal 10cb receives this participation permission notice, the transmission and receiving unit 11 transmits the session ID "se1" and the relay device connection information included in the participation permission notice to the relay device 30e, thus making connection with the relay device 30e (step S110). On the other hand, with predetermined timing after making connection with the relay device 30e, the participation terminal (terminal 10cb) causes the transmission and receiving unit 11 to transmit the terminal ID "01cb" of the terminal 10cb, the session ID "se1", and relay request information including change request information "Join" indicating request of start of relay to the management system 50 (step S71-2). Subsequently, the management system 50 and the relay device 30e execute the same processing as steps S72-1, S73-1, S74-1, and S75-1, whereby the content data session sed between the terminal 10cb and the relay device 30e is established. When this content data session sed is established, the relay device 30e can relay three pieces of image data including low resolution, medium resolution, and high resolution image data and the voice data between the terminals (10aa, 10cb, 10db). Accordingly, the terminals (10aa, 10cb, 10db) can start teleconference.

The transmission and receiving unit 51 of the management system 50 transmits the terminal ID "01cb" of the participation requesting terminal (terminal 10cb) and participation notice including the session ID "se1" to the participation terminals (terminal 10aa, terminal 10db)) that have already started the content data session sed (step S111-1, S111-2). Accordingly, the participation terminals (terminal 10aa, terminal 10db)) can find that the participation requesting terminal (terminal 10cb) participates in the content data session.

The terminal extracting unit 54 searches the destination list management table (see FIG. 12) using a search key which is the terminal ID of the participation requesting terminal (terminal 10cb) included in the session participation request information, and reads the terminal ID of the destination terminal corresponding to the participation requesting terminal, so that the terminal IDs "01aa, 01bb, 01db" are extracted (step S112). The transmission and receiving unit 51 of the management system 50 transmits participation notice including terminal ID "01cb" (an example of participation information) to the terminal 10bb, which does not transmit the participation notice, from among the terminals (10aa, 10bb, 10db) identified by the extracted terminal IDs (step S113). Accordingly, the terminal 10bb can find that the participation requesting terminal (terminal 10cb) participates in the content data session.

Subsequently, processing will be explained with reference to FIG. 37, in which the content data session between the terminals (10aa, 10cb, and 10db) is established, and thereafter the terminal 10aa exits from the content data session. FIG. 37 illustrates processing for transmitting and receiving all of various kinds of management information by the management information session sei.

First, the user of the terminal 10aa presses down the operation button 108 as illustrated in FIG. 2, whereby the request for exiting from the content data session is received (step S121). Then, the transmission and receiving unit 11 of the terminal 10aa transmits the terminal ID "01aa" of the terminal 10aa, change request information "Leave" indicating exit request from exiting from the content data session, and the session ID "se1" to the management system 50 (step S122). Hereinafter, the terminal which is the transmission source of the exit request information will be referred to as an exit requesting terminal.

When this exit request information is received, the state management unit 53 of The management system 50 changes the field portion of the communication state of the record including the terminal ID "01aa" in the terminal management table (see FIG. 11) on the basis of the terminal ID "01aa" of the terminal 10aa included in the session exit request information (step S123).

Hereinafter, the processing in step S123 will be explained in detail with reference to FIG. 31. In this case, the "relay requesting terminal" as illustrated in FIG. 31 will be deemed to be replaced with "exit requesting terminal". First, the state management unit 53 illustrated in FIG. 5 obtains the communication state of the terminal managed in the terminal management DB (step S123-1). In this case, the change request information determination unit 61 determines, in advance, that the change request information "Leave" received by the transmission and receiving unit 51 is not particular change request information. Based on this, the state management unit 53 obtains only the communication state of the exit requesting terminal (terminal 10aa). In this case, the state management unit 53 searches the terminal management table (see FIG. 11) using the terminal ID "01aa" of the terminal 10aa as a search key, and obtains the communication state "Busy" or "Private Busy" of the exit requesting terminal (terminal 10aa).

Subsequently, the state management unit 53 obtains the prior-to-change state information corresponding to the change request information "Leave" (step S123-2). In this case, the state management unit 53 searches the state change management table (see FIG. 16) using the change request information "Leave" as a search key, and obtains the prior-to-change state information "Busy" or "Private Busy".

Subsequently, the state management unit 53 compares the obtained communication state and the prior-to-change state information, and determines whether or not they are the same (step S123-3). In this case, the state management unit 53 compares the communication state "Busy" or "Private Busy" of the obtained exit requesting terminal (terminal 10aa) and the prior-to-change state information "Busy" or "Private Busy", and determines whether or not they are the same.

When, in step S123-3, it is determined that the communication state of the terminal and the prior-to-change state information are the same (step S123-3, YES), the state management unit 53 obtains the change information corresponding to the change request information "Leave" (step S72-1-4). In this case, the state management unit 53 searches the state change management table (see FIG. 16) using the change request information "Leave" as a search key, and obtains the change information "None".

Subsequently, the state management unit 53 changes the field portion of the communication state of the record including the terminal ID "01aa" in the terminal management table (see FIG. 11) on the basis of the terminal ID "01aa" of the exit requesting terminal (terminal 10aa) (step S123-5). In this case, the field portion of the communication state of the record including the terminal ID "01aa" of the terminal management table is changed to "None" on the basis of the obtained change information.

When, in step S123-3, it is determined that the communication state of the exit requesting terminal and the prior-to-change state information are not the same (step S113-3, NO), the state management unit 53 does not change the field portion of the communication state of the record including the terminal ID "01aa" in the terminal management table (see FIG. 11). In this case, the error message is sent to the exit requesting terminal (terminal 10aa), and then the processing is completed (step S123-6).

Subsequently, back to FIG. 37, subsequent processing after the communication state was changed in step S123-5 will be explained. First, the session management unit 57 deletes the terminal ID "01aa" of the terminal 10aa from the field portion of the exit requesting terminal of the record including the session ID "se1" in the session management table (see FIG. 13) of the non-volatile storage unit 5000 (step S124). The management system 50 transmits the exit request of the session to the relay device 30e (step S125). In this case, the exit request is a notification indicating request of existing from the session, and includes the terminal ID "01aa" of the exit requesting terminal (terminal 10aa) and the session ID "se1". Accordingly, the relay device 30e stops the content data session with the terminal 10aa, and disconnects the connection with the terminal 10aa. Subsequently, the relay device 30e transmits the exit permission of the session to the management system 50 (step S126). In this case, the exit permission is a notification indicating permission of the exit request, and includes the terminal ID "01aa" of the exit requesting terminal (terminal 10aa) and the session ID "se1".

When the management system 50 receives a notification indicating permission of the request of exit, the transmission and receiving unit 51 transmits session exit permission information including the terminal ID "01aa" of the exit requesting terminal (terminal 10aa), the change request information "Leave", the session ID "se1", notification information "OK" indicating permission of the request of exit to the terminal 10aa (step S127). When the session exit permission information is received, the exit requesting terminal (terminal 10aa) receives request of turning off the power when the power supply switch 109 as illustrated in FIG. 2 is pressed down (step S128). When the request for turning off the power is received, the transmission and receiving unit 11 transmits disconnection request information including notification indicating information for disconnecting connection between the terminal ID "01aa" of the exit requesting terminal (terminal 10aa) and the management system 50 to the management system 50 (step S129).

When the transmission and receiving unit 51 of the management system 50 receives this disconnection request information, the state management unit 53 deletes the record of the field portion of the communication state of the record including the terminal ID "01aa" in the terminal management table (see FIG. 10) on the basis of the terminal ID "01aa" of the exit requesting terminal (terminal 10aa) included in the disconnection request information (step S130). Subsequently, the transmission and receiving unit 51 transmits disconnection permission information indicating permission of the request of disconnection to the exit requesting terminal (terminal 10aa) (step S131). Accordingly, the management system 50 stops the management data session with the exit requesting terminal (terminal 10aa), and disconnects the connection with the exit requesting terminal (terminal 10aa).

When the disconnection permission information is received, the exit requesting terminal (terminal 10aa) executes the power-off and then the processing is completed (step S132). Like the processing steps S121 to S131 of the exit requesting terminal (terminal 10aa), both of the terminal 10cb and the terminal 10db can exit from the content data session sed and can complete communication between terminals.

Main Effect of Embodiment

As described above, according to the present embodiment, when a session for transmitting content data is established between the first terminal (terminal 10aa) and the second terminal (terminal 10db), the transmission and receiving unit 51 of the management system 50 receives the request of participation for participating in this session from the third terminal (terminal 10cb). Then, when the established session is a session with participation restriction, the participation determination unit 63 prohibits the third terminal from participating in the session, and when it is a session without participation restriction, the participation determination unit 63 allows the third terminal to participate in the session. Accordingly, the management system 50 can restrict participation in a session used for, e.g., a conference involving exchange of highly confidential information.

The management system 50 performs control to connect the first terminal (terminal 10aa), the second terminal (terminal 10db), and the third terminal (terminal 10cb). In this case, the transmission and receiving unit 51 transmits, to the third terminal, relay device connection information for connection with the relay device 30e for relaying the content data transmitted from the first terminal to the second terminal. Accordingly, the third terminal uses this relay device connection information to connect to the relay device 30e.

The present invention has been hereinabove explained with reference to the embodiment, but various changes or improvements can be applied to the embodiment.

The present embodiment is configured such that when the start requesting terminal selects the terminal 10 with which conference is to be held from among the destination list (see FIG. 23) displayed on the display 120 in the processing as illustrated in FIG. 22, the call request confirmation dialogue 1200-1 as illustrated in FIG. 26 is displayed in the processing of step S41-1 in FIG. 25, and in accordance with user's operation, the start requesting terminal receives the designation of presence or absence of the participation restriction, but in the first modification, instead of the above, the start requesting terminal may first receive the designation of presence or absence of the participation restriction, and thereafter, may receive selection of the terminal with which the start requesting terminal holds the teleconference designating with participation restriction or without participation restriction.

Figure 38:
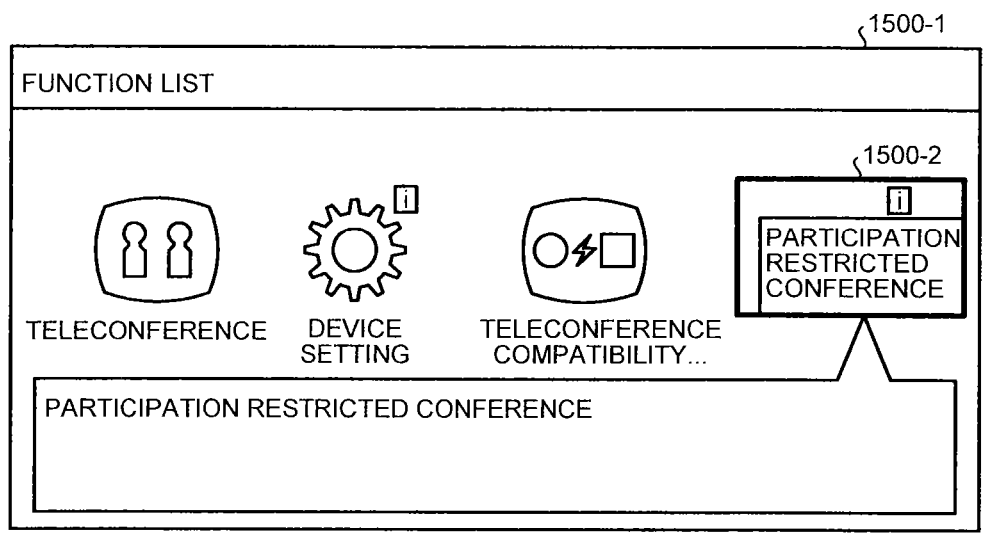
FIG. 38 is a figure illustrating an example of display of a function list.

More specifically, first, the display control unit 16 displays a function list 1500-1 as illustrated in FIG. 38 on the display 120. When, in the function list 1500-1, the user presses down the operation button 108 to select the icon 1500-2 of the participation restriction conference, then the operation input reception unit 12 receives restriction information for a session with participation restriction. Further, when the icon 1500-2 of the participation restriction conference is selected, the display control unit 16 displays the destination list as illustrated in FIG. 23, and the user presses down the operation button 108, whereby the operation input reception unit 12 receives selection of the other terminal 10.

Subsequently, the second modification will be explained. In the present embodiment, when the participation requesting terminal selects a participating terminal participating in a session which it wants to participate in, a destination list indicating an icon reflecting the state information of the destination terminal candidate is displayed in the destination list management table (FIG. 12) (see FIG. 34) in step S101 as illustrated in FIG. 33, but in this modification, a terminal 10 participating in a conference with participation restriction as well as an icon indicating the operation state of OFF line are displayed in the destination list. Accordingly, this can prevent users other than those participating in the teleconference from knowing that the teleconference with participation restriction is being held. Hereinafter, the processing according to the second modification will be explained.

Figure 39:
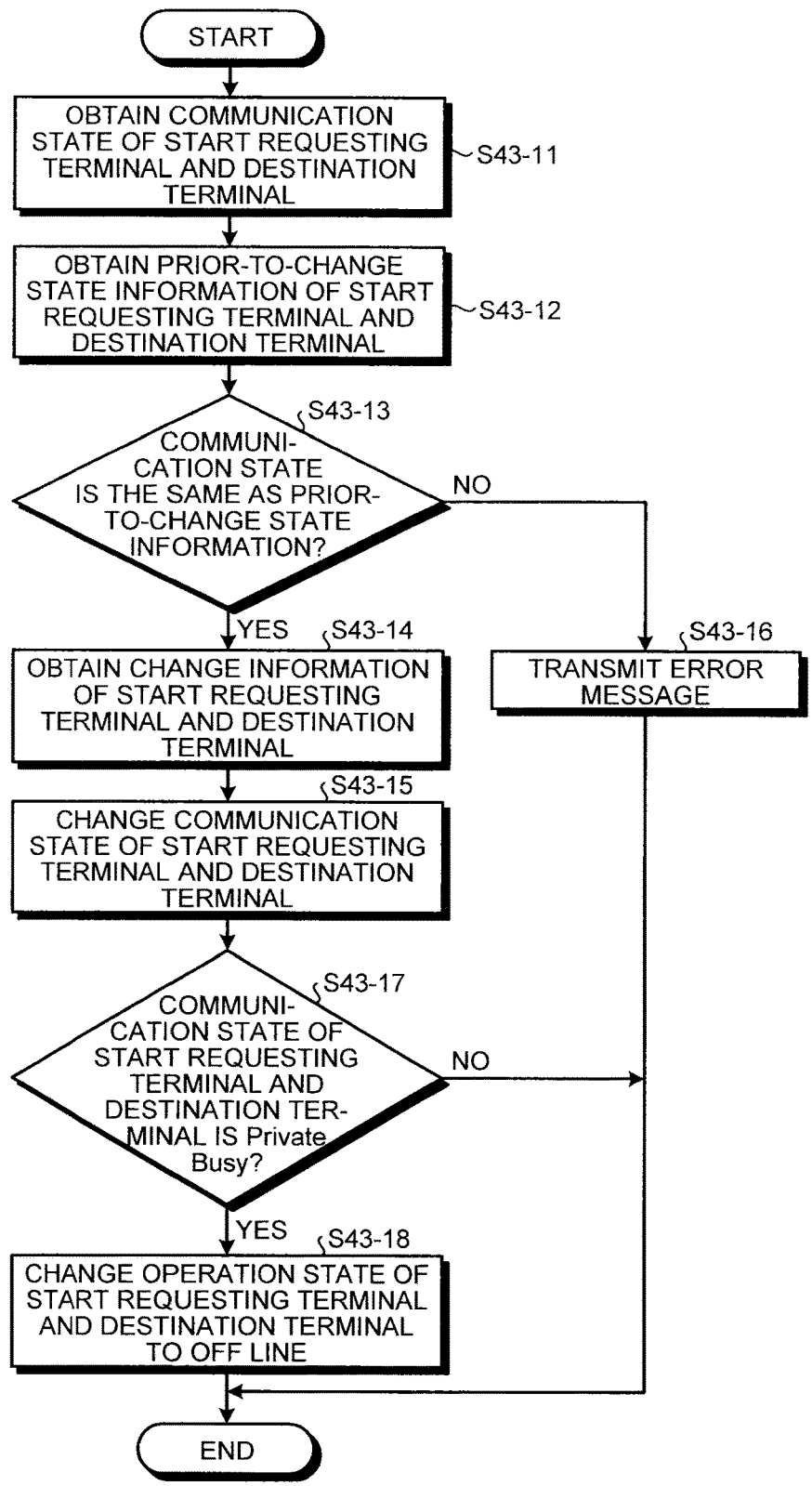
FIG. 39 is a processing flow diagram illustrating processing for changing the state of communication according to a second modification.
Figure 40:
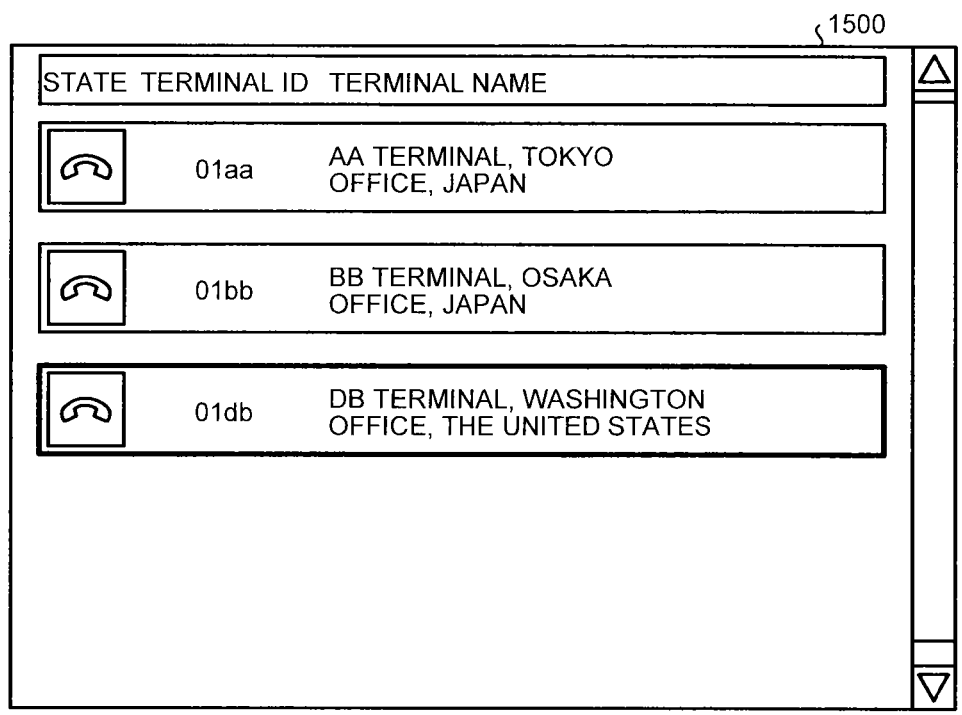
FIG. 40 is a figure illustrating an example of display of a destination list according to the second modification.

In the processing according to the second modification, the processing in step S43 in FIG. 24 is different from processing according to the embodiment. FIG. 39 is a flow diagram illustrating processing for changing the communication state in step S43 according to the second modification. As illustrated in FIG. 39, the processing in step S43-11 to step S43-16 is the same as step S43-1 to step S43-6 explained in the embodiment with reference to FIG. 27.

In the second modification, the communication state of the start requesting terminal and destination terminal is changed in step S43-15, and thereafter, further, the state management unit 43 checks the communication state after the change of the start requesting terminal and the destination terminal. When the changed communication state is "Private Busy" (step S43-17, YES), further, the state management unit 43 changes the operation state associated with the start requesting terminal and the destination terminal in the terminal management table (see FIG. 11) from "ON line" to "OFF line" (step S43-18). On the other hand, when, in step S43-17, the communication state of the start requesting terminal and the destination terminal is not "Private Busy" (step S43-17, NO), the processing in step S43 is completed.

As described above, in the second modification, when the communication state is "Private Busy", the operation can be caused to be "OFF line" regardless of the actual operation state. Accordingly, a terminal participating in teleconference with participation restriction is treated as having "OFF line" operation state in the management system 50. Therefore, when the participation requesting terminal displays the destination list in step S101 as illustrated in FIG. 33, a terminal participating in teleconference with participation restriction, i.e., a terminal participating in an already established session with participation restriction, is displayed as "OFF line" operational state as illustrated in a destination list 1500 shown in FIG. 40.

Therefore, a user who wants to participate therein cannot select the terminal as a destination terminal, and moreover, the user does not know the terminal is participating in teleconference with participation restriction.

In the processing explained in the embodiment, the user who wants to participate in the teleconference receives the error message when selecting a terminal participating in conference with participation restriction, and therefore, the user knows that it is conference with participation restriction. More specifically, a third party who is not participating in conference may guess that highly confidential information is being exchanged. In order to avoid such situation, it is better to hide the fact itself that conference is being held from a third party other than participants in the conference if the conference is highly confidential.

In contrast, according to the second modification processing, a terminal participating in a conference with participation restriction is illustrated as "OFF line" operation state. Accordingly, a conference with participation restriction is hidden so that the fact itself that the conference is being held is hidden from a third party, and therefore, this can reduce the risk of allowing a third party to guess that highly confidential information is exchanged.

Supplement to Embodiment

The management system 50 and the program providing system 90 according to each of the embodiments may be structured by a single computer, or may be structured by multiple computers made by dividing the units (functions or means) and allocating them in any way. When the program providing system 90 is structured by a single computer, the program transmitted by the program providing system 90 may be transmitted as being divided into multiple modules, or may be transmitted without being divided into multiple modules. Further, when the program providing system 90 is structured by multiple computers, each computer may transmit the program in such a manner that it is divided into multiple modules.

Any one of a recording medium storing the programs for terminals, the program for the relay device, and the programs for managing transmission and the HD 204 storing these programs, and the program providing system 90 having the HD 204 according to the present embodiment is treated as program product, and used when, e.g., the programs for terminals, the program for the relay device, and the programs for managing transmission are provided to users in this country or foreign countries.

Further, in the embodiment, the quality of image of image data relayed by the relay device 30, e.g., the resolution of the image of the image data, is used for the management with the change quality management table illustrated in FIG. 7 and the quality management table illustrated in FIG. 14, but the embodiment is not limited thereto. Other examples of qualities include the depth of the image quality of the image data, the sampling frequency of voice of voice data, and the bit length of the voice of the voice data, which may be used for management.

In the relay device management table illustrated in FIG. 15, the terminal management table illustrated in FIG. 11, and the session management table illustrated in FIG. 13, the reception date/time is managed. But the embodiment is not limited thereto. At least reception time of the reception date/time may be managed.

Further, in the embodiment, the IP address of the relay device is managed in the relay device management table illustrated in FIG. 9, and the IP address of the terminal is managed in the terminal management table illustrated in FIG. 11. But the embodiment is not limited thereto. As long as it is relay device identifying information for identifying the relay device 30 on the communication network 2 or terminal identifying information identifying the terminal 10 on the communication network 2, the FQDN (Fully Qualified Domain Name) of each of them may be managed. In this case, a known DNS (Domain Name System) server obtains the IP address corresponding to the FQDN. It should be noted that it may be expressed as not only "the relay device identifying information identifying the relay device 30 on the communication network 2" but also "the relay device connection destination information indicating the connection destination to the relay device 30 on the communication network 2" or "the relay device destination information indicating the destination to the relay device 30 on the communication network 2". Likewise, it may be expressed as not only "the terminal identifying information identifying the terminal 10 on the communication network 2" but also "the terminal connection destination information indicating the connection destination to the terminal 10 on the communication network 2" or "the terminal destination information indicating the destination to the terminal 10 on the communication network 2".

In the present embodiment, "teleconference" is used as a word that can be replaced with "video conference".

In the embodiment, for example, the transmission system 1 is teleconference system. But the embodiment is not limited thereto. It may be an IP (Internet Protocol) telephone and a telephone system such as the Internet telephone. The transmission system 1 may be car navigation system. In this case, for example, one of the terminals 10 corresponds to a car navigation device provided a vehicle, and the other of the terminals 10 corresponds to a management terminal or a management server of a management center managing the car navigation, or a car navigation device provided in another vehicle. Further, the transmission system 1 may be a voice conference system or a PC (Personal Computer) screen sharing system.

Figure 41:
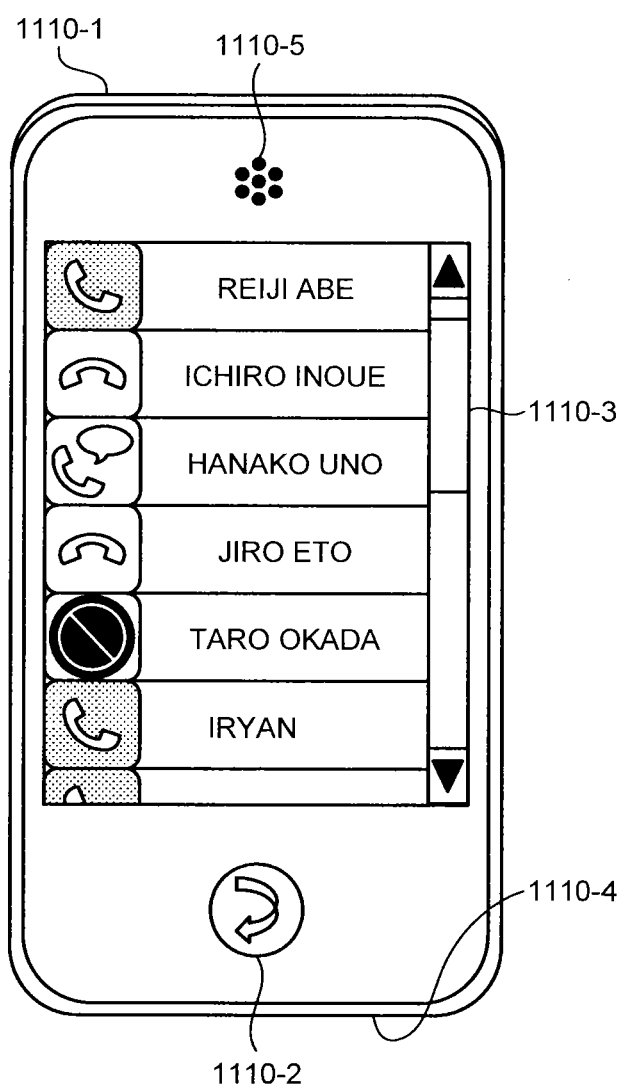
FIG. 41 is a conceptual diagram illustrating a destination list according to another embodiment.

Further, the transmission system 1 may be a communication system for cellular phones. In this case, for example, a terminal 10 corresponds to a cellular phone. In this case, an example of display of destination list is illustrated in FIG. 41. FIG. 41 is a conceptual diagram illustrating a destination list according to another embodiment. More specifically, the terminal 10 serving as the cellular phone includes a cellular phone main body 1110-1, a menu screen display button 1110-2 provided on the main body 1110-1, a display unit 1110-3 provided on the main body 1110-1, a microphone 1110-4 provided at a lower portion of the main body 1110-1, and a speaker 1110-5 provided on the main body 1110-1. Among them, the "menu screen display button" 1110-2 is a button for displaying a menu screen displaying icons illustrating various kinds of applications. The display unit 1110-3 is a touch panel, and the user selects a destination name, and accordingly, the user can communicate with the cellular phone of the other party.

In the embodiment, for example, the content data are image data and voice data. But the embodiment is not limited thereto. The content data may be tactile (touch) data. In this case, the feeling of user touch at one of the terminals is transmitted to the other of the terminals. Further, the content data may be smell data. In this case, smell at one of the terminals is transmitted to the other of the terminals. The content data may be at least one piece of data including image data, voice data, tactile data, and smell data.

Furthermore, while a case in which a teleconference is conducted by using the transmission system 1 is described in the embodiment, the embodiment is not limited thereto but may also be used for a meeting, ordinary conversation between family members or friends or one-way presentation of information.

According to the embodiment of the present invention, there is an advantage in that a terminal that is allowed to join communication can be restricted in an easy and appropriate manner.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication server to manage a plurality of terminals, the communication server comprising:
   a first memory storing, for each terminal of the plurality of terminals, a current operational state of the terminal, the operational state being at least one of (1) online, in which communication with the terminal is possible, (2) busy, in which a session with the terminal has been established, and (3) off-line, in which communication with the terminal is not possible; and
   processing circuitry configured to
      obtain, from a first terminal over a network, information for requesting start of a session between the first terminal and a second terminal of the plurality of terminals, the start request information including a designation having a value being either a first value indicating presence of a participation restriction restricting all terminals of the plurality of terminals, other than the first terminal and the second terminal, from participating in the session at a time after the session between the first and second terminals has been established, or a second value indicating absence of the participation restriction, the value of the designation being determined by user input from a user of the first terminal, prior to the processing circuitry obtaining the start request information;

establish the session between the first terminal and the second terminal in accordance with the start request information;

when the value of the designation is the first value, change, in the first memory, the current operational state of each of the first and second terminals in the established session to offline, rather than busy;

obtain, from a third terminal of the plurality of terminals, participation request information in which the third terminal requests participation in the already established session between the first terminal and the second terminal; and allow the third terminal to participate in the already established session when the designation in the start request information, obtained from the first terminal prior to establishment of the session, has the second value indicating absence of the participation restriction, and to prohibit the third terminal from participating in the already established session when the designation in the start request information, obtained from the first terminal prior to establishment of the session, has the first value indicating presence of the participation restriction restricting all terminals other than the first and second terminals from participating in the session.

2. A communication system, comprising:
the communication server of claim 1; and
the plurality of terminals.

3. The communication system according to claim 2, further comprising a first-terminal display control circuit configured to display, on a display of the first terminal, a selection reception screen to receive selection of the participation restriction of the session,
wherein the processing circuitry obtains the start request information including the value of the designation in accordance with the user input by the user to the selection reception screen.

4. The communication system according to claim 2, further comprising:
a second memory configured to store therein an identifier of each of the plurality of terminals in association with teleconferencing terminal candidates with which each terminal can establish a session;
a third-terminal display control circuit configured to display, on a display of the third terminal, the teleconferencing terminal candidates associated with the third terminal in the second memory in such a manner as to allow a user to make a selection; and
an input reception circuit configured to receive selection input by the user from among the teleconferencing terminal candidates displayed by the display,
wherein the processing circuitry obtains the participation request information for the already established session in which the selected teleconferencing terminal candidate is participating.

5. The communication system according to claim 4, wherein when a teleconferencing terminal candidate associated with the third terminal in the second memory is participating in the already established session, the third-terminal display control circuit displays teleconferencing terminal candidates other than the teleconferencing terminal candidate participating in the already established session on the display of the third terminal in such a manner as to allow the user to make the selection.

6. The communication system according to claim 5, wherein the third-terminal display control circuit displays, on the display of the third terminal, the teleconferencing terminal candidates in association with a current an operational state of each of the teleconferencing terminal candidates, which is obtained from the first memory.

7. The communication system according to claim 2, further comprising a third-terminal display control circuit configured to display, on a display of the third terminal, participation prohibition information indicating that the participation is prohibited when the processing circuitry prohibits the third terminal from participating in the already established session.

8. The communication system of claim 2, further comprising a second-terminal display control circuit configured to output, to a display of the second terminal, notification information indicating that the participation restriction is imposed on the session, when the start request information obtained by the processing circuitry designates presence of the participation restriction.

9. A communication method, comprising:
obtaining, from a first terminal over a network, information for requesting start of a session between the first terminal and a second terminal of a plurality of terminals, the start request information including a designation having a value being either a first value indicating presence of a participation restriction restricting all terminals of the plurality of terminals, other than the first terminal and the second terminal, from participating in the session at a time after the session between the first and second terminals has been established, or a second value indicating absence of the participation restriction, the value of the designation being determined by user input from a user of the first terminal, prior to the obtaining of the start request information;

storing, in a first memory for each terminal of the plurality of terminals, a current operational state of the terminal, the operational state being at least one of (1) online, in which communication with the terminal is possible, (2) busy, in which a session with the terminal has been established, and (3) off-line, in which communication with the terminal is not possible;

establishing, by processing circuitry, a session between the first terminal and the second terminal in accordance with the start request information;

when the value of the designation is the first value, changing, in the first memory, the current operational state of each of the first and second terminals in the established session to offline, rather than busy;

obtaining, from a third terminal of the plurality of terminals, participation request information with which the third terminal requests participating in the already established session between the first terminal and the second terminal; and allowing the third terminal to participate in the already established session when the designation in the start request information, obtained prior to establishment of the session, has the second value indicating absence of the participation restriction, and prohibiting the third terminal from participating in the already established session when the designation in the start request information, obtained prior to establishment of the session, has the first value indicating presence of the participation restriction restricting all terminals other than the first and second terminals from participating in the session.

10. The communication method according to claim 9, further comprising displaying a selection reception screen receiving selection of the participation restriction of the session on a display of the first terminal,
wherein the obtaining step comprises obtaining the start request information including the value of the designation in accordance with the user input by the user to the selection reception screen.

11. The communication method according to claim 9, further comprising:
storing in a second memory that is included in the communication system an identifier of each of the plurality of terminals in association with teleconferencing terminal candidates with which each terminal can establish a session;
displaying the teleconferencing terminal candidates associated with the third terminal in the second memory on a display of the third terminal in such a manner as to allow a user to make a selection; and
receiving selection input by the user from among the teleconferencing terminal candidates displayed by the display,
wherein the obtaining step comprises obtaining the participation request information for the already established session in which the selected teleconferencing terminal candidate is participating.

12. The communication method according to claim 11, wherein when a teleconferencing terminal candidate associated with the third terminal in the second memory is participating in the already established session, the displaying step comprises displaying the teleconferencing terminal candidates other than the teleconferencing terminal candidate participating in the already established session on the display of the third terminal in such a manner as to allow the user to make the selection.

13. The communication method according to claim 12, wherein the displaying step comprises displaying, on the display of the third terminal, the teleconferencing terminal candidates in association with a current operational state of each of the teleconferencing terminal candidates, which is obtained from the first memory.

14. The communication method according to claim 9, wherein the prohibiting step further comprises displaying on the display of the third terminal, participation prohibition information indicating that the participation is prohibited.

15. The communication method of claim 9, further comprising outputting, to a display of the second terminal, notification information indicating that the participation restriction is imposed on the session, when the obtained start request information designates presence of the participation restriction.

16. A non-transitory computer-readable recording medium that contains a computer program that causes a computer communicating with a plurality of terminals to perform a method comprising:
obtaining, from a first terminal over a network, information for requesting start of a session between the first terminal and a second terminal of the plurality of terminals, the start request information including a designation having a value being either a first value indicating presence of a participation restriction restricting all terminals of the plurality of terminals, other than the first terminal and the second terminal, from participating in the session at a time after the session between the first and second terminals has been established, or a second value indicating absence of the participation restriction, the value of the designation being determined by user input from a user of the first terminal, prior to the obtaining of the start request information;
storing, in a first memory for each terminal of the plurality of terminals, a current operational state of the terminal, the operational state being at least one of (1) online, in which communication with the terminal is possible, (2) busy, in which a session with the terminal has been established, and (3) off-line, in which communication with the terminal is not possible;
establishing a session between the first terminal and the second terminal in accordance with the start request information;
when the value of the designation is the first value, changing, in the first memory, the current operational state of each of the first and second terminals in the established session to offline, rather than busy;
obtaining, from a third terminal of the plurality of terminals, participation request information with which the third terminal requests participating in the already established session between the first terminal and the second terminal; and
allowing the third terminal to participate in the already established session when the designation in the start request information, obtained prior to establishment of the session, has the second value indicating absence of the participation restriction, and prohibiting the third terminal from participating in the already established session when the designation in the start request information, obtained prior to establishment of the session, has the first value indicating presence of the participation restriction restricting all terminals other than the first and second terminals from participating in the session.

17. The non-transitory computer-readable recording medium of claim 16, the method further comprising outputting, to a display of the second terminal, notification information indicating that the participation restriction is imposed on the session, when the obtained start request information designates presence of the participation restriction.

\* \* \* \* \*